US005604800A

United States Patent [19]

Johnson et al.

[11] Patent Number: 5,604,800

[45] Date of Patent: Feb. 18, 1997

[54] PERSONAL ACCESS MANAGEMENT SYSTEM

[75] Inventors: William C. Johnson, Los Angeles, Calif.; Charles C. McMullen, Colorado Springs, Colo.

[73] Assignee: ETA Technologies Corporation, Los Angeles, Calif.

[21] Appl. No.: 388,268

[22] Filed: Feb. 13, 1995

[51] Int. Cl.$^6$ .................................................... H04L 9/00

[52] U.S. Cl. ............................ 380/4; 38/3; 38/23; 38/25; 38/49

[58] Field of Search .............................. 380/3, 4, 23, 24, 380/25, 49, 21

[56] References Cited

U.S. PATENT DOCUMENTS

| | | | |
|---|---|---|---|
| 4,827,508 | 5/1989 | Shear | 380/4 |
| 5,485,519 | 1/1996 | Weiss | 380/23 |
| 5,495,533 | 2/1996 | Linehan et al. | 380/23 |

OTHER PUBLICATIONS

Akst, Daniel, "Encryption Protects Virtual Cash for On–Line Shopping on Net," *Los Angeles Times*, Dec. 9, 1994, U.S.A., Section D, p. 10.

Anthes, Gary H., "Data Encryption: Security Upgrade Rattles Banking Industry," *Computer World*, Dec. 12, 1994, U.S.A., pp. 1, 28.

Baig, Edward C., "The Information Society," *Business Week/Information Revolution*, 1994, U.S.A., pp. 122–132.

Chien, Philip, "Letter to a Beeper," *Popular Mechanics*, Apr. 1994, U.S.A., pp. 50–53.

Coy, Peter, "Invasion of the Data Shrinkers," *Business Week*, Feb. 14, 1994, U.S.A., pp. 115–116.

Hansell, Saul, "Banks Shutting Local Branches to Trim Costs," *New York Times*, Oct. 23, 1994, U.S.A., National Section, pp. 1, 14.

Harmon, Amy, "TCI, Microsoft Join Forces in On–Line Service Venture," *Los Angeles Times*, Dec. 22, 1994, U.S.A., pp. D1, D3.

Helm, Leslie & Amy Harmon, "AT&T Enters the On–Line Race," *Los Angeles Times*, Jan. 7, 1994, U.S.A., pp. D1, D12.

Hof, Robert D., "Welcome to the Next Level, Chipmakers," *Business Week*, Feb. 21, 1994, U.S.A., p. 74.

Holland, Kelley, "Everyone's Knocking on Home Banking's Door," *Business Week*, Mar. 28, 1994, U.S.A., p. 154.

Holland, Kelley, "Stalking the Credit–Card Scamsters," Business Week, Jan. 17, 1994, U.S.A., pp. 68–69.

(List continued on next page.)

*Primary Examiner*—David C. Cain

*Attorney, Agent, or Firm*—Bobby K. Truong; Edward J. Radlo; David L. Hayes

[57] ABSTRACT

A multi-component system for linking a user to a product or service provider includes a user processing device, a storage device, and a provider device. The storage device stores provider-specific application software, user-specific data, and a file management program. The storage device and the processing device are coupled to each other to form a user device which communicates with the provider device. Under direction of the file management program, the processing device carries out a recognition methodology which determines whether the processing device and the storage device are authorized to operate with each other. This aspect of the system makes it possible to render the storage device operable only with a specific user processing device, referred to as the principal processing device. This, in turn, reduces the possibility of fraud since the storage device cannot be used without the principal processing device. Once it is determined that the processing and storage devices are authorized to interact with each other, the processing device executes the provider-specific application software to exchange information with the provider device. Together, the user and provider devices implement unique recognition and comprehension methodologies to ensure that the parties are authorized to communicate with each other and to ensure that the information exchanged cannot be understood by third parties. Overall, the system provides a highly secure mechanism for transferring information from one party to another.

47 Claims, 33 Drawing Sheets

804

810 Prompt user for a DPIN

814 Generate and store master hash code and master key code

818 Generate and store UAS hash code and UAS key code

822 User input?

No

826 Generate operational key code

Yes

830 Receive operational key code

834 Generate operational key file name

838 Store key code and key file name in RAM

842 More key codes?

Yes

No

846 Encrypt data using UAS key code; store

850 Encrypt data using master key code; store

852 Encrypt UAS ID code; store

854 Reset "new" flags

OTHER PUBLICATIONS

Kupfer, Andrew, "Information Technology," *Fortune*, Aug. 22, 1994, U.S.A., pp. 111–118.
Laffredo, Susan, "Five Million Wireless Data Units in 1998," *Electronic Business Buyer*, Aug. 1994, p. 36.
Leutwyler, Kristin, "Superhack," *Scientific Ameican*, Jul. 1994, U.S.A., pp. 16–17.
Levy, Steven, "Battle of the Clipper Chip," *New York Times Magazine*, Jun. 12, 1994, U.S.A., pp. 45–51, 60, 70.
Mannes, George, "Video Servers," Popular Mechanics, May 1994, U.S.A., pp. 120–121.
Newman, Joseph A. Jr., "Eight Banks and Thrifts in Three States Launch Video Banking Service," *American Banker*, Jun. 9, 1987, U.S.A., pp. 2, 25.
Nussbaum, Bruce, "The Best Product Designs of the Year," Business Week, Jun. 6, 1994, U.S.A., pp. 74–77.
Piol, Alessandro A., "Digital Information Services: Here Today and More Tomorrow," *The Red Herring*, Apr. 1994, U.S.A., pp. 46–49.
Prosise, Jeff, "How Secure is Encrypted Data?" *PC Magazine*, Oct. 25, 1994, U.S.A., pp. 291–293.
Radigan, Joseph, "Look Out Home Banking, Here Comes William the Conqueror," *USBanker*, Dec. 1994, U.S.A., pp. 22–26, 60.
Reinhardt, Andy, "Building the Data Highway," *Byte*, Mar. 1994, U.S.A., pp. 46–49, 52, 54, 56, 58, 60, 62, 63, 66, 68, 70, 72, 74.
Stallings, William, "SHA: The Secure Hash Algorithm," *Dr. Dobb's Journal*, Apr. 1994, pp. 32, 34.
Stix, Gary, "Welfare Plastics," *Scientific American*, Aug. 1994, U.S.A., pp. 84–86.
Tyson, David O., "MCI Communications Venture to be Delayed Until Next Year," *American Banker*, Jun. 28, 1984, U.S.A., pp. 2, 18.
Vizard, Frank, "The Magic Box," *Popular Mechanics*, Apr. 1994, U.S.A., pp. 39–41.
Weinstein, Michael, "Chase, Cox Plan Service for Other Banks," *American Banker*, Dec. 29, 1983, U.S.A., pp. 1, 16.
Wildstrom, Stephen H., ed., "The PDA Will Not Be DOA After All," *Business Week*, Jun. 13, 1994, U.S.A., p. 20.
"Buyer's Guide 1995: Business software," *MicroTimes*, Dec. 12, 1994 U.S.A., pp. 179–180.
"Systems Linking Automated Teller Machines, Point–of–Sale Devices Are Established or Contemplated in Several Areas of the Country," *American Banker*, Mar. 19, 1982, U.S.A., pp. 2, 12.
"The Smart Card Cashes In," *The Economist*, Jan. 29, 1994, pp. 73–74.
"What's New: Pager Plus," *Popular Science*, Apr. 1994, U.S.A., p. 14.
Flynn, Laurie, "Sharp Unveils a New Breed of Personal Digital Assistant," *New York Times*, Dec. 18, 1994, U.S.A.
Hotz, Robert Lee, "Computer Code's Security Worries Privacy Watchdogs", *Los Angeles Times*, Nov. 4, 1993, U.S.A., pp. A1, A20–A21 (pages missing).
Gunther, Robert, "Citicorp Skips Computer in New Home–Banking Plan," *Wall Street Journal*, Feb. 28, 1990, U.S.A.
Kristof, Kathy M., "It's Back, It's Improved: Banking by Computer," *Los Angeles Times*, Jan. 16, 1994, U.S.A.
Leopold, George, "Crypto Card Targets E–Mail," *Electronic Engineering Times*, Nov. 14, 1994, U.S.A.
Lewis, Peter H., "A Glimpse Into the Future as Seen by Chairman Gates", *New York Times*, U.S.A.
Miller, Jeff, "Should Phone Companies Make Films?" *New York Times*, Jan. 2, 1994, U.S.A.
Tyson, David O., "Low–Cost Computer Terminal Designed for Home Banking", *American Banker*, Apr. 4, 1984, U.S.A.
Tyson, David O., "Survival Kit: Pens and Stamps Instead of Video," *American Banker*, Mar. 16, 1989, U.S.A.
Gellene, Denise, "Digital Stirs into the Cellular Stew", *Los Angeles Times*, U.S.A., pp. D1, D4.
Helm, Leslie, "Hughes Ups the Ante in Satellite Network", *Los Angeles Times*, U.S.A., pp. D1, D12.
Helm, Leslie, "AT&T Pulls the Plug on Wireless Communicator", *Los Angeles Times*, U.S.A., pp. D1, D4.
Schrage, Michael, "Gates has the Checkbook; Can He Balance an Empire?" *Los Angeles Times*. U.S.A., pp. D1, D4.
Mace, Scott, "ViaCrypt to Market PGP Encryption for Windows".
Zimmer, Linda Fenner, "How Much is Too Much?".
"The Newest Personal Digital Assistants Let You Send Messages and Even Make Voice Calls Through Thin Air," *Popular Science*, Apr. 1994, U.S.A., pp. 67–69 (pages missing).
"Road to Cashlessness Paved With Plastic," *Los Angeles Times*, U.S.A.
"Secure Web Kits Offer Security."
"Sign Here, by PC," *Popular Science*, Dec. 1994, U.S.A.
Special to the American Banker, *American Banker*, May 15, 1985, U.S.A.
"Visa and Intuit Team Up."
"What's New: Mini–mass Storage," *Popular Science*, U.S.A.
Office Depot advertisement, Los Angeles Times.
Toshiba advertisement.

Operational Key File Name$_1$
Operational Key code$_1$

Operational Key File Name$_2$
Operational Key code$_2$

•
•
•

Operational Key File Name$_n$
Operational Key code$_n$

Operational Key File Name$_1$
Operational Key code$_1$
EKE Reference Code

Operational Key File Name$_2$
Operational Key code$_2$

•
•
•

Operational Key File Name$_n$
Operational Key code$_n$

370

| | File Name | File Address | File ID Code | File Status | Operational Key File Name | File Reference Code |
|---|---|---|---|---|---|---|
| File 154 | $Name_{154}$ | $Address_{154}$ | ID $Code_{154}$ | Closed | | |
| File 156 | $Name_{156}$ | $Address_{156}$ | ID $Code_{156}$ | Closed | | |
| File 158 | $Name_{158}$ | $Address_{158}$ | ID $Code_{158}$ | Closed | | |
| File 160 | $Name_{160}$ | $Address_{160}$ | ID $Code_{160}$ | Closed | | |
| File 162 | $Name_{162}$ | $Address_{162}$ | ID $Code_{162}$ | Closed | | |
| File 164 | $Name_{164}$ | $Address_{164}$ | ID $Code_{164}$ | Closed | | |
| File 170 | $Name_{170}$ | $Address_{170}$ | ID $Code_{170}$ | Closed | | |

| | File Name | File Address | File ID Code | File Status | Operational Key File Name | File Reference Code |
|---|---|---|---|---|---|---|
| File 154 | $Name_{154}$ | $Address_{154}$ | ID $Code_{154}$ | Closed | Operational Key File $Name_2$ | [ ID $Code_{154}$ ] E2 |
| File 156 | $Name_{156}$ | $Address_{156}$ | ID $Code_{156}$ | Closed | Operational Key File $Name_{10}$ | [ ID $Code_{156}$ ] E10 |
| File 158 | $Name_{158}$ | $Address_{158}$ | ID $Code_{158}$ | Closed | Operational Key File $Name_{20}$ | [ ID $Code_{158}$ ] E20 |
| File 160 | $Name_{160}$ | $Address_{160}$ | ID $Code_{160}$ | Closed | Operational Key File $Name_2$ | [ ID $Code_{160}$ ] E2 |
| File 162 | $Name_{162}$ | $Address_{162}$ | ID $Code_{162}$ | Closed | Operational Key File $Name_{20}$ | [ ID $Code_{162}$ ] E20 |
| File 164 | $Name_{164}$ | $Address_{164}$ | ID $Code_{164}$ | Closed | Operational Key File $Name_{19}$ | [ ID $Code_{164}$ ] E19 |
| File 170 | $Name_{170}$ | $Address_{170}$ | ID $Code_{170}$ | Closed | Operational Key File $Name_{13}$ | [ ID $Code_{170}$ ] E13 |

| | File Name | File Address | File ID Code | File Status | Operational Key File Name | File Reference Code |
|---|---|---|---|---|---|---|
| File 154 | $Name_{154}$ | $Address_{154}$ | ID $Code_{154}$ | Closed | Operational Key File $Name_{11}$ | [ ID $Code_{154}$ ] E11 |
| File 156 | $Name_{156}$ | $Address_{156}$ | ID $Code_{156}$ | Closed | Operational Key File $Name_{15}$ | [ ID $Code_{156}$ ] E15 |
| File 158 | $Name_{158}$ | $Address_{158}$ | ID $Code_{158}$ | Closed | Operational Key File $Name_{9}$ | [ ID $Code_{158}$ ] E9 |
| File 160 | $Name_{160}$ | $Address_{160}$ | ID $Code_{160}$ | Closed | Operational Key File $Name_{17}$ | [ ID $Code_{160}$ ] E17 |
| File 162 | $Name_{162}$ | $Address_{162}$ | ID $Code_{162}$ | Closed | Operational Key File $Name_{1}$ | [ ID $Code_{162}$ ] E1 |
| File 164 | $Name_{164}$ | $Address_{164}$ | ID $Code_{164}$ | Closed | Operational Key File $Name_{6}$ | [ ID $Code_{164}$ ] E6 |
| File 170 | $Name_{170}$ | $Address_{170}$ | ID $Code_{170}$ | Closed | Operational Key File $Name_{11}$ | [ ID $Code_{170}$ ] E11 |

Fig. 8c

PERSONAL ACCESS MANAGEMENT SYSTEM

FIELD OF THE INVENTION

This invention relates generally to transactional, communication, and authorization systems, and more particularly to a multi-component system which implements unique recognition and comprehension methodologies to verify party identities and to ensure session security.

BACKGROUND OF THE INVENTION

For a number of years now, tremendous efforts have been devoted to devising systems for linking consumers with product and service providers which would allow the consumers to communicate and to transact with the providers from remote locations, such as from their homes. Such efforts have produced some systems which have received a small degree of acceptance. Examples include home shopping networks (such as QVC). home entertainment systems (such as DirecTV), remote stock transaction systems (such as Reuters), and automatic teller machine (ATM) systems. While these remote systems have gained some acceptance, there still is, for the most part, an absence of a generally and widely accepted system for conducting business from a remote site.

The failure of the presently existing systems can be attributed to a number of different factors. One possible factor is cost, both in terms of the providers' cost and the cost to the consumers. Currently, consumers are typically linked to providers not directly but through aggregators. The presence of an aggregator adds a middleman to the business process which in turn increases the cost to the consumers. High cost is a reason that many consumers hesitate to buy products through an electronic system. The reason that aggregators are necessary is that the linking systems currently used consist of complex, proprietary equipment which are expensive to operate and to maintain. The high cost of such a system presents a formidable barrier to providers who wish to link themselves directly to consumers.

Another possible factor for the failure of the existing systems is the lack of an overall standard system which can be applied generally to a number of different applications. The existing linking systems are, for the most part, application-specific systems. That is, each system is specifically designed to carry out a particular purpose. Typically, proprietary methodologies are implemented and proprietary equipment is used. Application-specific systems are usually effective for their intended purposes; however, they do have a significant practical drawback in that they tend to proliferate the use of a large number of different methods and systems. The problem with the proliferation of a myriad of methods and systems is that they force consumers to buy different equipment for each application, and to learn to use a different system for each application. This makes it very expensive for a consumer to be linked to a large number of providers, and it also imposes a heavy time burden on the consumer. Many consumers are unwilling to invest the money or the time needed to take advantage of the existing proprietary linking systems. A more general system, usable in a variety of different applications, would be more readily accepted.

High cost and the lack of a generally applicable system are factors which have contributed to the failure of the existing linking systems, but probably the most important factor is that of security. Many people inherently distrust machines and, hence, are reluctant to conduct important matters by way of machines in the first place. This distrust is only exacerbated by reports of fraud being perpetrated on electronic systems. In order to be successful, a linking system needs to ensure that user transactions and communications will be secure. This involves both verifying that the proper parties are conducting the transaction, and ensuring that information transferred between the parties cannot be intercepted and used fraudulently by third parties. Thus far, no generally applicable system which is cost effective and convenient to use performs this function satisfactorily. Hence, there exists a need for an improved system for linking users to providers.

SUMMARY OF THE INVENTION

In accordance with the present invention, there is provided a multi-component system, comprising a processing device, a storage device, and a provider device, which implements unique recognition and comprehension methodologies to ensure that transactions conducted from remote locations are secure. In the system of the present invention, the processing device and the storage device couple to each other to form an overall user device, and once formed, this user device establishes a link with the provider device to communicate with a particular provider or a particular group of providers. In the preferred embodiment, the processing device provides the processing and communication capabilities, while the storage device provides the instructions necessary for communicating with a specific provider device. Preferably, the processing device executes the instructions stored on the storage device to communicate with the specific provider. In the system of the present invention, to communicate with another provider, all a user needs to do is to couple another storage device to the same processing device, and to instruct the processing device to execute the provider-specific instructions stored on that new storage device. This aspect of the present invention allows it to be generally applied to a number of different applications involving a number of different providers.

To ensure party recognition, a recognition methodology is preferably implemented both between the processing device and the storage device, and between the user device and the provider device. Consequently, only the proper devices may be coupled together to form a user device, and only a valid user device may communicate with the provider device. To ensure information security, data stored on the storage device is encrypted, and information transferred between the user and provider devices is also encrypted. Thus, even if a storage device is lost, or information sent between the user device and the provider device is intercepted, no comprehensible information can be derived therefrom. As an extra measure of security, the parameters used to effect the recognition and encryption methodologies are preferably dynamically and regularly updated. By so doing, even if a third party is able to fraudulently obtain the parameters needed to "break in" to the system, that information is rendered useful only for a short period of time. Once the parameters are changed, the stolen information is useless. Thus, updating the parameters serves to minimize the damage caused by system breaches. Overall, the system of the present invention provides a highly secure mechanism for linking users to providers.

BRIEF DESCRIPTION OF THE DRAWINGS

FIG. 4b is a detailed flow diagram of the initialization step 804 of FIG. 4a.

FIG. 4c is a detailed flow diagram of the UAS restoration step 860 of FIG. 4a.

FIG. 4d is a detailed flow diagram of the master EKE restoration step 912 of FIG. 4a.

FIG. 4e is a detailed flow diagram of the DPIN modification step 948 of FIG. 4a.

FIG. 7b is a detailed flow diagram of the initialization step 182 of FIG. 7a.

FIG. 7c is a detailed flow diagram of the recognition methodology step 186 of FIG. 7a.

FIG. 7d is a detailed flow diagram of the file management step 192 of FIG. 7a.

FIG. 7e is a detailed flow diagram of the recognition parameter update step 204 of FIG. 7a.

FIG. 7f is a detailed flow diagram of the file management parameter update step 206 of FIG. 7a.

FIG. 8a shows a file management table 370 which is maintained in file 152 of EKE 14 for use in coordinating access to the managed files 154–164, 170.

FIG. 8b shows the possible contents of table 370 after the EKE 14 is initialized with file management parameters.

FIG. 8c shows the possible contents of table 370 after the file management parameters have been updated.

DETAILED DESCRIPTION OF THE PREFERRED EMBODIMENTS

Figure 1:
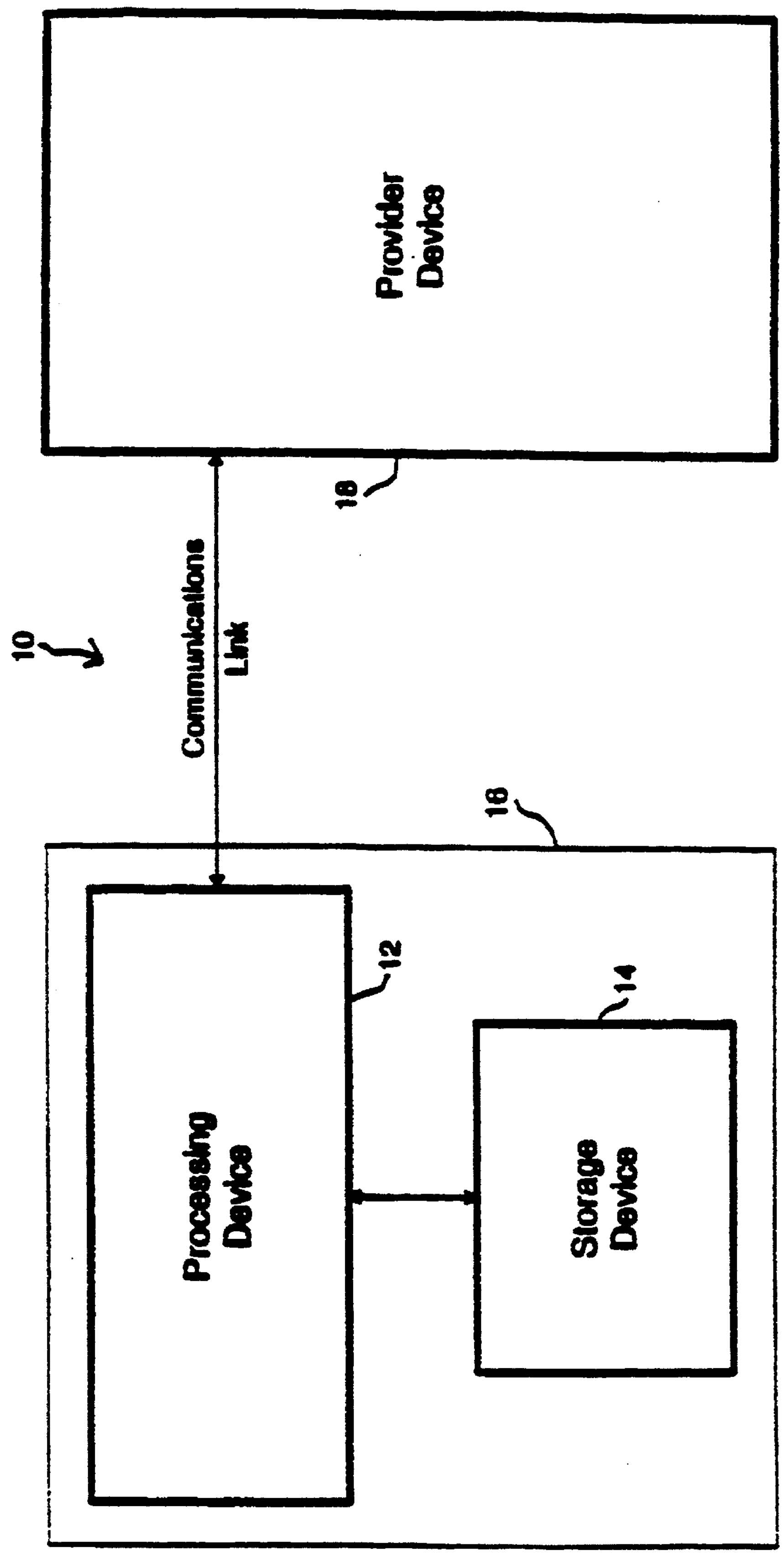
FIG. 1 is a block diagram providing a broad overview of the system 10 of the present invention.

A broad overview of the system 10 of the present invention is shown in FIG. 1, wherein the system 10 preferably comprises a processing device 12, a storage device 14, and a provider device 18. Storage device 14 preferably couples to processing device 12 to form a single user device 16 which communicates with the provider device 18 via a communications link. In system 10, device 12 provides the processing capability, the communications interface needed to communicate with the provider device 18, and the user interface necessary for interfacing with a user. Device 12, however, contains a minimum of software instructions. Hence, on its own, device 12 is incapable of communicating or transacting with the provider device 18. In the preferred embodiment, device 12 is a general purpose processing device capable of carrying out any desired function so long as the proper instructions are provided.

It is storage device 14 which provides the specific program instructions and data needed by processing device 12 to operate and to interact with the provider device 18. Storage device 14 preferably contains therein: (1) a management program which controls interaction between the processing device 12 and the storage device 14, and interaction between the user device 16 and the provider device 18; (2) a provider-specific program which generates the messages (referred to herein as session codes) to be sent to the provider device 18; and (3) user-specific data which is used and manipulated by the two programs. Processing device 12 preferably accesses and executes the instructions stored on the storage device 14 once the storage device 14 is coupled thereto. In system 10, storage device 14 may take on a number of different forms including magnetic media (e.g. hard and floppy disks, magnetic stripe cards, etc.), optical media (e.g. CD-ROM), and semiconductor memory (e.g. RAM, PROM, flash memory, etc.). Any form is acceptable so long as it is capable of storing instructions and data, and can interface with the processing device 12.

As mentioned above, processing device 12 is a general purpose processing device, and as such, it is capable of interacting with and executing instructions from a number of different storage devices. A practical consequence of this is that the same processing device may be used to communicate with a number of different providers. All the user has to do to communicate with a different provider is to couple a different storage device 14 to the processing device 12. This aspect of the invention is advantageous because it significantly limits the cost to the user of implementing system 10. A user need invest in only one processing device. Thereafter, only the storage devices need to be supplemented, replaced and updated. Since it is contemplated that providers will provide storage devices to users at little or no cost, the cost to the user of communicating directly with a provider will be kept to a minimum. This aspect of the invention makes it much more practicable than most, if not all, of the prior art systems.

The provider device 18 of system 10 acts as a gateway between a user device 16 and a particular provider or a particular group of providers. Before a user device 16 can access the services and products of the provider, it must first satisfy the requirements of the provider device 18. Device 18 preferably implements a recognition methodology to ensure that the user device 16 is a valid device, and preferably implements a comprehension methodology to decipher messages from the user device into a form that the provider can understand. Once the message is deciphered, the provider device 18 may process the message itself, or it may relay the message on to a separate provider processing device which actually performs the processing function. Whether the message is processed or relayed by device 18 is a matter of design choice.

Whenever business is conducted from a remote location, i.e. in a non face-to-face setting, there is always concern over the possibility of fraud. In a system such as system 10, there are at least three major concerns: (1) the possibility of loss or theft of the storage device 14; (2) the possibility that improper parties are communicating: and (3) the possibility that third parties will intercept and use the information transferred between user device 16 and provider device 18. The system 10 of the present invention addresses and provides a solution to all of these concerns.

With regard to the possibility of loss or theft of the storage device 14, the management program stored on the storage device 14 forestalls the use of the lost or stolen device by an improper user. To elaborate, when storage device 14 is coupled to processing device 12, the processing device 12 executes the management program stored on the storage device 14 to carry out a recognition methodology whereby it is determined whether the processing device 12 and the storage device 14 are authorized to interact with each other. The recognition methodology (described in detail in a later section) is preferably carried out by processing and comparing selected sets of recognition data stored in the storage device 14 with recognition data stored in the processing device 12. Only if the two sets of recognition data are consistent will interaction between the devices 12, 14 be allowed to continue.

An important point to note here is that when a storage device is used with a processing device 12 for the first time, the management program stores customized recognition data in both the storage device and the processing device. This customized recognition data establishes a unique relationship between the storage device and the processing device 12 that cannot be established between the storage device and any other processing device (except in the highly unlikely event that another processing device has the same customized recognition data stored therein). As a consequence, once customized recognition data is established between a processing device and a storage device, the storage device is rendered inoperable with any other processing device. Hence, in system 10, if a user loses the storage device 14, system security is not compromised because the finder of the storage device cannot use the storage device with his own processing device. This aspect of the present invention greatly enhances system security. At this point, it should be noted that while a storage device establishes a unique relationship with preferably only one processing device, a processing device can establish a unique relationship with more than one storage device. This allows a single processing device to be used with a plurality of different storage devices.

System 10 also serves to ensure that only proper parties are allowed to communicate with each other. The function of party recognition and verification is carded out by both the user device 16 and the provider device 18. In communicating with the provider device 18, processing device 12 executes both the management program and the provider-specific program stored in storage device 14. These two programs cause the processing device 12 to: (1) retrieve selected recognition parameters from the storage device 14 which are unique to the device 14; (2) generate session codes to send to the provider device 18; (3) process the parameters and the session codes; and (4) send the processed parameters and processed session codes to the provider device 18. In response, provider device 18 processes the information received from the user device 16 and determines whether the user device is a valid device, i.e. is a recognized device. Access to the provider is granted only if the user device 16 is a recognized device. In addition to performing the recognition function, the provider device 18 also preferably coordinates the dynamic and regular alteration of the recognition parameters. Regularly changing the recognition parameters is desirable because it renders any fraudulently obtained information useful for only a short period of time. In system 10, the combination of implementing a recognition methodology and dynamically altering the recognition parameters makes it extremely difficult for a non-valid device to gain access to the provider. Thus, system 10 virtually assures that only the proper parties are allowed to communicate with each other.

Furthermore, the system 10 of the present invention provides a measure for shielding information transmitted between the user device 16 and the provider device 18 from third parties. Whenever information is sent from one device to another, the information is preferably encrypted. In addition, the encryption keys used in the encryption/decryption process are preferably regularly updated. Sending information in this manner makes it virtually impossible for a third party to derive any useful information from the information transmissions. Hence, session security is virtually guaranteed.

As shown by the above discussion, the system 10 of the present invention addresses and overcomes the three major security problems typically encountered in communications systems. Overall, a highly secure communications system is provided by the present invention. With this background information in mind, the invention will now be described in detail with reference to specific embodiments. In the following sections, system 10 will be referred to as the personal access management system (PAMS), processing device 12 will be designated as the user access system (UAS), storage device 14 will be referred to as the electronic key executive (EKE), and provider device 18 will be designated as the provider access system (PAS).

UAS

Figure 2A:
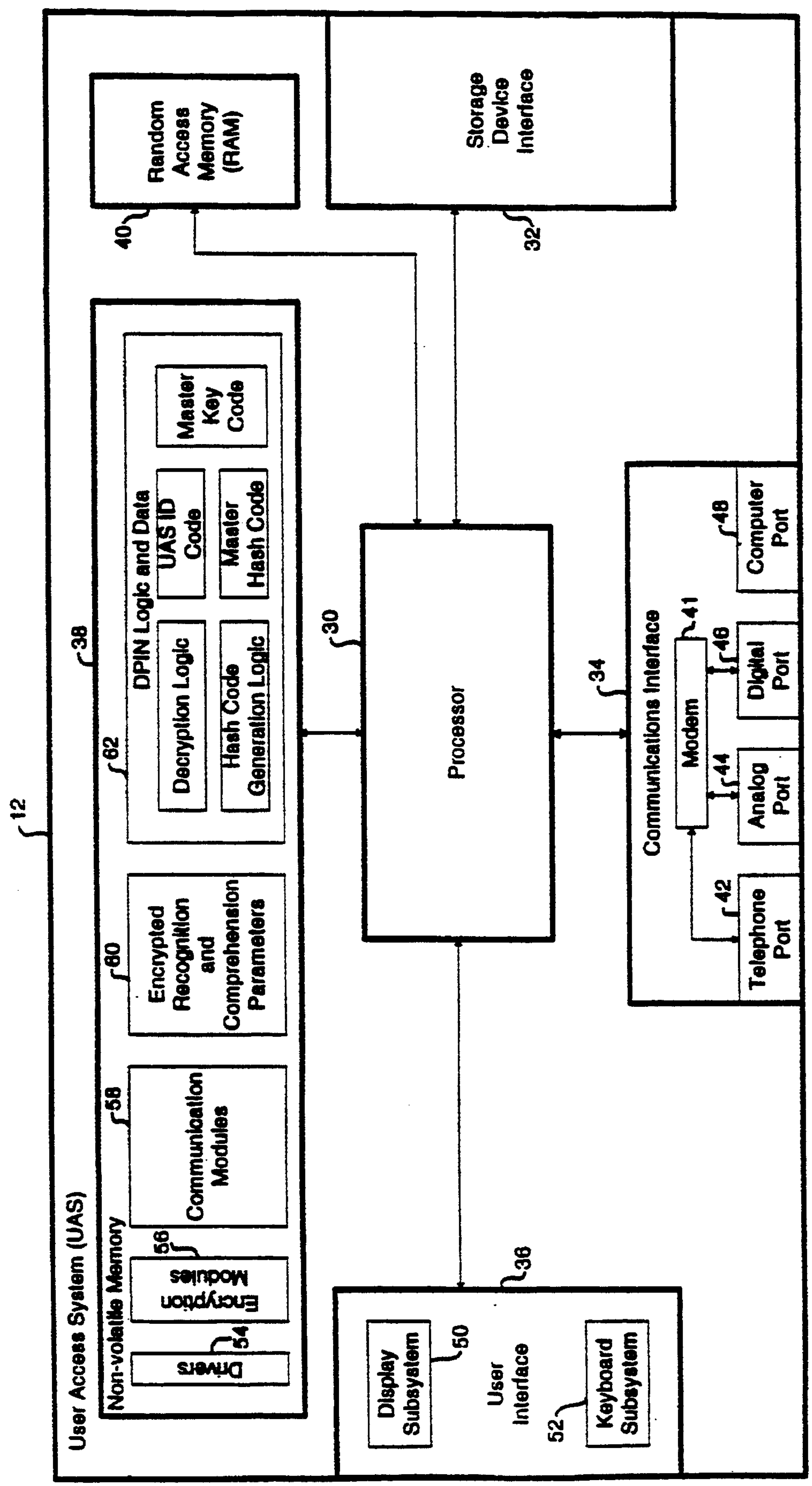
FIG. 2a is a detailed block diagram of a first preferred embodiment of the processing device (UAS) 12 of the present invention.

With reference to FIG. 2*a*, there is shown a detailed block diagram of a first preferred embodiment of the UAS 12 of the present invention, wherein the UAS 12 preferably comprises a general purpose processor 30 (such as an 80186 microprocessor manufactured by Intel Corporation), a storage device interface 32, a communications interface 34, a user interface 36, a non-volatile memory 38, and a random access memory (RAM) 40. In the preferred embodiment. UAS 12 takes the form of a hand-held, portable computing device: however, it should be noted that if so desired, UAS 12 may take on various other forms such as a desktop, laptop, or notebook computer, or some other form. UAS 12 is preferably a general purpose processing device. As such, it stores a minimum of its own program instructions. Preferably, processor 30 carries out desired functions by executing program instructions stored on external storage devices. Interface 32 enables the processor 30 to execute instructions stored on external devices by receiving one of a number of different storage devices, and coupling the storage device to the processor 30. Interface 32 may take on a number of different forms, but in the preferred embodiment, interface 32 is a PCMCIA port for receiving a PCMCIA compatible storage device, such as a PCMCIA memory card.

A major function of UAS 12 is to allow a user to communicate with a provider from a remote location. Consequently, UAS 12 preferably comprises a communications interface 34 for forming a communications link with the provider. Preferably, interface 34 comprises a modem 41 (such as a XE1414VS2 interface manufactured by Xecom), and a plurality of communications ports 42–46 coupled thereto. The communications ports preferably include telephone port 42 for connecting to a universal telephone network, and an analog 44 and a digital I/O port 46 for communicating by RF, optical, or cable means. These various ports give a user a good degree of flexibility in choosing the type of communications link to form with a provider. Also included in interface 34 is a computer port 48. Port 48 allows UAS 12 to readily link with a standard computer to receive information therefrom and to download information thereto.

UAS 12 also comprises a user interface 36 for communicating with a user. Interface 36 preferably comprises a display subsystem 50 for sending information to the user, and a keyboard subsystem 52 for receiving input from the user.

UAS 12 preferably further comprises memory for storing information, including a non-volatile memory 38 for storing information permanently in the UAS 12, and a RAM 40 for temporarily storing current program instructions and associated data. Several sets of instructions and data are preferably stored in the non-volatile memory 38. First, all drivers 54 which are needed to operate the components of the UAS 12, such as the display and keyboard drivers, are stored in file 54.

Also, data encryption modules 56 are stored in memory 38. These modules 56, when executed by processor 30, are capable of performing two major functions. First, they encrypt and decrypt data according to a selected algorithm. The encryption algorithms implemented by modules 56 may include DES, SKIPJACK, and various other algorithms. To maintain an open architecture, modules 56 preferably implement encryption algorithms which are industry accepted standards; however, if so desired, modules 56 may implement proprietary algorithms to limit UAS compatibility. A second function performed by modules 56 is that of generating random numbers. As will become clear, this aspect of the modules 56 is very useful in the process of dynamically altering recognition and comprehension parameters. In the UAS 12 shown in FIG. 2*a*, the encryption/decryption function is performed by having processor 30 execute the encryption modules 56 stored in the non-volatile memory 38. It should be noted, however, that the encryption/decryption function can be achieved in various other ways. For example, a hardware encryption component (not shown) may be coupled to and called upon by the processor 30 to carry out the encryption function. Also, an encryption processor may be incorporated into the processor 30 itself to perform the necessary encryption functions. These and other embodiments are within the contemplation of the present invention.

Non-volatile memory 38 further stores communications modules 58 for controlling the sending and receiving of information. Whenever information is sent via a communications link, certain protocols need to be observed. Modules 58, when executed by processor 30, ensure that outgoing messages are packaged and transmitted using the proper protocol, and that incoming messages are deciphered using the proper protocol. Non-volatile memory 38 further contains a section 60 for storing encrypted recognition and comprehension parameters. When a UAS 12 is new, this section 60 will not contain any data, but once the UAS 12 is initialized, encrypted recognition and comprehension parameters will be stored in section 60. As will be explained later, the parameters stored in section 60 are manipulated by processor 30 in implementing the recognition and comprehension methodologies of the present invention.

Finally, non-volatile memory 38 preferably stores dynamic personal identification number (DPIN) logic and data 62. Section 62 initially preferably stores a UAS identification code which is unique to the UAS 12, hash code generation logic, and decryption logic. After the UAS 12 is initialized, section 62 will also store a master key code and a master hash code. As will be explained in a later section, the hash code generation logic in section 62 will be executed by processor 30 to aid in generating two different key codes given a single DPIN, and the decryption logic in section 62 will be executed by processor 30 to render the information in section 60 comprehensible and useful in actual operation. Preferably, both the key generation and the decryption logic in section 62 are executed by processor 30 each time the UAS 12 is powered up.

Distributed UAS

Figure 2B:
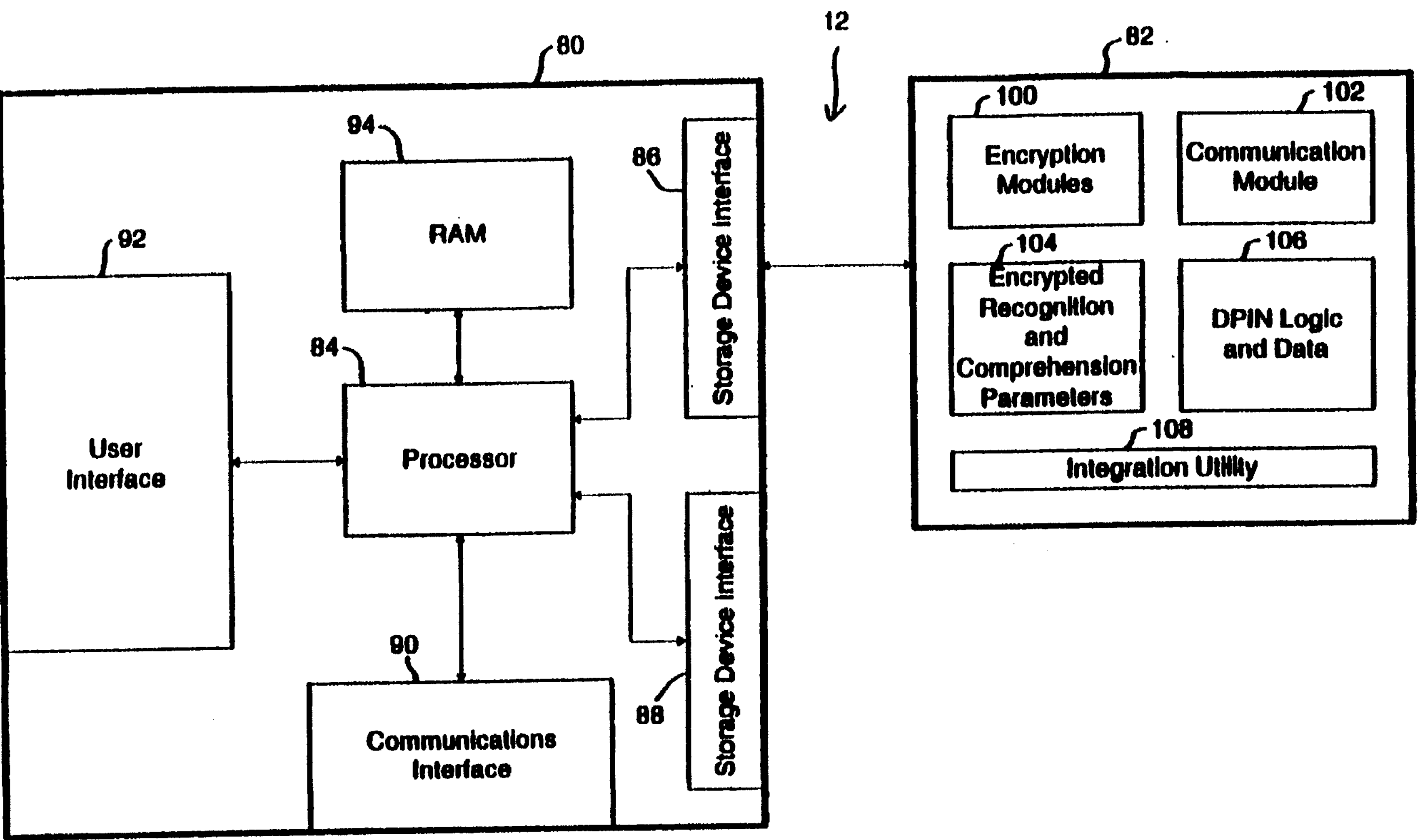
FIG. 2b is a detailed block diagram of an alternative embodiment of the UAS 12 of the present invention.

Thus far, the UAS 12 has been described as a single dedicated device comprising all of the necessary components. As an alternative embodiment, the UAS 12 may take on a distributed form wherein the components of the UAS 12 are separated into multiple component blocks. An example of such an embodiment is shown in FIG. 2*b*, wherein the UAS 12 is divided into two component blocks: (1) a standard hardware block 80 comprising the processing, communication, and interfacing components (hardware block 80 may be, for example, a standard personal computer having two PCMCIA ports); and (2) a software block, stored on a storage device 82, comprising the control programs and the data which render the UAS 12 unique. Preferably, storage device 82 takes the form of a PCMCIA compatible memory card. To form the overall UAS 12, the storage device 82 is simply coupled to the hardware block 80 via one of the storage device interfaces 86, 88.

In the distributed UAS embodiment shown in FIG. 2*b*, the hardware block 80 preferably comprises a standard, general purpose processor 84, and a plurality of components coupled thereto. These components include two storage device interfaces 86, 88, a communications interface 90, a user interface 92, and a RAM 94. Components 84–94 are preferably analogous to the corresponding components 30–36,40 shown in FIG. 2*a*. Thus, these components need not be described again here. With regard to the software block 82, a plurality of control programs and data are preferably stored therein. Specifically, block 82 comprises encryption modules 100, communications module 102, encrypted recognition and comprehension parameters 104, and DPIN logic and data 106. Elements 100–106 are analogous to elements 56–62 shown in FIG. 2*a*; thus, they need not be re-described here.

For the most part, the two embodiments of the UAS 12 are quite similar. One notable difference, though, is the presence of the integration utility 108 in the distributed embodiment. In the distributed embodiment, one of the issues that needs to be addressed is how to make the two portions 80, 82 function as a unit. More specifically, there needs to be a mechanism for linking the software block 82 to the hardware block 80 so that the processor 84 in the hardware block 80 will know how to access and manipulate the programs and data stored in the software block 82. In the preferred embodiment shown in FIG. 2*b*, the integration utility 108 provides this linking mechanism. Preferably, when the storage device 82 is coupled to the hardware block 80 via the interface 86, the user directs the processor 84 to execute the integration utility 108 stored on the storage device 82. Under control of utility 108, processor 84 will set up certain procedures for accessing the programs and data stored on the storage device 82. Thereafter, the processor 84 will know how and when to access and to execute the elements 100–106 in the software block 82. Thus, the two separate blocks 80, 82 are transformed into a single working UAS. The specific structure of the integration utility 108 will vary depending upon the particular type of hardware block to which the storage device 82 is to be coupled. Thus, the integration utility is application-specific. Once formed, the distributed UAS 12 (FIG. 2*b*) will operate in the same manner as the integrated UAS (FIG. 2*a*). Namely, the distributed UAS 12 will accept a second storage device via interface 88 and will interact therewith.

The distributed embodiment of the UAS 12 shown in FIG. 2*b* is quite advantageous in that it is very versatile and convenient to use. As mentioned above, the hardware block 80 which forms a part of the distributed UAS 12 may be a typical personal computer having two PCMCIA ports. This means that any compatible personal computer can be transformed into a UAS by inserting the storage device 82 into one of the PCMCIA ports. This in turn means that with the distributed embodiment, a user need not carry a UAS with him, but instead may simply carry the storage device 82. Whenever he needs the use of a UAS, he simply inserts the storage device 82 into a compatible personal computer and a UAS is thereby created. A drawback of the distributed architecture, though, is that the storage device 82, because it is smaller, is easier to lose than the dedicated UAS shown in FIG. 2*a*. Thus, there is a slightly higher risk of a security breach. Which embodiment should be used in any particular application depends on the needs of the application. Both embodiments are effective for their intended purposes.

Initialization of the UAS Using a Master EKE

Figures 3, 5A, 5B:
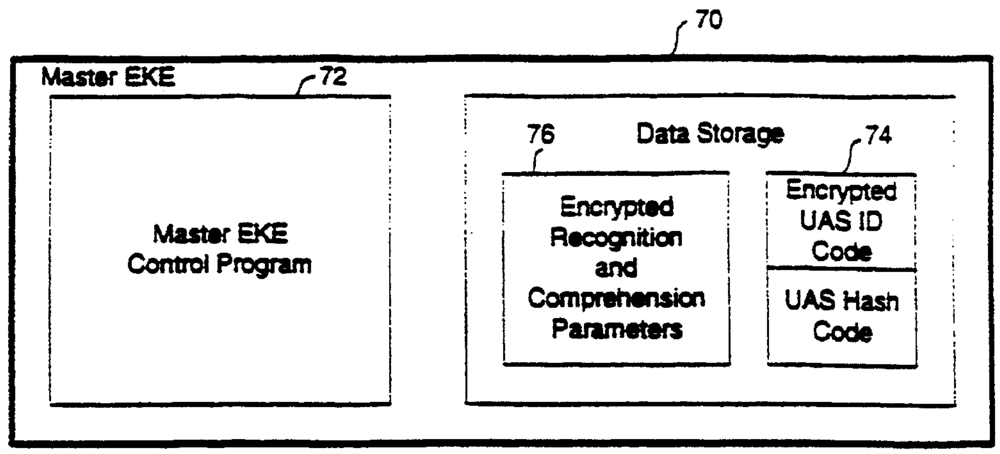
FIG. 3 is a block diagram of the master EKE 70 which interfaces with the processing device 12 to establish certain parameters.
FIG. 5a depicts the manner in which the recognition and comprehension parameters (the operational key file names and the corresponding operational key codes) are organized and stored in RAM 40 of the UAS 12.
FIG. 5b depicts the manner in which the recognition and comprehension parameters are organized and stored in RAM 40 of the UAS 12 after a regular EKE 14 has been initialized.
Figure 4A:
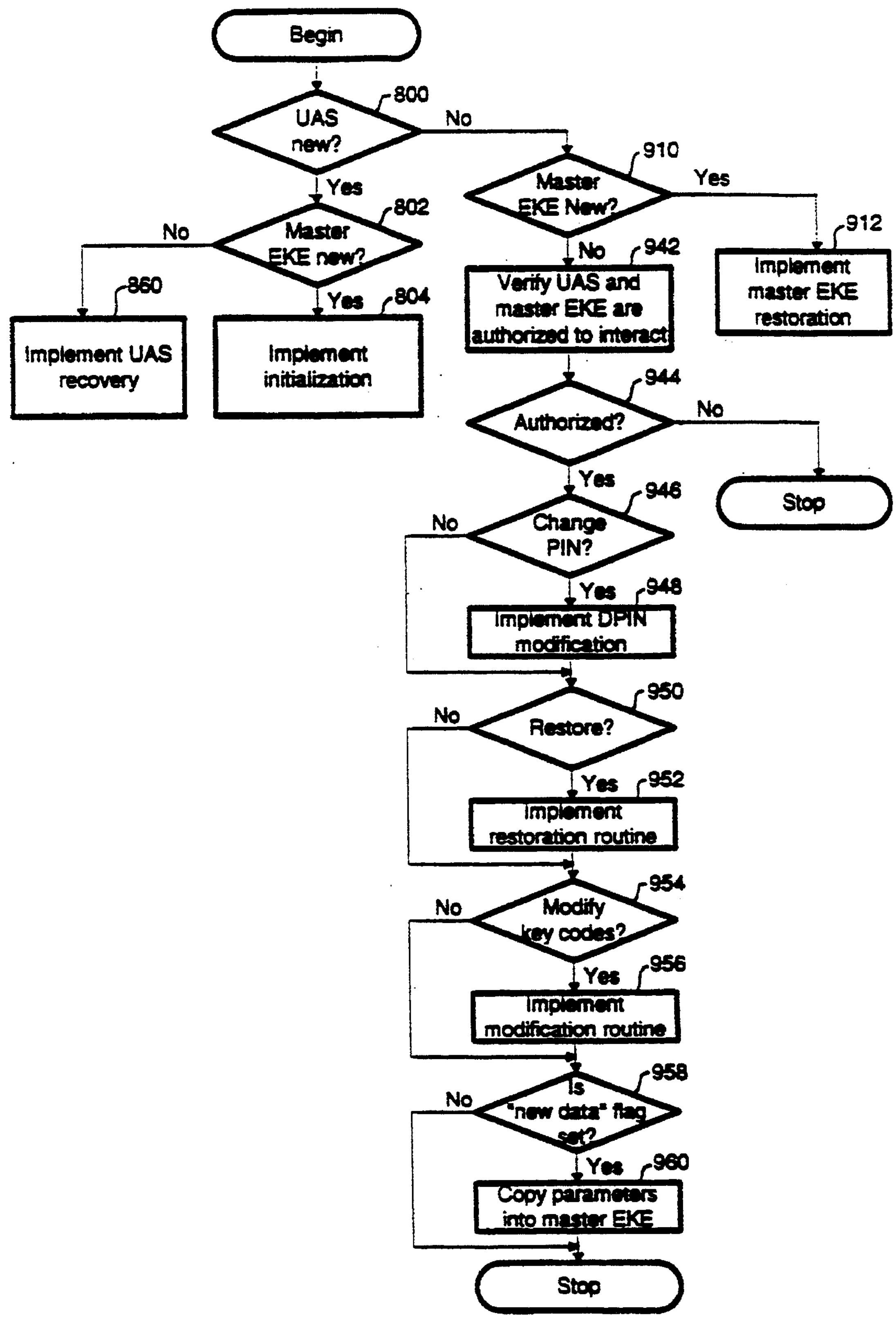
FIG. 4a is an operational flow diagram for the master EKE control program 72 stored on the master EKE 70.

Regardless of which embodiment is used, a UAS 12 by itself is incapable of communicating with a provider. Only when a UAS 12 is coupled to a proper storage device 14 will an overall user device 16 be formed which can interact with the PAS 18. Before a UAS 12 can interact with any storage device, however, it first needs to be initialized. Initialization is preferably achieved by way of a master EKE 70 (FIG. 3), which in the preferred embodiment, takes the form of a PCMCIA memory card having a PCMCIA interface (not shown) which interfaces with the UAS 12 through interface 32 (FIG. 2*a*) or interface 88 (FIG. 2*b*). The master EKE 70 preferably contains a master EKE control program 72 which is accessed and executed by processor 30 to carry out the initialization process. An operational flow diagram for the control program 72 is shown in FIG. 4*a*. As noted above, the distributed and integrated UAS embodiments (shown in FIGS. 2*a* and 2*b*) operate in the same manner. Thus, for the sake of simplicity, the initialization process will be described with reference only to the integrated UAS 12 (FIG. 2*a*). It should be understood, though, that the distributed UAS 12 (FIG. 2*b*) may be initialized in the same manner.

Preferably, processor 30 begins the initialization process by accessing and executing the control program 72 on the master EKE 70. Under control of program 72, processor 30 first determines 800 whether the UAS 12 is new (i.e. uninitialized). Step 800 is preferably carried out by checking a "new" flag stored in the UAS 12. When a UAS 12 is new, as it is in the present instance, this "new" flag should be set. If the UAS "new" flag is set, then processor 30 proceeds to step 802 to determine whether the master EKE 70 is new. Similar to the UAS 12, a "new" flag is stored on the master EKE 70, and this flag should be set when the master EKE 70 is new. If both "new" flags are found to be set, then processor 30 goes on to implement the initialization process 804 to initialize both the UAS 12 and the master EKE 70 with data that will be used in the recognition and comprehension processes.

Figure 4B:
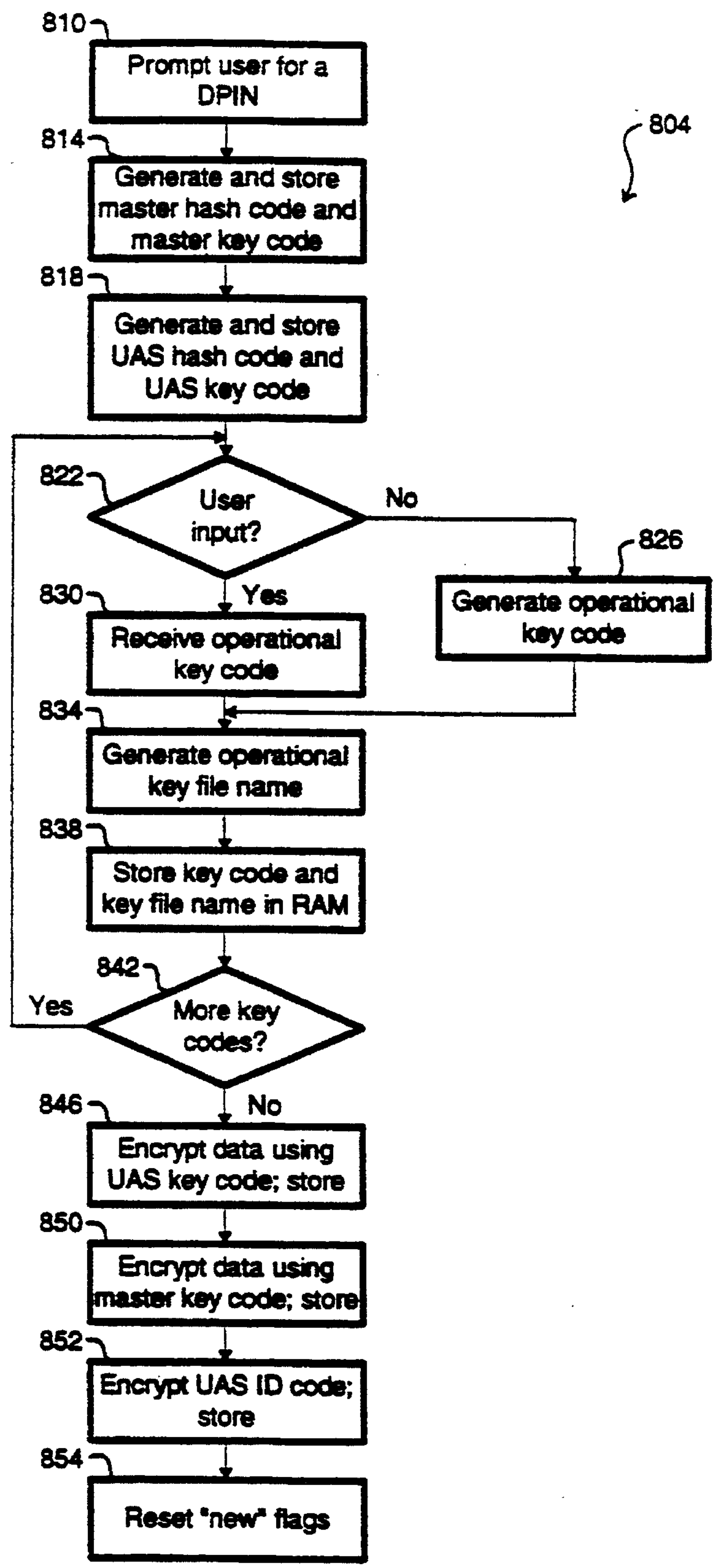

The step 804 of initializing the UAS 12 with recognition and comprehension data is shown in greater detail in FIG. 4*b*. As shown in FIG. 4*b*, processor 30 starts the data initialization process by prompting 810 the user for a dynamic personal identification number (DPIN) or code. This DPIN may be any desired alpha-numeric which the user wants to use as an identification code. Step 810 is preferably carried out by sending a user prompt to the display subsystem 50 and soliciting a response from the user via the keyboard subsystem 52. Once a DPIN is received from the keyboard subsystem 52, processor 30 proceeds to generate 814 a master hash code and a master key code using the DPIN as input. As will be explained later, this master key code is used to encrypt information stored on the master EKE 70. Preferably, processor 30 generates the master key code in two steps. First, processor 30 executes the hash code generation logic stored in section 62 of the non-volatile memory 38, using the DPIN as input, to generate a master hash code. Processor 30 preferably generates the master hash code by implementing a hashing algorithm. In the preferred embodiment, the Secure Hash Algorithm (SHA), developed by the National Institute of Standards and Technology, and published as a federal information processing standard (FIPS PUB 180), is used as the hashing algorithm. SHA is described in "SHA: The Secure Hash Algorithm" by William Stallings, Dr. Dobb's Journal, April 1994, which is incorporated herein by this reference. A point to note about a hash code is that, given the same input, the same hash code will be generated each and every time. Thus, given the same DPIN, the same master hash code will be generated every, time. However, given a certain hash code, the input cannot be derived. This means that an input cannot be "reverse engineered" from a hash code. This feature of a hash code is useful for protecting the identity of the DPIN. Once the master hash code is generated, it is stored in section 62 of the non-volatile memory 38, as shown in FIG. 2*a*. As will be explained in a later section, the master hash code is used for user verification purposes.

Once the master hash code is generated and stored, it is used by processor 30 to generate the master key code. Preferably, processor 30 generates the master key code by implementing a selected key generation algorithm using the master hash code as input. The key generation algorithm may be any desired algorithm which converts the hash code into a key having a desired length. The specific key generation algorithm used is a matter of design choice. Once the master key code is generated, it is stored in section 62 of the non-volatile memory 38, and in RAM 40 for subsequent reference. Note that the master key code is not stored on the master EKE 70. This is to preclude the possibility of another party extracting the master key code from the master EKE 70 and thereafter decrypting the information on the master EKE using the master key code.

Once the master hash code and the master key code are generated and stored, processor 30 proceeds to step 818 to generate a UAS hash code and a UAS key code. As will be explained later, the UAS key code is used to encrypt information stored in section 60 of the non-volatile memory 38. The UAS hash code and the UAS key code are generated in much the same manner as the master codes described above except that the UAS identification code stored in section 62 of the non-volatile memory 38 is used as an additional input factor. More particularly, processor 30 preferably first combines the UAS identification code with the DPIN to derive a modified DPIN. Then, processor 30 executes the hash code generation logic stored in section 62, using the modified DPIN as input, to generate the UAS hash code. Like the master hash code, the UAS hash code is preferably generated by implementing the SHA. Once generated, the UAS hash code is stored in section 74 of the master EKE 70 for subsequent access.

After the UAS hash code is generated, processor 30 uses it to generate the UAS key code. Preferably, the UAS key code is derived by implementing a selected key generation algorithm (which may be the same key generation algorithm as that used to generate the master key code) to convert the UAS hash code into a UAS key code having a desired length. Again, the specific key generation algorithm used is a matter of design choice. Once the UAS key code is generated, it is stored in RAM 40 for subsequent access. Note that unlike the master key code, the UAS key code is not stored permanently in section 62 of the non-volatile memory 38, but only in the volatile RAM 40. Since information stored in RAM 40 is lost each time the UAS 12 is deactivated, the UAS key code will need to be newly generated each time the UAS 12 is turned on. The UAS key code is managed in this manner to prevent an unauthorized party from extracting the UAS key code from the non-volatile memory 38 and thereafter using the UAS key code to decrypt the recognition and comprehension parameter information stored in section 60 of the non-volatile memory 38.

After the master key code and the UAS key code are generated, the processor 30 is ready to generate the operational key codes and the operational key file names which will be used in the recognition and comprehension processes. Data generation preferably begins with the processor 30 determining 822 the manner in which an operational key code will be derived. If the user indicates that he wants to manually input an operational key code, then processor 30 simply receives 830 a multi-bit binary code from the user via the keyboard subsystem 52. On the other hand, if the user indicates that he wants the operational key code to be automatically generated, then processor 30 executes the encryption modules 56 to randomly generate 826 a multi-bit binary code which is used as the operational key code. In the preferred embodiment, the operational key code is a 512-bit binary code. The number of bits may vary, however, depending upon which encryption algorithm is implemented by the encryption modules 56. The algorithm implemented by modules 56 is a matter of design choice. Whichever method is used, once an operational key code is derived, processor 30 generates 834 an operational key file name to associate with the operational key code. This key file name, which preferably is a variable length alpha having up to ten characters, is generated by processor 30 by executing the encryption modules 56. Once the operational key file name is generated, processor 30 creates a file in the RAM 40 of the UAS 12, assigns the file the operational key file name, and stores 838 the operational key code as a record in the file. Thereafter, processor 30 determines 842 whether more key codes need to be derived and stored; if so, processor 30 loops back to step 822 to process another key code. Preferably, steps 822–842 are repeated an n number of times to derive and to store an n number of unique operational key codes. In the preferred embodiment, twenty operational key codes are derived, but it should be noted that any desired number of operational key codes may be derived. At the end of this process 822–842, twenty files will be created and stored in the RAM 40 of the UAS 12. As illustrated in FIG. 5*a*, each file will have a unique operational key file name, and each file will contain a unique operational key code as a record therein. The operational key codes and their corresponding operational key files names are thus established.

Note that the operational key file names and the operational key codes are thus far stored only in the RAM 40 of the UAS 12. This information will be lost once the UAS 12 is deactivated due to the volatile nature of the RAM 40. In order to preserve the information for future reference, the information is preferably stored in section 60 of the non-volatile memory 38, and in section 76 of the master EKE 70. For security reasons, though, it is not desirable to store this information unprotected on either the UAS 12 or the master EKE 70. Because of this security concern, processor 30, in storing the information onto the UAS 12 and the master EKE 70, preferably first encrypts the information. Thus, in step 846, processor 30 preferably first encrypts the operational key codes stored in RAM 40 using the UAS key code as the encryption key. Once that is done, processor 30 stores the encrypted data, including the operational key file names and the encrypted operational key codes, into section 60 of the non-volatile memory 38. Encrypted recognition and comprehension parameters are thus permanently stored in the UAS 12. Similarly, in step 850, processor 30 first encrypts the operational key codes using the master key code (instead of the UAS key code) as the encryption key. Thereafter, processor 30 stores the operational key file names and the encrypted operational key codes into section 76 of the master EKE 70. In both steps 846 and 850, processor 30 preferably carries out the encryption process by executing the encryption modules 56 in non-volatile memory 38. After the encrypted operational key codes and operational key file names are stored, processor 30 proceeds to encrypt and store 852 the UAS identification code (stored in section 62 of the non-volatile memory 38) into section 74 of the master EKE 70. Preferably, the UAS identification code is encrypted using the master key code as the encryption key. After step 852, both the UAS 12 and the master EKE 70 are fully initialized. All that remains is for processor 30 to reset 854 the "new" flags in both the UAS 12 and the master EKE 70 to indicate that the devices are no longer new. Once that is done, initialization is complete.

Restoration and Backup Functions of the Master EKE

Thus far, the master EKE control program 72 has been described only with regard to the initialization process. It should be noted, though, that program 72 is capable of performing several other important functions. These functions include UAS recovery, master EKE recovery, and DPIN replacement and updating. These functions become important as the system 10 is used over a long period of time. To elaborate, in the course of using the system 10, it is probably inevitable that a user will at one time or another lose the UAS 12, lose the master EKE 70, or forget the DPIN. Without an effective recovery mechanism, the loss of one of these components could cause system functionality to be lost. One of the great advantages of the system 10 of the present invention is that, given any two of the three components (master EKE, UAS, DPIN), system recovery can be achieved. Hence, the loss of one component will not jeopardize system functionality. With reference to FIGS. 4*a*, 4*c*, 4*d*, and 4*e*, the other functions of the master EKE control program 72 will now be described.

UAS Recovery

One of the loss/recovery scenarios that can arise in the system of the present invention is that of a user losing the UAS 12. If the user still has the master EKE 70, and still remembers the DPIN, a new UAS 12 can be set up to function in the same manner as the lost UAS. To properly configure the new UAS, a user first inserts the master EKE 70 into the user interface 32 of the new UAS. Thereafter, the processor 30 on the new UAS 12 accesses and executes the control program 72 on the master EKE 70 to implement the recovery process. Specifically, the processor 30, under control of program 72, determines 800, 802 (FIG. 4*a*) whether the UAS 12 and the master EKE 70 are new. In the present scenario, the processor 30 will find that the UAS 12 is new but that the master EKE 70 is not new. Given these conditions, processor 30 will branch to step 860 to implement the UAS restoration process.

Figure 4C:
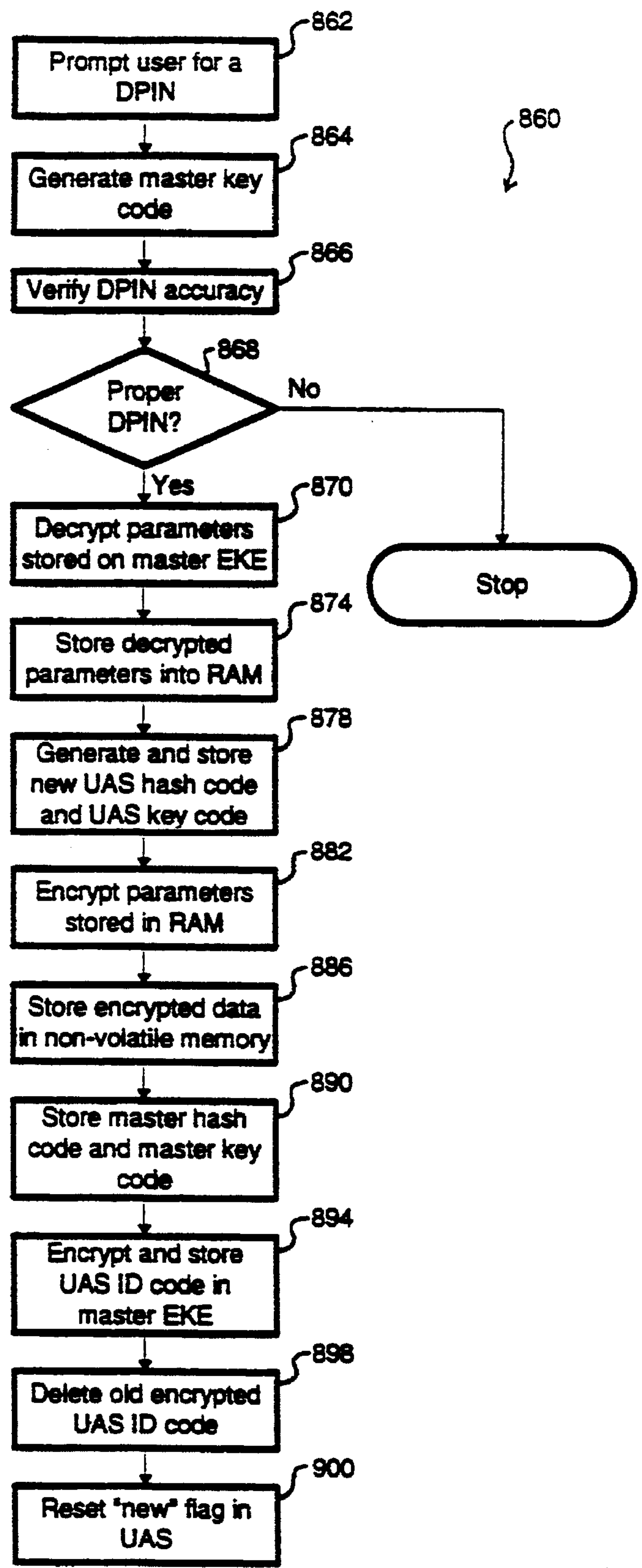
Figure 4D:
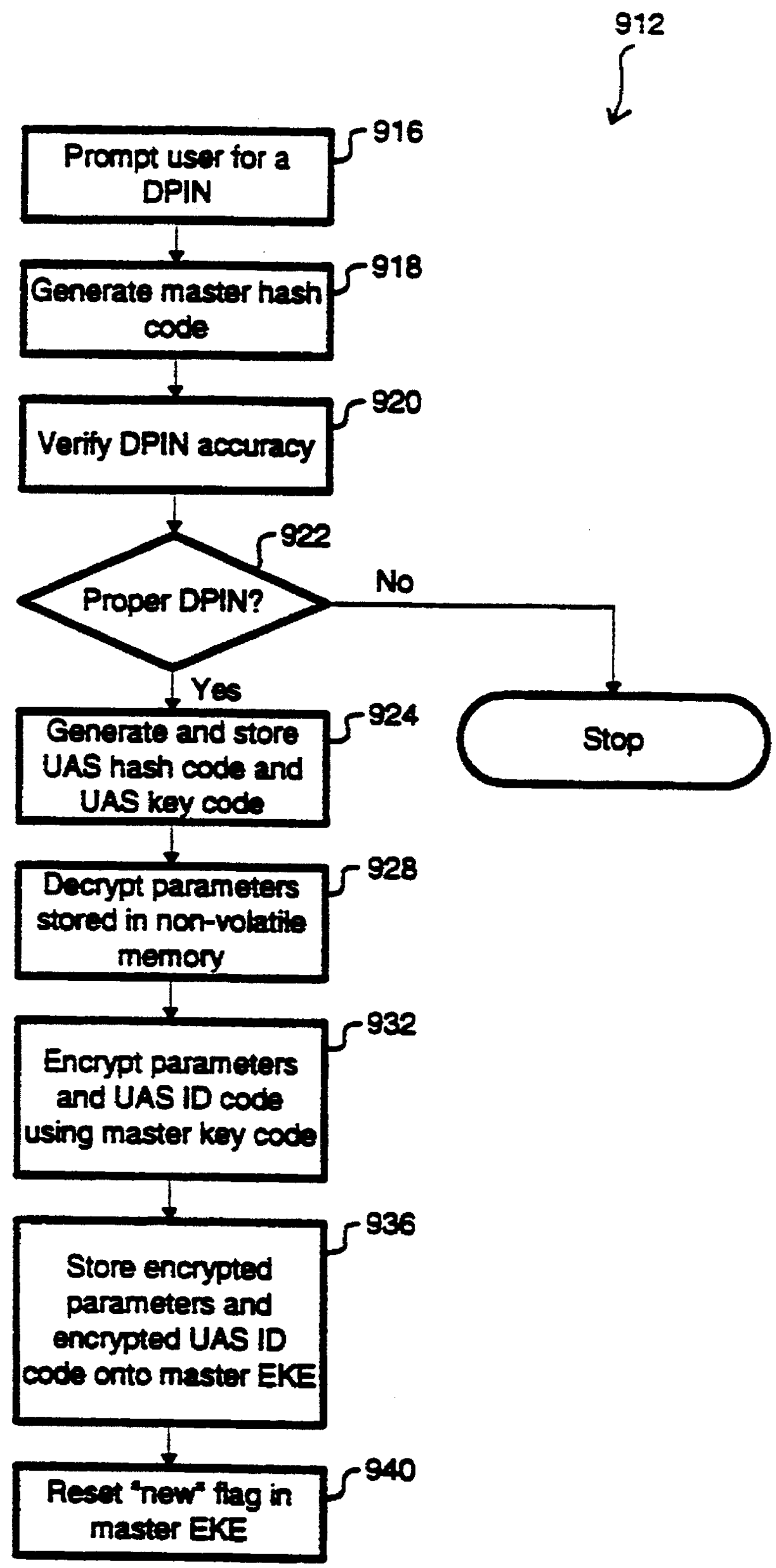
Figure 4E:
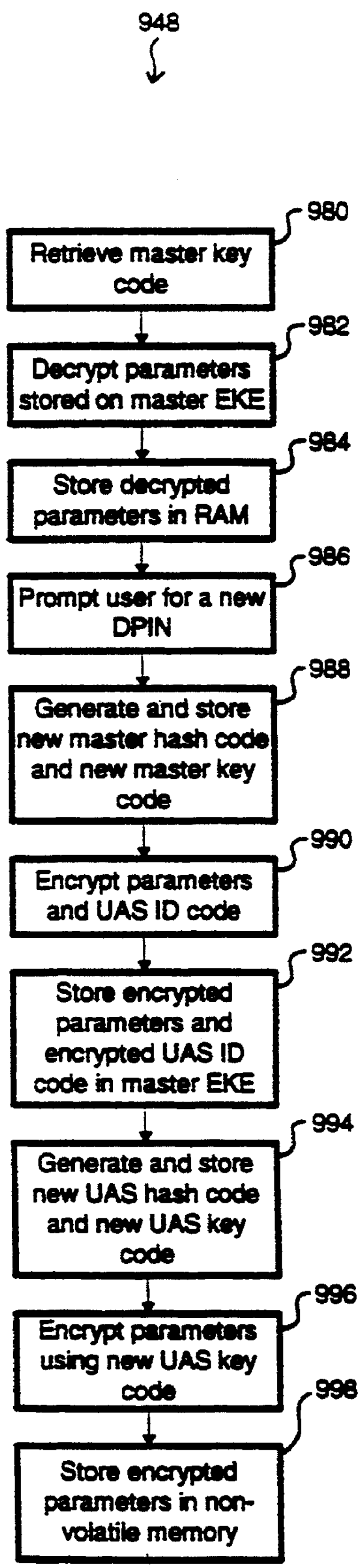

Step 860 is shown in greater detail in FIG. 4*c*. The UAS recovery process begins with the processor 30 prompting 862 the user for a DPIN. Once the DPIN is received from the user via the keyboard subsystem 52, the processor 30 uses the DPIN to generate 864 a master key code. Preferably, step 864 is performed by first executing the hash code generation logic stored in section 62 of the new UAS 12 (which preferably causes the SHA previously discussed to be implemented) to generate a master hash code. Then, using the master hash code as input, processor 30 implements a selected key generation algorithm to generate a master key code. Preferably, the key generation algorithm implemented in this process is the same as that previously described in connection with step 814 of FIG. 4*b*.

Once generated, the master key code is used by processor 30 to verify 866 the accuracy of the DPIN provided by the user. The DPIN verification process 866 involves four major steps. First, processor 30 uses the generated master key code to decrypt the encrypted UAS ID code stored in section 74 of the master EKE 70 to derive a decrypted UAS ID code. This step is preferably carried out by executing the encryption modules 56. Thereafter, processor 30 combines the decrypted UAS ID code with the DPIN to derive a modified DPIN. Then, using the modified DPIN as input, processor 30 executes the hash code generation logic in section 62 of the non-volatile memory 38 to generate a UAS hash code. Finally, processor 30 compares the generated UAS hash code with the UAS hash code already stored on the master EKE 70 to determine whether they are consistent. If they are not consistent, then it means that an improper DPIN was entered by the user. In such a case, processor 30 terminates operation. On the other hand, if processor 30 determines that the two hash codes are consistent, thereby meaning that the proper DPIN was entered, then UAS restoration is allowed to continue.

If it is determined that the proper DPIN was entered, then processor 30 proceeds to step 870 to decrypt the encrypted recognition and comprehension parameters stored in section 76 of the master EKE 70. Preferably, processor 30 decrypts the encrypted parameters by executing encryption modules 56, using the master key code as the decryption key. Once decrypted, the operational key codes and key file names are stored 874 in the RAM 40 of the new UAS 12.

Thereafter, processor 30 proceeds to step 878 to generate a new UAS hash code and a new UAS key code. In generating the new UAS hash code, processor 30 first derives a new modified DPIN by combining the new UAS ID code stored in section 62 of the new UAS 12 with the DPIN. Once the new modified DPIN is derived, processor 30 generates the new UAS hash code by executing the hash code generation logic stored in section 62 of the new UAS, using the new modified DPIN as input. Once generated, the new UAS hash code is stored in section 74 of the master EKE 70 replacing the old UAS hash code which is currently residing therein. Then, using the new UAS hash code as input, processor 30 implements a key generation algorithm to generate a new UAS key code. Preferably, the key generation algorithm used in this process is the same as that previously described in connection with step 818 of FIG. 4*b*. Note that the new UAS key code will be different from that used by the lost UAS. This is because the new modified DPIN used to generate the new UAS key code is different (due to the different UAS ID code) from the modified DPIN used to generate the UAS key code used by the lost UAS. This different UAS key code will not prevent the new UAS from achieving identical functionality, however.

Once the new UAS key code is derived, it is stored in RAM 40 of the new UAS 12 for subsequent reference. It is also used by processor 30 to encrypt 882 the operational key codes stored in RAM 40. Preferably, step 882 is carried out by executing the encryption modules 56, using the new UAS key code as the encryption key. After the operational key codes are encrypted, processor 30 stores 886 the operational key file names and the encrypted operational key codes (i.e. the encrypted recognition and comprehension parameters) into section 60 of the non-volatile memory 38 of the new UAS 12 for subsequent reference.

To complete the UAS restoration process, processor 30 preferably carries out four more steps. First, processor 30 stores 890 the previously generated master hash code and master key code into section 62 of the non-volatile memory 38 for subsequent reference. Second, processor 30 encrypts 894 the new UAS identification code stored in section 62 of the non-volatile memory 38 using the master key code as the encryption key, and thereafter stores the encrypted new UAS ID code into section 74 of the master EKE 70. Third, processor 30 preferably deletes 898 the encrypted UAS identification code of the lost UAS from section 74 of the master EKE 70. Finally, processor 30 resets 900 the "new" flag on the new UAS to indicate that the UAS has now been initialized. The UAS restoration process is now complete.

Master EKE Recovery

Another loss/recovery scenario which may arise is one in which the user loses the master EKE 70. If the user still has the UAS 12, and still remembers the DPIN, a new master EKE 70 can be configured to function in the same manner as the lost master EKE. To properly configure a new master EKE, the new master EKE 70 is inserted into interface 32 of the UAS 12. Thereafter, the processor 30 accesses and executes the control program 72 on the new master EKE. Under control of program 72, processor 30 begins processing by determining 800, 910 (FIG. 4*a*) whether the UAS 12 and the new master EKE 70 are new. In this particular instance, the processor 30 will find the UAS 12 to be already initialized but the master EKE 70 to be new. Given these conditions, the processor 30 will branch to step 912 to implement the master EKE restoration process. Step 912 is shown in greater detail in FIG. 4*d*.

Processor 30 preferably begins the restoration process 912 by prompting 916 the user for a DPIN. When the DPIN from the user is received via the keyboard subsystem 52, processor 30 uses the DPIN to generate 918 a master hash code. Processor 30 preferably generates the master hash code by executing the hash code generation logic stored in section 62 of the non-volatile memory 38, using the DPIN as input. Once generated, the master hash code is used to verify 920 the accuracy of the DPIN. Processor 30 preferably carries out step 920 by comparing the generated master hash code with the master hash code already stored in section 62 of the non-volatile memory 38. If the two hash codes are inconsistent, then it means that an improper DPIN was entered by the user. In such an instance, processor 30 terminates operation. On the other hand, if the two hash codes are consistent, then the validity of the DPIN is verified and the master EKE restoration process is allowed to continue.

If the proper DPIN was entered, then processor 30 proceeds to step 924 to generate a UAS hash code and a UAS key code. In generating the UAS hash code, processor 30 preferably performs several sub-steps. First, processor 30 combines the UAS identification code stored in section 62 of the non-volatile memory 38 with the DPIN to derive a modified DPIN. Then, processor 30 uses the modified DPIN to generate the UAS hash code. Preferably, the UAS hash code is generated by executing the hash code generation logic stored in section 62, using the modified DPIN as input. Once generated, the UAS hash code is preferably stored in section 74 of the new master EKE 70. Thereafter, processor 30 generates the UAS key code by implementing the key generation algorithm described above in connection with step 818 of FIG. 4*b*, using the generated UAS hash code as input. Once the UAS key code is derived, it is stored in RAM 40. Thereafter, processor 30 uses the UAS key code to decrypt 928 the encrypted recognition and comprehension parameters stored in section 60 of the non-volatile memory 38. Step 928 is preferably carried out by executing modules 56. The operational key codes are thus decrypted and derived. Once decrypted, the operational key codes and the operational key file names are stored in RAM 40.

After step 928, processor 30 prepares to store the recognition and comprehension parameters onto the new master EKE 70. Before storing the parameters, though, processor 30 preferably first reencrypts 932 the recognition and comprehension parameters (i.e. the operational key file names and operational key codes) stored in the RAM 40 using a master key code as the encryption key. The master key code may be retrieved from section 62 of the non-volatile memory or, if so desired, may be newly generated using the DPIN. In addition, processor 30 also preferably encrypts the UAS identification code stored in section 62 of the non-volatile memory 38 using the master key code as the encryption key. Once step 932 is carded out, processor 30 stores 936 the encrypted recognition and comprehension parameters into section 76 of the new master EKE 70, and the encrypted UAS identification code into section 74 of the new master EKE 70. The new master EKE 70 is now configured to function in the same manner as the lost master EKE. All that remains for the processor 30 to do is to reset 940 the "new" flag on the master EKE 70 to indicate that the master EKE is no longer uninitialized. Once that is done, the master EKE restoration process is complete.

DPIN Modification/Recovery

One other loss/recovery scenario to be considered is the one in which the user forgets the DPIN used to generate the master and UAS key codes. As made clear by the above discussions, the DPIN plays a vital role in the proper encryption and decryption of the recognition and comprehension parameters. To recover from the loss of the DPIN, the user will need to have both the original UAS 12 and the original master EKE 70. The user initiates the recovery process by inserting the master EKE 70 into interface 32 of the UAS 12. Thereafter, the processor 30 accesses and executes the control program 72 on the master EKE 70 to implement the recovery process. As shown in FIG. 4*a*, processor 30, under control of program 72, begins operation by determining 800, 910 whether the UAS 12 and the master EKE 70 are new. In this particular instance, neither component is new; hence, processor 30 will proceed to step 942.

In step 942, processor 30 implements a recognition methodology to determine whether the UAS 12 and the master EKE 70 are authorized to interact with each other at all. Preferably, processor 30 carries out step 942 by first retrieving the master key code previously stored in section 62 of the non-volatile memory 38. Thereafter, processor 30 uses the master key code to decrypt the encrypted UAS identification code stored in section 74 of the master EKE 70. Once decrypted, the UAS identification code from the master EKE 70 is compared with the UAS identification code stored in section 62 of the non-volatile memory 38. If the two codes are not consistent, then the two components 12, 70 are not authorized to interact with each other. Hence, communication therebetween is terminated. On the other hand, if the two codes are consistent, then authorization is verified, and the processor 30 is allowed to proceed to step 946.

It is in steps 946 and 948 that the user is allowed to override the current DPIN and to establish a new DPIN. Specifically, in step 946, processor 30 queries the user as to whether the user wishes to set a new DPIN. If so, then processor 30 implements the DPIN modification process 948. Step 948 is shown in greater detail in FIG. 4*e*, wherein the first step in the DPIN modification process is to retrieve 980 the master key code previously stored in section 62 of the non-volatile memory 38. Once retrieved, this master key code is used by the processor 30 to decrypt 982 the encrypted recognition and comprehension parameters stored in section 76 of the master EKE 70. The recognition and comprehension parameters (i.e. the operational key codes and operational key file names) are thus derived. Once derived, the parameters are stored 984 in RAM 40 for subsequent reference.

Thereafter, processor 30 prompts 986 the user for a new DPIN with which to replace the forgotten DPIN. Upon receiving the new DPIN via the keyboard subsystem 52, processor 30 proceeds to generate 988 a new master key code. Preferably, processor 30 generates the new master key code in two steps. First, processor 30 executes the hash code generation logic stored in section 62 of the non-volatile memory 38, using the new DPIN as input, to generate a new master hash code. This new master hash code is stored in section 62 of the non-volatile memory 38, preferably replacing the master hash code currently stored therein. Then, using the new master hash code as input, processor 30 implements a key generation algorithm to generate a new master key code having a desired length. Preferably, the key generation algorithm implemented here is the same as that previously described in connection with step 814 of FIG. 4*b*. Once generated, the new master key code is preferably stored both in section 62 of the non-volatile memory 38 and in RAM 40. Thereafter, the new master key code is used by the processor 30 to encrypt 990 both the parameters stored in the RAM 40 and the UAS identification code stored in section 62 of the non-volatile memory 38. Once that is done, processor 30 stores 992 the encrypted recognition and comprehension parameters into section 76 of the master EKE 70, and the encrypted UAS identification code into section 74 of the master EKE 70. Preferably, once this new encrypted information is stored in sections 74 and 76, the information previously stored in these same sections is deleted. Master EKE 70 is thus updated.

A similar process is performed by processor 30 to update the UAS 12. Specifically, processor 30 begins the UAS updating process by generating 994 a new UAS hash code and a new UAS key code. Preferably, processor 30 generates the new UAS hash code by combining the UAS identification code stored in section 62 with the new DPIN to derive a modified DPIN. Then, using the modified DPIN as input, processor 30 executes the hash code generation logic stored in section 62 of the non-volatile memory 38 to generate the new UAS hash code. Once generated, the new UAS hash code is stored in section 74 of the master EKE 70, preferably replacing the UAS hash code previously stored therein. Thereafter, processor 30 uses the new UAS hash code to generate the new UAS key code. Preferably, processor 30 generates the new UAS key code by implementing a key generation algorithm, using the new UAS hash code as input. The key generation algorithm implemented here is preferably the same as that previously described in connection with step 818 of FIG. 4*b*. Once the new UAS key code is generated, it is stored in RAM 40 and is used as an encryption key by processor 30 to encrypt 996 the recognition and comprehension parameters stored in the RAM 40. Once that is performed, processor 30 stores 998 the encrypted recognition and comprehension parameters into section 60 of the non-volatile memory 38 for future reference. As an additional step, processor 30 preferably deletes the encrypted parameters previously stored in section 60. After step 998 is performed, the DPIN modification process is complete. As shown by this discussion, the system of the present invention is quite robust in that it can recover from the loss of any one of these three components: UAS, master EKE, and DPIN.

Other Functions of the Master EKE

Thus far, the master EKE control program 72 has been described as being used only in the initialization and recovery processes. However, as shown in FIG. 4*a*, control program 72 is also capable of performing several other functions. One such function is that of override. More specifically, steps 954 and 956 may be implemented (if a user so wishes) to change the recognition and comprehension parameters currently stored in the UAS 12 and the master EKE. New operational key codes and operational key file names may be generated in much the same manner as that described in conjunction with FIG. 4*b*. Hence, step 956 need not be described in detail here.

Another additional function performed by the master EKE control program 72 is that of data backup. Note that the recognition and comprehension parameters are encrypted and stored not only in the UAS 12 but also in the master EKE 70. This extra storing procedure is performed to ensure that, if the information stored in UAS 12 is somehow lost or erased, the information can be restored by consulting the master EKE 70. Steps 950–952 of FIG. 4*a* deal with this backup aspect of the master EKE control program 72. Whenever program 72 is executed by processor 30, the user is given an option 950 to restore information into the UAS 12. If the user chooses this option, then processor 30 preferably performs step 952, which involves a series of sub-steps. In carrying out step 952, processor 30 first uses the master key code stored in section 62 of the UAS 12 to decrypt the encrypted parameter information stored in section 76 of the master EKE 72. The parameters, thus decrypted, are stored in RAM 40. Then, processor 30 prompts the user for a DPIN. Upon receiving the DPIN, the processor 30 generates a master hash code in the manner described above. Once generated, this master hash code is used to verify the validity of the entered DPIN. More specifically, the generated master hash code is compared with the master hash code stored in section 62 of the non-volatile memory 38. If the two hash codes are consistent, then it is verified that the entered DPIN is accurate. After the DPIN is verified, processor 30 generates a UAS key code. This is preferably achieved by first generating a UAS hash code, and then using the UAS hash code to generate the UAS key code, in the manner described above. Once generated, the UAS key code is used as an encryption key to encrypt the parameters stored in RAM 40. Once that is done, processor 30 stores the encrypted parameters into section 60 of the non-volatile memory 38. Data restoration is thus achieved.

One further point should be noted regarding the data backup aspect of the control program 72. In normal use, the UAS 12 is operated without the master EKE 70. Also, in normal operation, the recognition and comprehension parameters stored in section 60 of the non-volatile memory 38 of the UAS 12 can be updated. Thus, at times, section 60 of the non-volatile memory 38 will contain fresh or updated information that is not stored on the master EKE 70. Preferably, processor 30 sets a "new data" flag whenever any new or modified data is stored in section 60, and whenever existing data is deleted from section 60. That way, whenever the master EKE 70 is inserted and the master EKE control program 72 is executed, the processor 30 can check 958 for the "new data" flag, and if the flag is set, then processor 30 can store 960 the updated data from section 60 into the master EKE 70. Preferably, processor 30 performs step 960 by first generating a UAS key code in the manner described above. Then, the UAS key code is used to decrypt all of the encrypted parameters stored in section 60 of the non-volatile memory 38. Once that is done, the decrypted recognition and comprehension parameters are stored in RAM 40. Thereafter, processor 30 uses the master key code stored in section 62 of the non-volatile memory 38 to encrypt the decrypted parameters in the RAM 40. Then, processor 30 stores the newly encrypted recognition and comprehension parameters into section 76 of the master EKE 70, preferably replacing the parameters previously stored therein. The master EKE 70 is thus updated. Once the new data is backed up onto the master EKE 70, processor 30 resets the "new data" flag. By updating the master EKE 70 in this manner, the master EKE control program 72 optimizes the master EKE's ability to function effectively as a backup device.

UAS Start-up

Figure 4F:
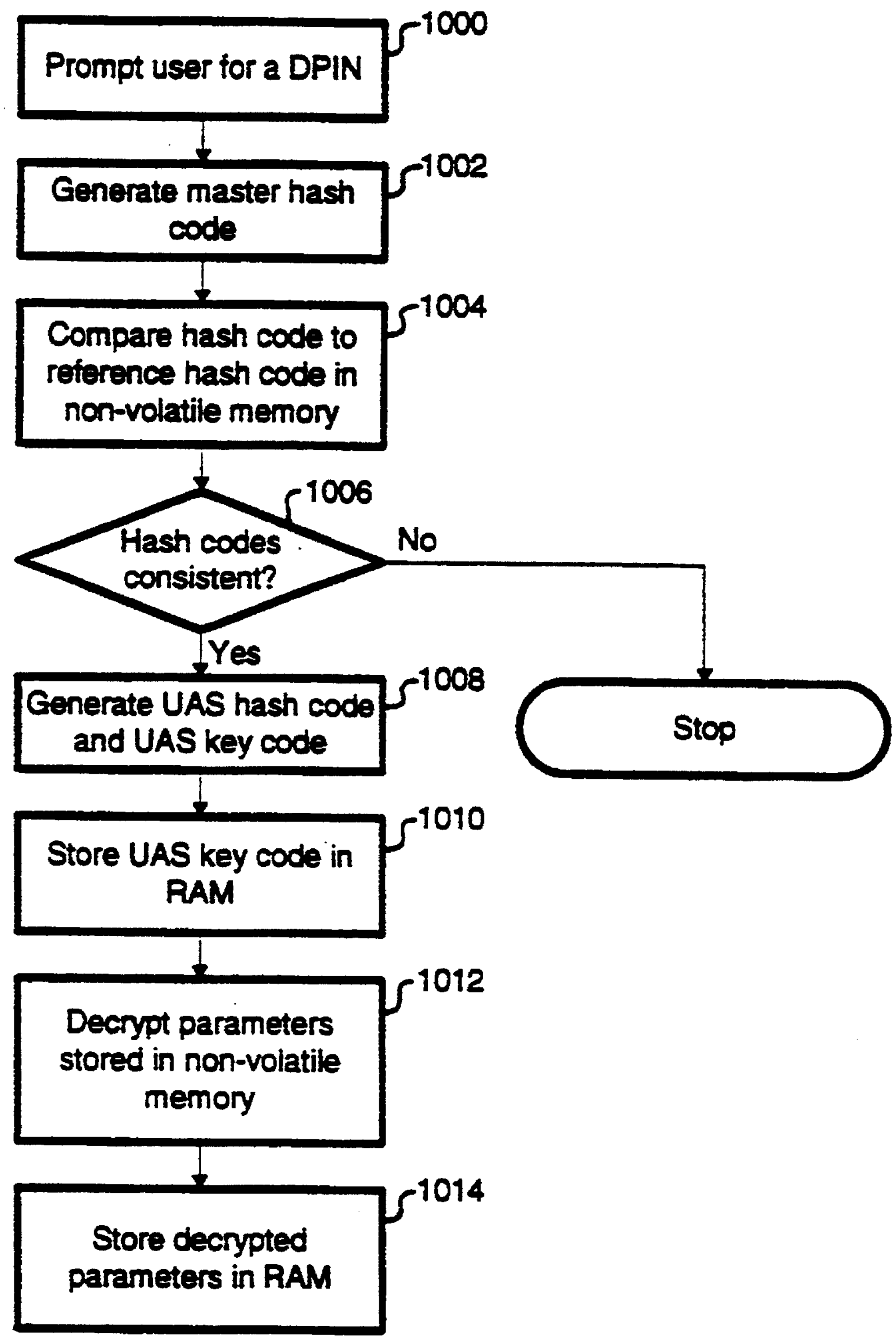
FIG. 4f is an operational flow diagram for the decryption logic stored in section 62 of the non-volatile memory 38 of the UAS 12.

Once UAS 12 is initialized as described above, the master EKE 70 is decoupled from the storage device interface 32 of the UAS 12. The UAS 12 is thereafter able to receive a regular EKE 14 through interface 32. Recall that when the UAS 12 was initialized, the recognition and comprehension parameters were stored in section 60 of the non-volatile memory 30 in encrypted form. Before these parameters can be used in actual operation, they first need to be decrypted. This decryption function is preferably performed by the processor 30 under control of the decryption logic stored in section 62 of the non-volatile memory 38 each time the UAS is powered up. A flow diagram for this decryption logic is shown in FIG. 4*f*. With reference to FIG. 4*f*, processor 30 begins the decryption process by prompting 1000 the user to enter a DPIN. Once the DPIN is received via the keyboard subsystem 52, processor 30 uses the DPIN to generate 1002 a master hash code. Preferably, processor 30 generates the master hash code by executing the hash code generation logic stored in section 62 of the non-volatile memory 38, using the DPIN as input. Once generated, the master hash code is compared 1004 with the master hash code stored in section 62 of the non-volatile memory 38. If the two hash codes are inconsistent, then it means that an improper DPIN was entered by the user. In such a case, processor 30 terminates operation to prevent an unauthorized user from using the UAS 12. On the other hand, if the two hash codes are consistent, then processor 30 proceeds to step 1008.

In step 1008, processor 30 uses the DPIN to generate a UAS key code. More specifically, processor 30 preferably first combines the UAS ID code stored in section 62 of the non-volatile memory 38 with the DPIN to derive a modified DPIN. Then, using the modified DPIN as input, processor 30 executes the hash code generation logic stored in section 62 to generate a UAS hash code. Once generated, the UAS hash code is used by processor 30 to generate a UAS key code. More specifically, processor 30 implements a key generation algorithm (preferably the same as that discussed above with regard to step 818 of FIG. 4*b*) using the UAS hash code as input to generate a UAS key code having a desired length. Once generated, the UAS key code is stored 1010 in RAM 40 for subsequent reference. Thereafter, processor 30 uses the UAS key code as a decryption key to decrypt 1012 the recognition and comprehension parameters stored in section 60 of the non-volatile memory 38. Preferably, processor 30 carries out step 1012 by executing the encryption modules 56. Once decrypted, the recognition and comprehension parameters (i.e. the operational key file names and operational key codes) are stored 1014 in the RAM 40 of the UAS 12. The parameters are now in a form which can be used in normal operation. Thus, the UAS 12 is now ready for operation with a regular EKE 14. One additional point to note is that because the decrypted parameters and the UAS key code are stored in the volatile RAM 40 of the UAS 12, this information will be lost when the UAS 12 is deactivated. This means that the decrypted parameters and the UAS key code will need to be newly generated the next time the UAS 12 is used. Hence, processor 30 preferably executes the decryption logic stored in section 62 of the non-volatile memory 38 each time the UAS 12 is powered up.

Thus far, the process (shown in FIG. 4) of verifying the accuracy of the DPIN and of decrypting the recognition and comprehension parameters has been described as being implemented by processor 30 under control of the decryption logic in section 62 of the non-volatile memory 38. It should be noted, however, that the process shown in FIG. 4*f* may also be implemented by way of a hardwired circuit. The design of such a circuit, given FIG. 4*f*, is within the skill of one of ordinary skill in the art. Such an implementation is within the contemplation of the present invention.

EKE

Figure 6:
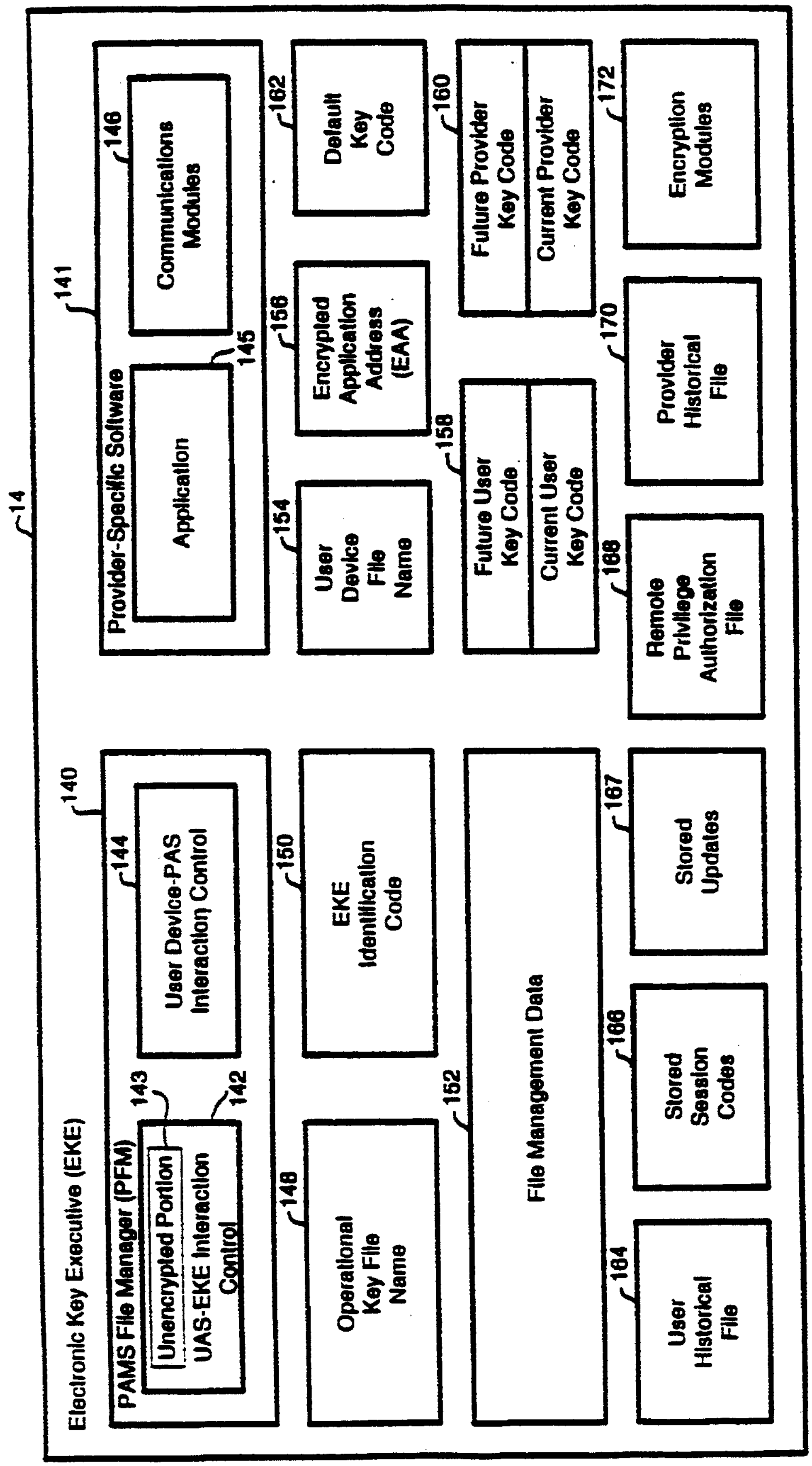
FIG. 6 is a detailed block diagram of the storage device (EKE) 14 of the present invention illustrating the programs 140, 141, 172 and the data files 148–170 stored on the EKE 14.

Once the UAS 12 is powered up, and the recognition and comprehension parameters are decrypted and stored in RAM 40, the UAS 12 is ready to interact with a regular EKE. With reference to FIG. 6, there is shown a detailed block diagram of an EKE 14 of the present invention. In the preferred embodiment. EKE 14 takes the form of a PCMCIA memory card having a PCMCIA interface (not shown) for coupling to interface 32 of the UAS 12. As shown in FIG. 6, EKE 14 preferably stores a plurality of dam files 148–170, and at least two control programs: (1) the PAMS file manager (PFM) 140; and (2) the provider-specific software 141. Optionally, EKE 14 may store a third control program 172 (the encryption modules) which may be executed to perform encryption/decryption functions.

On EKE 14, the PFM 140 is the main program which is accessed and executed by processor 30 to coordinate interaction among all of the components 12, 14, 16, 18 of the system 10. PFM 140 preferably comprises a UAS-EKE interaction control portion 142 for controlling interaction between the UAS 12 and the EKE 14, and a user device-PAS control portion 144 for coordinating interaction between a user device (formed by UAS 12 and EKE 14) and the PAS 18. Control portion 142 is the portion which is accessed and executed first by processor 30.

When executed, control portion 142 preferably causes processor 30 to perform a number of different functions. First, portion 142 causes processor 30 to implement a recognition methodology to verity that UAS 12 and EKE 14 are authorized to interact with each other. If interaction is not authorized, then portion 142 terminates communication with the UAS 12. This verification function is important because it renders an EKE 14 usable with only one particular UAS 12 (referred to herein as the "principal UAS"). This means that if the EKE 14 is lost or stolen, system security is not compromised because the holder of the lost or stolen EKE 14 will not be able to use the EKE with his own UAS 12.

Thus, control portion 142 greatly enhances system security. Second, portion 142 causes processor 30 to strictly coordinate access to the other resources stored on the EKE 14, such as the managed files 154–164, 170. This adds an extra layer of protection, just in case a user is somehow able to obtain authorization fraudulently. Third, portion 142 causes processor 30 to coordinate the encryption and decryption of data stored in the files 154–164, 170. This encryption or comprehension function ensures that even if the EKE 14 is lost, no comprehensible information can be extracted therefrom. Fourth, portion 142 causes processor 30 to coordinate the dynamic alteration and update of the parameters used in the above three functions. By dynamically and regularly changing these parameters, portion 142 makes, it virtually impossible for anyone to ascertain, at any particular time, what parameters are being used. This in turn makes it extremely difficult to "break in" to the system 10. Therefore, portion 142 of PFM 140 ensures the security of the EKE 14.

PFM 140 also preferably comprises a user device-PAS interaction control portion 144 for coordinating interaction between the user device 16 and the PAS 18. Control portion 144, when executed by processor 30, preferably causes the processor 30 to properly coordinate the exchange of information with the PAS 18. In performing this coordination function, portion 144 preferably causes the user device 16 to implement the unique recognition and comprehension methodologies of the present invention, in conjunction with the provider device 18, to verity party identities and to ensure session security. By so doing, portion 144 ensures that only proper devices will be allowed to communicate with each other, and that information transferred between the user device 16 and the PAS 18 will be secure from third parties. Together, portions 142 and 144 coordinate the overall secure operation of the UAS-EKE assembly.

The provider-specific software 141 on the EKE 14 provides the program instructions necessary for communicating with a particular provider or a particular group of providers. Program 141 preferably includes an application portion 145 for generating the messages or session codes which are sent to the PAS 18, and a communications portion 146 for organizing the information sent to the PAS 18 in a manner expected by the PAS 18. These program portions 145, 146 are executed under the direction of portion 144 of the PFM 140. As the name suggests, provider-specific software 141 is preferably tailored to communicate with one or a group of specific providers. Consequently, the application 145 and the communications 146 portions can and probably will be customized for each provider, which means that software 141 will vary from EKE to EKE. In contrast, the PFM 140, because it is not necessarily provider-specific, may be identical for all EKE's. In the preferred embodiment shown in FIG. 6, there is only one provider-specific program 141 stored on the EKE 14. However, if so desired, an EKE 14 may store more than one provider-specific program to allow a user to communicate with a plurality of providers using only one EKE 14. Such a modification is within the scope of the present invention.

The data files, also referred to herein as storage units, 148–170 on the EKE 14 contain user-specific (i.e. EKE-specific) data which are manipulated by PFM 140 in carrying out its recognition and comprehension methodologies. More specifically, PFM 140 uses the information in these data files 148–170 to determine whether the UAS 12 and the EKE 14 are authorized to interact, to manage access and updates to files on the EKE 14, and to communicate with the PAS 18. Some of the information in the data files or storage units will be provided by the provider, while some of the information will be generated by the PFM 140. More will be said about data files 148–170 in later sections as the operation of the UAS 12, the EKE 14, and the PAS 18 is described.

Protection of the Information on the EKE

In the preferred embodiment, the EKE 14 is a portable, compact memory card. As such, the EKE 14 is quite easy to lose. To prevent a third party from being able to extract useful information from a lost EKE 14, selected files and programs on the EKE 14 are preferably stored encrypted at all times. Portions of the EKE 14 which are encrypted include: (1) PFM 140 (except unencrypted portion 143); (2) managed files 152–164; and (3) a portion of file 170. Due to the nature in which some of the fries are used, some of the files on the EKE 14 (e.g. files 148, 150, 167, 168) are left unencrypted. In the preferred embodiment, the provider-specific software 141 is left unencrypted; however, if so desired, software 141 may also be stored on EKE 14 in encrypted form.

The PFM 140 is stored on EKE 14 in encrypted form in order to prevent an unauthorized party from tampering with, and thereby altering, the program instructions. Note, however, that not all of the PFM 140 is stored in encrypted form. A relatively small portion 143 of the UAS-EKE control portion 142 is left unencrypted to allow the processor 30 to initially interface with the EKE 14. The instructions in portion 143 are analogous to boot-up code. To elaborate, when EKE 14 is coupled to interface 32 of the UAS 12, the processor 30 first accesses and executes the unencrypted portion 143 of UAS-EKE control portion 142. Under control of portion 143, processor 30 performs checks to determine whether to proceed further. If certain requirements are met, then processor 30 is allowed to decrypt the remainder of portion 142 and the entirety of portion 144, and to store the decrypted instructions into the RAM 40 of the UAS 12. Thereafter, processor 30 is allowed to execute the decrypted PFM instructions stored in the RAM 40 to carry out the functions dictated by the PFM 140. By managing the PFM 140 in this manner, it is possible to both protect the integrity of the PFM (by encryption) and to provide a convenient interface between the UAS 12 and the EKE 14. With this background information in mind, interaction between the UAS 12 and the EKE 14 will now be described in greater detail.

UAS-EKE Interaction

Figure 7A:
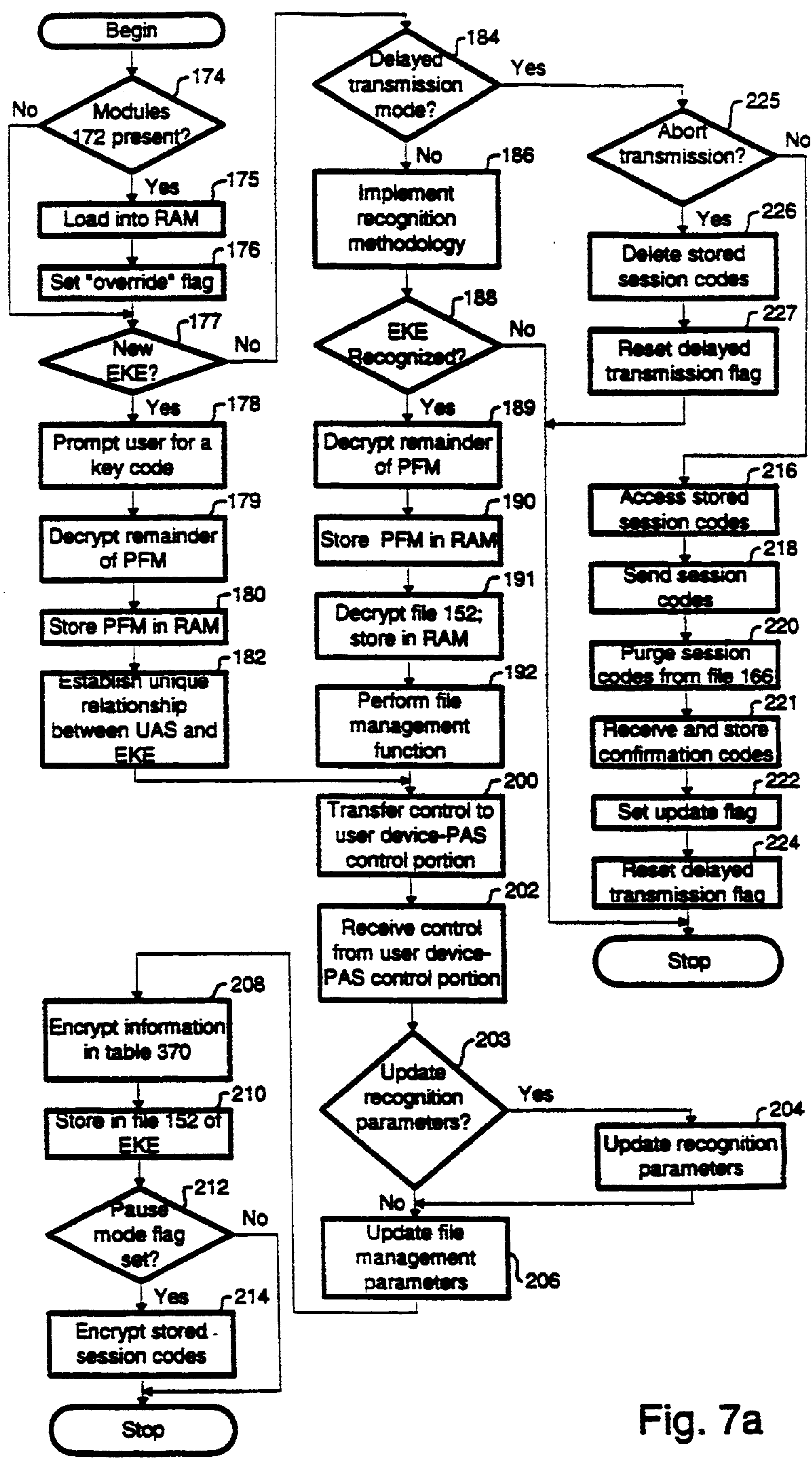
FIGS. 7a is an overall operational flow diagram for the UAS-EKE control portion 142 of the PFM 140.
Figure 7B:
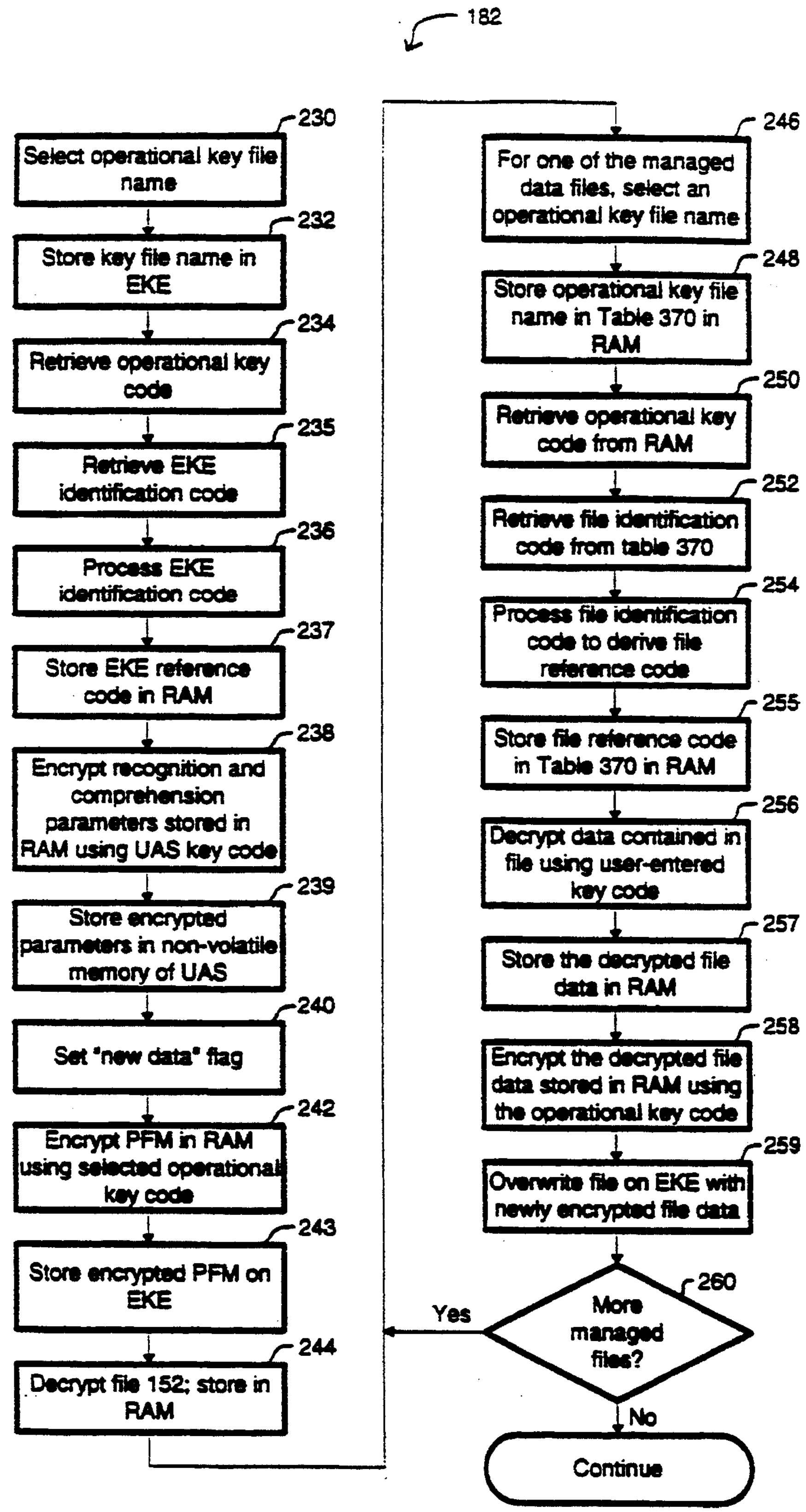
Figure 7C:
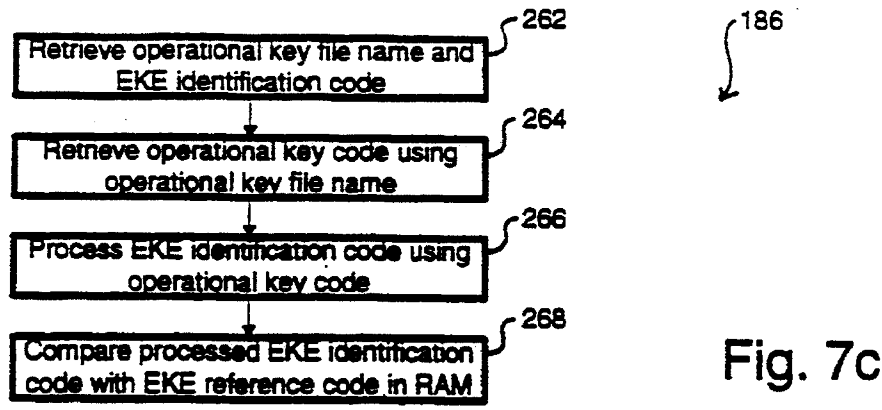

An overall user device 16 is formed by coupling the EKE 14 to the UAS 12 via the storage device interface 32. Once coupled, the processor 30 on the UAS 12 accesses and executes the PFM 140 stored on the EKE 14. More specifically, processor 30 first accesses and executes the unencrypted portion 143 of the UAS-EKE interaction control portion 142. Under control of portion 143, processor 30 begins the process of controlling interaction between the UAS 12 and the EKE 14. To describe portions 143 and 142 in greater detail, reference will now be made to FIGS. **7*a*–7*f*. FIG. 7*a* provides an overall operational flow diagram for portion 142, including those parts which pertain to the unencrypted portion 143, while FIGS. 7*b*–7*f* provide more detailed flow diagrams for selected aspects of portion 142**.

Referring now to FIG. **7*a*, the portions of FIG. 7*a* which pertain to the unencrypted portion 143 include: (1) processes 174–180; (2) processes 184–190; (3) processes 216–224; and (4) processes 225–227. In other words, unencrypted portion 143 comprises the instructions necessary for carrying out processes 174–180, 184–190, 216–224, and 225–227. The remaining processes 191–214** shown in FIG. *7a* pertain to the remainder of the UAS-EKE interaction control portion 142. The instructions necessary for implementing these remaining processes 191–214 are preferably stored on the EKE 14 in encrypted form.

As mentioned above, when EKE 14 is interfaced with UAS 12, processor 30 accesses and executes the unencrypted instructions stored in portion 143. Under control of portion 143, processor 30 begins operation by determining 174 whether encryption modules 172 are stored on the EKE 14. If not, then processor 30 proceeds to step 177. However, if encryption modules 172 are found on the EKE 14, then processor 30 loads 175 the encryption modules 172 into the RAM 40, and sets 176 an "override" flag. If the "override" flag is set, then all subsequent encryption/decryption functions will be carried out by executing the encryption modules stored in RAM 40 instead of executing the encryption modules 56 stored in the UAS 12. This feature of the invention allows a provider to dictate, by storing modules 172 on the EKE 14, the particular encryption algorithm to be used. This is a very useful feature, especially if the encryption modules 56 stored in the UAS 12 become obsolete. For the sake of simplicity, though, it will be assumed for the purposes of description that EKE 14 does not contain a set of overriding encryption modules 172. Thus, the invention will be described hereinafter with reference to the encryption modules 56 in the UAS 12.

Initialization of a New EKE

After determining whether to load encryption modules into the RAM 40, processor 30 goes on to step 177, wherein it is determined whether the EKE 14 is new, i.e. uninitialized. Preferably this determination is made by looking for an operational key file name in file 148 of the EKE 14. If no operational key file name is stored in file 148, then the EKE 14 has not yet been used. If EKE 14 is new, then processor 30 proceeds to step 178 to begin implementing an initial decrypting process. To elaborate, when a user first receives an EKE 14, the PFM 140 and the data files 152–164 on the EKE 14 are incomprehensible because they are stored in encrypted form. The key needed to decrypt these files is known only to the provider. This is done in order to protect the information on the EKE 14 from unauthorized third parties during possible transport. When the provider gives the new EKE 14 to the user, the provider also preferably gives the user the key (referred to hereinafter as the "initial key code") used to encrypt the PFM and the data files. For security reasons, separate means are preferably used to convey the EKE 14 and the initial key code to the user so that a third party cannot link the key to the EKE 14. Armed with the initial key code, the user can access the resources on the EKE 14.

Referring again to FIG. *7a*, once it has been determined that the EKE 14 is new, processor 30 prompts 178 the user to provide the initial key code used to encrypt the PFM 140 and the data files 152–164 on the new EKE 14. Once this key code is received from the user via the keyboard subsystem 52, processor 30 uses the key code to decrypt 179 the encrypted portions of the PFM 140, including the encrypted portion of the UAS-EKE control portion 142, and the user device-PAS control portion 144. Preferably, step 179 is carried out by executing encryption modules 56. After the PFM 140 is decrypted, it is stored 180 in its entirety (including the unencrypted portion 143) in RAM 40. FIG. *9a* shows the contents of RAM 40 after this decryption process. As shown. RAM 40 now contains an unencrypted version 1140 of the PFM 140 stored on the EKE 14. The unencrypted PFM 1140 preferably comprises an unencrypted UAS-EKE interaction control portion 1142 which corresponds to portions 143 and 142 on the EKE 14, and an unencrypted user device-PAS interaction control portion 1144 which corresponds to portion 144 on the EKE 14. In addition. RAM 40 also contains a UAS key code and a decrypted version 1160 of the recognition and comprehension parameters stored in section 60 of the non-volatile memory 38. These parameters 1160 were stored in the RAM 40 upon power-up of the UAS 12.

Before going further, it should be noted here that the PFM 140 on the EKE 14 is not altered by this decryption process. The PFM 140 is still stored on EKE 14 in encrypted form. The only unencrypted version of the PFM 140 is in the RAM 40. The PFM 140 on the EKE 14 remains encrypted so that there is never a time at which the PFM 140 is left unprotected.

Once the PFM 140 is decrypted and stored in RAM 40, processor 30 begins executing the unencrypted PFM instructions 1140 stored in the RAM 40. At this point, processor 30 is still controlling interaction between the UAS 12 and the EKE 14. Thus, processor 30 continues operation by executing the unencrypted instructions in portion 1142. Under control of portion 1142, processor 30 proceeds to step 182 to establish a unique relationship between the UAS 12 and the EKE 14. In other words, processor 30 proceeds to initialize the new EKE 14. As an overview, the initialization process has two major objectives. First, the process stores customized recognition data in both the UAS 12 and the EKE 14 to establish a unique relationship between the two components. This serves to render the EKE 14 inoperable with any other UAS 12. Second, the initialization process establishes file management parameters which are used later to coordinate access to the managed files 154–164, 170.

The initialization process is shown in greater detail in FIG. *7b*. Preferably, processor 30 begins the process by selecting 230 one of the operational key file names stored in section 1160 (FIG. *9a*) of the RAM 40. Once selected, the operational key file name is stored 232 in file 148 of the EKE 14. Then, using the selected operational key file name, processor 30 retrieves 234 the operational key code corresponding to the selected operational key file name. For example, with reference to FIG. *5a* (which shows the operational key file names and the operational key codes currently stored in RAM 40), if operational key file $name_1$ is selected, then operational key $code_1$ is retrieved from RAM 40. Thereafter, processor 30 retrieves 235 the EKE identification code from file 150 of the EKE 14, and processes 236 the EKE identification code using the retrieved operational key code. Preferably, the step of processing 236 the EKE identification code entails the encryption of the EKE identification code. This encryption step is preferably Carried out by executing the encryption modules 56 stored in the UAS 12, using the operational key code as the encryption key. Consequently, the product of step 236 is an encrypted EKE identification code. Once derived, the encrypted EKE identification code is stored 237 in section 1160 of the RAM 40. Preferably, the encrypted EKE identification code, otherwise referred to as the EKE reference code, is stored as a record under the selected operational key file name. That is, as shown in FIG. *5b*, if operational key file $name_1$ is the selected key file name, then the EKE reference code is stored as a record under operational key file $name_1$.

By storing the EKE reference code as a record under the selected operational key file name, processor 30 has updated the recognition and comprehension parameters stored in section 1160 of the RAM 40. This change needs to be reflected in section 60 of the non-volatile memory 38. To update section 60, processor 30 preferably first encrypts 238 the parameters stored in section 1160 of the RAM 40 using the UAS key code as the encryption key to derive a new set of encrypted recognition and comprehension parameters. Then, the new encrypted parameters are stored 239 in section 60 of the non-volatile memory 38, preferably replacing the parameters previously stored therein. Section 60 is thus updated. Since section 60 now contains new information, processor 30 preferably sets 240 the "new data" flag to indicate to the master EKE control program 70 (when it is next executed by processor 30) that section 60 now contains new data which should be copied into the master EKE 70 for backup purposes. By carrying out steps 230–240, processor 30 establishes customized recognition data between the UAS 12 and the EKE 14 which may be used later to verify that the components 12, 14 are authorized to interact with each other. In short, the customized recognition data serves to establish a unique relationship between the UAS 12 and the EKE 14.

Thus far, the customized recognition data establishment process has been described as comprising a processing step. That is, the EKE identification code has been described as being processed (encrypted) before being stored under the appropriate operational key file name in the RAM 40. As an alternative, it is possible to establish customized recognition data between the UAS 12 and the EKE 14 without the processing step. More particularly, the establishment process may be carried out as follows. First, one of the operational key file names stored in the RAM 40 is selected. This file name is preferably stored in file 148 of the EKE 14. Then, the EKE identification code stored in file 150 is stored, without encryption, into the file corresponding to the chosen operational key file name. Since the EKE identification code is preferably unique to the EKE 14, customized recognition data is established between the UAS 12 and the EKE 14 by this process. The process just described is less secure than the establishment process previously described but it is a possible alternative.

Encryption of the PFM Stored in RAM

To further cement the unique relationship between the UAS 12 and the EKE 14, a link is preferably formed between the PFM 140 stored on the EKE 14 and the UAS 12. To elaborate, the PFM 140 on the EKE 14 is currently encrypted using the initial key code provided by the provider, as previously explained. This key code is just an arbitrary key code chosen by the provider. There is no link between the initial key code and the UAS 12. To provide this link, the PFM 140 on the EKE 14 is preferably encrypted using one of the operational key codes specific to the UAS 12. In the preferred embodiment, the operational key code used to encrypt the PFM 140 is preferably the same as that used to encrypt the EKE identification code, as discussed in the two previous paragraphs. It should be noted, however, that any of the operational key codes specific to the UAS 12 may be used for this purpose. With this background information in mind, the PFM encryption process will now be described.

Referring again to FIG. *7b*, processor 30 begins the encryption process 242 by retrieving a selected operational key code from RAM 40. In the example used above, operational key $code_1$ was used to encrypt the EKE identification code. Thus, to continue the example, operational key $code_1$ is retrieved here from section 1160 of the RAM 40. Once retrieved, operational key $code_1$ is used by processor 30 as the encryption key to encrypt 242 the unencrypted PFM instructions 1140 currently stored in the RAM 40. Preferably, processor encrypts all of the PFM instructions 1140 stored in the RAM 40 except for those instructions (unencrypted portion 143) pertaining to processes 174–180, 184–190, 216–224, and 225–227 of FIG. *7a*, which are left unencrypted. The product of step 242 is a new encrypted PFM. Once the new encrypted PFM is derived, processor 30 stores 243 the new encrypted PFM 140 onto the EKE 14, preferably replacing the encrypted PFM currently stored thereon. Like the old encrypted PFM, the new encrypted PFM will have an unencrypted portion 143 which is capable of carrying out processes 174–180, 184–190, 216–224, and 225–227 of FIG. *7a*. Unlike the old encrypted PFM, however, the new encrypted PFM is encrypted using one of the operational key codes specific to the UAS 12. Because of this, there now exists a unique link between the new encrypted PFM and the UAS 12. Unless another UAS has the same operational key code stored under the same operational key file name (the probability of which is negligible). no other UAS will be able to decrypt or execute the new encrypted PFM. Thus, even if the EKE 14 is now lost or stolen, the PFM 140 on the EKE 14 is safe from tampering.

At this point, it should be noted that the PFM encryption process described above does not alter the PFM instructions 1140 stored in the RAM 40. The unencrypted PFM instructions in the RAM 40 remain unencrypted, even after the encryption process. Thus, these instructions remain available for execution by the processor 30. All that is changed by the PFM encryption process is the encrypted PFM 140 stored on the EKE 14.

Establishment of File Management Parameters

After storing the new encrypted PFM 140 onto the EKE 14, processor 30 proceeds to establish parameters for use in managing access to the data files 154–164, 170 on the EKE 14. Processor 30 preferably begins the establishment process by decrypting 244 the information stored in file 152 of the EKE 14. Preferably, the information stored in file 152 is decrypted by executing encryption modules 56, using the initial key code provided by the user as the decryption key. Once decrypted, the information from file 152 is stored in RAM 40 for subsequent access and manipulation. Note that this decryption process does not alter file 152 stored on the EKE 14. File 152 remains encrypted.

FIG. 8*a* shows the contents of file 152, stored in RAM 40, after decryption. As shown in FIG. 8*a*, a table 370 of file information is preferably maintained within file 152. For each of the managed data files 154–164, 170, there are six corresponding parameters: (1) a file name: (2) a file address: (3) a file identification code: (4) a file status: (5) an operational key file name: and (6) a file reference code. The file name, file address, and file identification code are preferably assigned by the provider for each of the files 154–164, 170, along with a status flag indicating that the file is closed. However, no operational key file names or file reference codes are assigned by the provider. These parameters need to be established by the UAS 12. Thus, one of the purposes of steps 246–260 is to establish an operational key file name and a file reference code for each of the managed files 154–164, 170. A second purpose is to encrypt the information in each of the managed files 154–164, 170 using an appropriate operational key code. This second purpose will become more clear as steps 246–260 are described.

Processor 30 preferably begins establishing file management data by choosing one of the managed files (file 154, for example) and selecting 246 an operational key file name to associate with the file. This selecting step is preferably carried out by accessing section 1160 of RAM 40, and selecting one of the operational key file names stored therein. For illustrative purposes, it will be assumed that operational key file $name_2$ is selected. Once selected, the operational key file name is stored 248 in table 370 in RAM 40, as shown in FIG. 8b. Thereafter, processor 30 uses the selected operational key file name to retrieve 250 from section 1160 of RAM 40 the operational key code corresponding to the selected operational key file name. In the present example, since operational key file $name_2$ was selected, operational key $code_2$ will be retrieved. After retrieving the operational key code, processor 30 retrieves 252 the file identification code corresponding to file 154 (ID $Code_{154}$), and processes 254 the file identification code using the retrieved operational key code. Preferably, processor 30 carries out processing step 254 by encrypting the file identification code, using the operational key code as the encryption key. The product of processing step 254 is an encrypted file identification code, also referred to herein as a file reference code. Under the current example, the file reference code for file 154 will be an encrypted version of ID $Code_{154}$, encrypted using operational key $code_2$ as the encryption key. Once this file reference code is derived, it is stored 255 in table 370 in RAM 40, as shown in FIG. 8b. With regard to the entries in the "File Reference Code" column of table 370, the [] are used to indicate that the quantity contained therein is encrypted, while the number following the E denotes the operational key code used as the encryption key. Thus, the entry "[ID Code154]E2" indicates that the file reference code was derived by encrypting ID $Code_{154}$ using operational key $code_2$ as the encryption key. By implementing steps 246–255 as described above, an operational key file name and a file reference code are established for file 154.

Steps 246–255 accomplish the first purpose of the file management parameter establishment process. The second purpose, that of re-encrypting the data in a selected managed file 154–164, 170, is accomplished by steps 256–259. Processor 30 preferably begins the re-encrypting process by first decrypting 256 the information stored in the selected data file (file 154 in the present example). Recall that file 154 and the other data files 156–164 on the EKE 14 were initially encrypted using the initial key code chosen by the provider. Thus, to decrypt file 154, processor 30 preferably uses the initial key code (previously provided by the user via keyboard subsystem 52) as the decryption key. Once decrypted, the data from file 154 is stored 257 in RAM 40 for subsequent reference and manipulation. Thereafter, processor 30 reencrypts 258 the data from file 154 using a selected operational key code as the encryption key. Preferably, the operational key code used to re-encrypt the data from a file is the same as that used to derive the file reference code for that file. In the present example, operational key $code_2$ was used to derive the file reference code for file 154. Thus, operational key $code_2$ is preferably used to re-encrypt the data from file 154. After the data from file 154 is re-encrypted, the re-encrypted data is stored 259 back into file 154 on the EKE 14, preferably overwriting the information that was previously stored therein. Thus, after step 259, file 154 on the EKE 14 has been changed. The data in file 154 is no longer encrypted using the initial key code chosen by the provider. Instead, the data is now encrypted using one of the operational key codes specific to the UAS 12. Consequently, a unique relationship is established between file 154 and the UAS 12. Only UAS 12 can now decrypt the information in file 154. The file management parameter establishment process for file 154 is now complete.

After carrying out step 259, processor 30 proceeds to step 260 to determine whether more managed files remain to be processed. If so, then processor 30 loops back to step 246 to repeat the file management parameter establishment process for another managed file. Steps 246–260 are preferably repeated until all of the managed files 154–164, 170 have been processed as described above for file 154. Once all managed files are processed, the EKE initialization process is complete.

At this point, a special aspect of the provider historical file 170 should be noted. As background, the provider historical file 170 acts as a repository for historical information received from the provider. File 170 preferably contains a plurality of historical entries, with each entry having a unique entry designation associated therewith. In the preferred embodiment, each of the historical entries bears provider encryption (i.e. encryption to which the user does not have the encryption key); hence, these entries cannot be understood by the user's UAS/EKE assembly. Since the entries themselves are already encrypted by the provider, processor 30 need not protect them further by encrypting them. The entry designations, on the other hand, do not bear provider encryption. To protect these designations from third parties, processor 30 preferably encrypts the designations in accordance with the method described above. Thus, when a statement is made herein that the provider historical file 170 is encrypted, it should be understood that it is the designations which are being encrypted.

After the file management parameter establishment process has been performed for all of the managed files 154–164, 170, table 370 stored in RAM 40 may resemble that shown in FIG. 8b, wherein each of the managed files has an operational key file name and a file reference code associated therewith. Several points should be noted from FIG. 8b. First, note that the same operational key file name (operational key file $name_2$, for example) may be associated with more than one file. There is no requirement that there be a unique exclusive relationship between a file and its corresponding operational key file name. Second, note that there is no discernible pattern in the association of file with operational key file name. This shows that no constraints are placed on the association of files with operational key file names. Overall, there is great flexibility in selecting the parameters used in the file management process.

The completion of table 370 in RAM 40 is only one of the Consequences of the file management parameter establishment process. A second consequence is that each of the managed files 154–164, 170 on the EKE 14 is overwritten. As discussed above in connection with steps 256–259, once an operational key file name is associated with a file, the data in that file is decrypted and then re-encrypted using the operational key code corresponding to the selected operational key file name. The re-encrypted data is thereafter stored back into the file on the EKE 14, preferably overwriting the data previously stored in the file. Thus, after file management parameters are selected, the information in the managed files 154–164, 170 will no longer be encrypted according to the initial key code provided by the provider. Instead, each managed file will be encrypted according to a particular operational key code.

To illustrate this more clearly, reference will be made to FIG. 8b, which shows that: (1) operational key file $name_2$ is associated with files 154 and 160; (2) operational key file $name_{10}$ is associated with file 156; (3) operational key file $name_{20}$ is associated with files 158 and 162; (4) operational key file $name_{19}$ is associated with file 164; and (5) operational key file $name_{13}$ is associated with file 170. Based on this information, the following conclusions can be drawn with regard to the managed files 154–164, 170 stored on the EKE 14 after the file management parameter establishment process is carried out: (1) the information in files 154 and 160 are now encrypted using operational key $code_2$ as the encryption key; (2) the information in file 156 is now encrypted using operational key $code_{10}$ as the encryption key; (3) the information in files 158 and 162 are now encrypted using operational key $code_{20}$ as the encryption key; (4) the information in file 164 is now encrypted using operational key $code_{19}$ as the encryption key; and (5) the information in file 170 is now encrypted using operational key $code_{13}$ as the encryption key. As this example illustrates, the file management parameter establishment process reencrypts the information in each of the managed files 152–164, 170 using one of the operational key codes stored within the UAS 12. This serves to establish a unique relationship between each of the managed files and the UAS 12. No other UAS 12, unless it has the same operational key codes stored under the same operational key file names, can now decrypt these managed files.

Figure 9A:
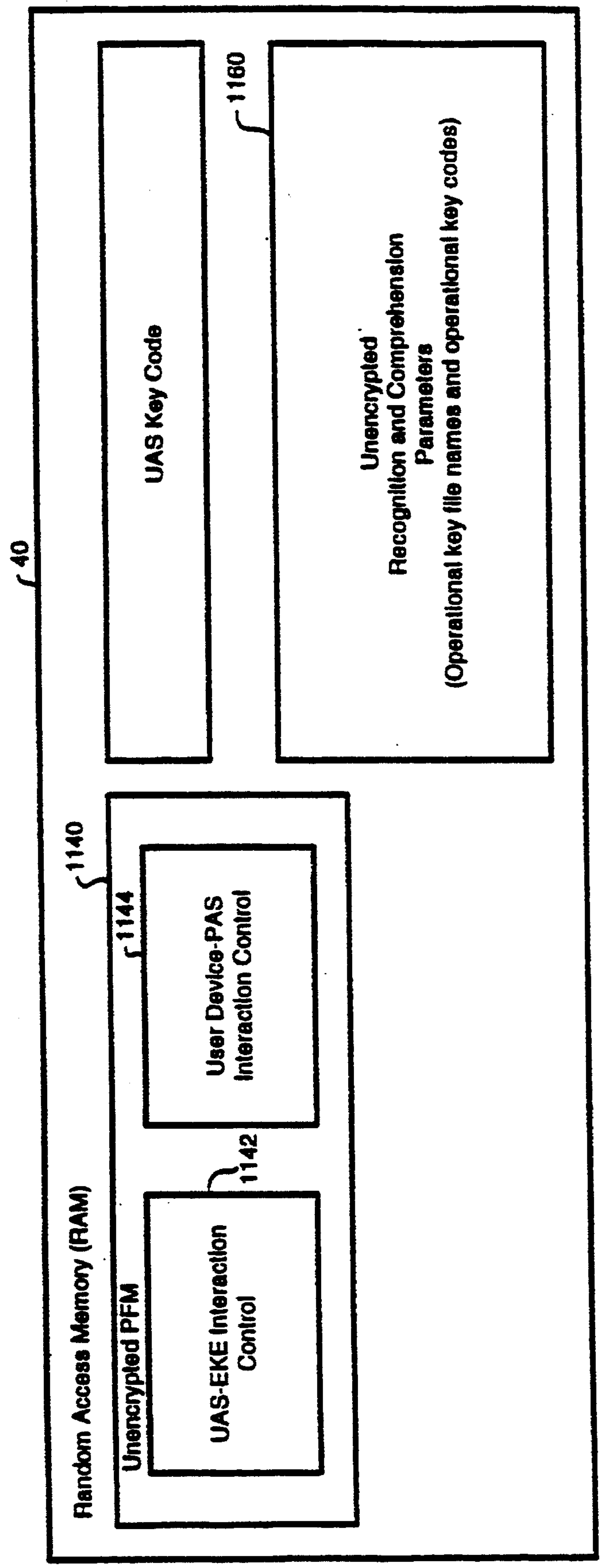
FIG. 9a shows the contents of the RAM 40 after the PFM 140 on the EKE 14 has been decrypted.
Figure 9B:
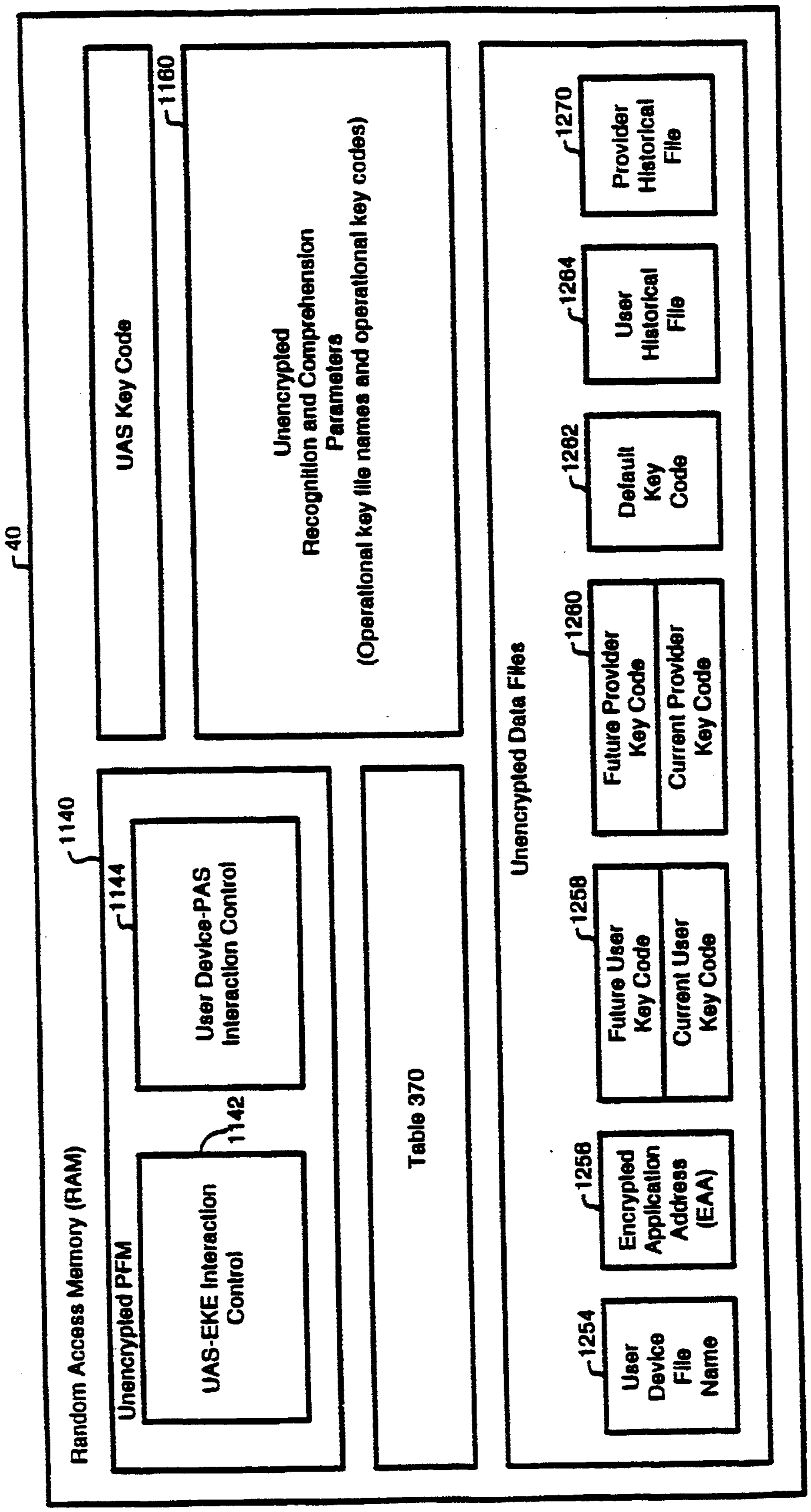
FIG. 9b shows the contents of the RAM 40 after step 192 of FIG. 7a has been performed.

A third consequence of the file management parameter establishment process is the storage of a plurality of unencrypted data files within RAM 40. To elaborate, in steps 257 and 258 of FIG. **7*b*, the information in each of the managed files 154–164, 170 was decrypted and stored in RAM 40. Thus, as shown in FIG. 9*b*. RAM 40 now contains a plurality of unencrypted data files 1254–1264, 1270. These unencrypted data files 1254–164, 1270 correspond to the encrypted data files 154–164, 170 on the EKE 14. That is, unencrypted file 1254 contains an unencrypted version of the information contained in encrypted file 154, unencrypted file 1256 contains an unencrypted version of the information contained in encrypted file 156, and so on. The creation of these data files 1254–1264, 1270 is useful because it provides processor 30 with unencrypted data that it can use in communicating with the PAS 18 and in the file management parameter updating process. Files 1254–1264, 1270** will be discussed in greater detail in later sections.

Post-initialization Activity

Referring again to FIG. **7*a*, after step 182 is completed, the new EKE 14 is fully initialized. After initialization, the UAS-EKE assembly 16 is ready to interact with the PAS 18. Accordingly, in step 200, control is transferred from the UAS-EKE control portion 1142 of the PFM 1140 (FIG. 9*a*) to the user device-PAS control portion 1144 of the PFM 1140. Thereafter, processor 30 executes the unencrypted instructions in portion 1144 to coordinate interaction between the user device 16 and the PAS. Under control of portion 1144, processor 30 may execute the application portion 145 of the provider-specific software 141 to generate messages or session codes to send to the PAS 18. Processor 30 may also execute the communications modules 146 of the provider-specific software 141 to package the session codes in a proper manner. In addition, if the user chooses to actually send the session codes to the PAS 18, then processor 30, under control of portion 1144, coordinates the exchange of information between the user device 16 and the PAS 18. Portion 1144 will be described in greater detail in a later section. Once all of the user device-PAS control functions desired by the user are performed under control of portion 1144, then control is preferably transferred back 202 to the UAS-EKE control portion 1142. In response, processor 30 once again executes the instructions in portion 1142. More specifically, processor 30 resumes performing UAS-EKE control functions by carrying out step 203**.

Updating of the Recognition Parameters

As mentioned above, one of the major objectives of the present invention is to ensure system security. This objective is furthered by dynamically and regularly changing the parameters used in implementing the recognition and comprehension methodologies and in managing the files 154–164, 170. By changing or updating these parameters on a regular basis, any information which is fraudulently obtained will be rendered useful for only a short period of time. Once the parameters are changed, the stolen information will be of little value. Thus, the dynamic alteration of parameters serves to limit the damage caused by intercepted or stolen information. This in turn lessens the incentive to try to steal information from the system 10.

A number of different strategies may be implemented to achieve effective dynamic alteration of parameters. In the preferred embodiment, the processor 30: (1) updates the recognition parameters whenever the user instructs it to do so; and (2) updates the file management parameters each time the UAS 12 and EKE 14 interact. However, if so desired, other strategies may be used, such as updating all of the parameters every time the UAS 12 and EKE 14 interact, or updating the parameters every other time the UAS 12 and EKE 14 interact, or updating the parameters on a random basis. These and other strategies are within the contemplation of the present invention.

Referring again to FIG. **7*a*, once portion 1142 regains control from portion 1144, portion 1142 causes the processor 30 to begin carrying out the updating function. Preferably, processor 30 begins performing this function by querying 203 the user as to whether the user wishes to update the recognition parameters. As used in this discussion, the recognition parameters include the operational key file name stored in file 148 of the EKE 14, and the EKE reference code stored in both section 1160 of the RAM 40 and section 60 of the non-volatile memory 38 (in encrypted form). If the user indicates that he does not wish to update the recognition parameters, then processor 30 proceeds to step 206. However, if the user indicates that updates are desired, then processor 30 branches to step 204 to implement the updates. Step 204 is shown in greater detail in FIG. 7*e***.

Processor 30 preferably begins the updating process by selecting 290 a new operational key file name. This is preferably achieved by accessing section 1160 of RAM 40, and selecting one of the other operational key file names stored therein. For illustrative purposes, it will be assumed that operational key file $name_2$ is selected. Once the new operational key file name is selected, it is stored 290 in file 148 of the EKE 14, preferably replacing the old operational key file name. Thereafter, processor 30 retrieves 292 from section 1160 of RAM 40 the operational key code stored as a record under the new operational key file name. In the current example, operational key $code_2$ will be retrieved. Once retrieved, the new operational key code is used by processor 30 to process 294 the EKE identification code stored in file 150 of the EKE 14. Preferably, in step 294, processor 30 encrypts the EKE identification code using the new operational key code as the encryption key to derive a new encrypted identification code, referred to as the new EKE reference code. The encrypting function is preferably carried out by executing the encryption modules 56. Once derived, the new EKE reference code is stored 296 in section 1160 of the RAM 40 as a record under the new operational key file name. In the present example, the new reference code will be stored as a record under operational key file $name_2$. Once that is done, processor 30 preferably deletes 298 the old EKE reference code stored under the old operational key file name. The update of the recognition parameters is thus complete.

By storing the new EKE reference code, and by deleting the old EKE reference code, processor 30 has changed the recognition and comprehension parameters stored in section 1160 of the RAM 40. This change needs to be reflected in section 60 of the non-volatile memory 38. To update section 60, processor 30 preferably first encrypts 300 the parameters now stored in section 1160 of the RAM 40 using the UAS key code as the encryption key to derive a new set of encrypted recognition and comprehension parameters. Processor 30 then stores 302 the new encrypted parameters into section 60 of the non-volatile memory 38, preferably replacing the parameters previously stored therein. Section 60 is thus updated. Since section 60 now contains new information, processor 30 preferably sets 304 the "new data" flag to indicate to the master EKE control program 70 (the next time it is executed by processor 30) that section 60 now contains new data which should be copied into the master EKE 70 for backup purposes.

Two steps 306, 308 still remain to be performed before process 204 is fully implemented. These steps relate to re-encryption of the PFM 140 on the EKE 14. Recall from a previous discussion relating to steps 242 and 243 of FIG. 7b that the PFM 140 stored on the EKE 14 is preferably encrypted using the same operational key code as that used to derive the EKE reference code. In the above updating steps 290–296, the operational key code used to derive the EKE reference code was changed. Thus, the PFM 140 now needs to be re-encrypted using the new operational key code. Accordingly, in step 306, processor 30 encrypts the PFM 1140 stored in RAM 40, using the new operational key code (operational key $code_2$ in the present example) as the encryption key. Preferably, processor 30 encrypts all of the PFM instructions 1140 stored in the RAM 40 except for those instructions pertaining to processes 174–180, 184–190, 216–224, and 225–227 of FIG. 7a, which are left unencrypted. The product of step 306 is a new encrypted PFM, encrypted using the same operational key code as that used to derive the new EKE reference code. Once the new encrypted PFM is derived, processor 30 stores 308 the new encrypted PFM 140 onto the EKE 14, preferably replacing the encrypted PFM currently stored thereon. As was the case with the old encrypted PFM, the new encrypted PFM will have an unencrypted portion 143 which is capable of carrying out processes 174–180, 184–190, 216–224, and 225–227 of FIG. 7a. After step 308 is performed, the recognition parameter updating step 204 is fully implemented.

Updating of the File Management Parameters

Referring again to FIG. 7a, regardless of whether the recognition parameters are updated, processor 30 preferably carries out step 206 to update the file management parameters stored in table 370 of the RAM 40. The process of updating the file management parameters is shown in greater detail in FIG. 7f. Like the file management parameter establishment process, the updating process has two purposes. The first purpose is to establish a new operational key file name and a new file reference code for each of the managed files 154–164, 170. The second purpose is to encrypt each of the managed files using a new operational key code. With this background information in mind, the file management parameter updating process will now be described with reference to FIGS. 7f, 8b, 8c, and 9b.

Preferably, processor 30 begins the updating process by selecting one of the managed files 154–164, 170 to update. Again, it will be assumed that file 154 is selected. Once that is done, processor 30 preferably selects 324 a new operational key file name to associate with the selected file. As shown in FIG. 8b, file 154 currently has operational key file $name_2$ associated therewith. Thus, in step 324, an operational key file name different from operational key file $name_2$ is preferably selected for file 154. Preferably, processor 30 carries out step 324 by accessing section 1160 of RAM 40, and selecting one of the other operational key files names stored therein. For illustrative purposes, it will be assumed that operational key $name_{11}$ is selected for file 154 in step 324. Once selected, the new operational key file name is stored in table 370 (as shown in FIG. 8c), preferably replacing the old operational key file name. Thereafter, processor 30 proceeds to step 326 to retrieve from section 1160 of the RAM 40 the operational key code corresponding to the new operational key file name. In the present example, since operational key file $name_{11}$ was selected, operational key $code_{11}$ will be retrieved. Once retrieved, the new operational key code is used by processor 30 to process 328 the file identification code (ID $Code_{154}$) corresponding to file 154. Preferably, in step 328, processor 30 encrypts the file identification code using the new operational key code as the encryption key to derive a new file reference code for file 154. In the present example, the new file reference code will be an encrypted version of ID $Code_{154}$, encrypted using operational key $code_{11}$ as the encryption key. Once the new file reference code is derived, it is stored 330 in table 370 (as shown in FIG. 8c), preferably replacing the old file reference code. The entries in table 370 corresponding to file 154 are thus updated. After step 330, processor 30 proceeds to step 332 to determine whether more managed files remain to be updated. If so, then processor 30 loops back to step 324 to update the parameters for another managed file. Preferably, steps 324–332 are repeated until the file management parameters for all of the managed files 154–164, 170 are updated. After steps 324–332, table 370 may resemble that shown in FIG. 9c. A comparison of FIG. 9c with FIG. 9b will reveal that the file management parameters for all of the managed files have indeed been updated. Thus, the first purpose of the file management parameter update process is achieved.

To achieve the second purpose (that of re-encrypting each of the managed files using a new operational key code), the updated file management table 370 shown in FIG. 8c will be used as a guide. Processor 30 preferably begins the re-encryption process by selecting one of the managed files 154–164, 170 to process. Again, it will be assumed file 154 is first selected. Once the file is selected, processor 30 retrieves 334 from table 370 stored in RAM 40 the new operational key file name corresponding to the selected file. With reference to FIG. 8c, operational key file $name_{11}$ will be retrieved for file 154 in the present example. Thereafter, processor 30 uses the retrieved operational key file name to access section 1160 of the RAM 40 to retrieve 336 therefrom the operational key code corresponding to the retrieved operational key file name. In the current example, operational key $code_{11}$ will be retrieved. Once that is performed, processor 30 retrieves from RAM 40 the unencrypted data 1254 (FIG. 9*b*) corresponding to file 154. Recall that in steps 256 and 257 of FIG. 7*b*, the data in file 154 and the rest of the managed files 156–164, 170 were decrypted and stored in RAM 40 as unencrypted data files 1254–1264, 1270, as shown in FIG. 9*b*. These unencrypted data files 1254–1264, 1270 can now be used by processor 30 for encryption purposes.

Once the unencrypted data 1254 for file 154 is retrieved from RAM 40, processor 30 encrypts 340 the data using the new operational key code (operational key code$_{11}$) as the encryption key to derive a new set of encrypted file data. Once derived, this new encrypted file data is stored 342 in file 154 of the EKE 14, preferably overwriting the data that is currently stored therein. Thus, file 154 on the EKE 14 is updated. More specifically, the data in file 154 has been re-encrypted using a new operational key code. After step 342, processing of file 154 is finished. Thereafter, processor 30 proceeds to step 344 to determine whether more managed files 154–164, 170 remain to be updated. If so, then processor 30 loops back to step 334 to re-encrypt the data in another file. Preferably, steps 334–344 are repeated until all of the managed files 154–164, 170 have been processed. At the end of this process, all of the managed files 154–164, 170 on the EKE 14 will have been re-encrypted using a new operational key code specific to the UAS 12. The file management parameter update process 206 is now complete.

Termination of UAS-EKE Interaction

After the file management parameters have been updated, processor 30 is almost ready to terminate interaction between the UAS 12 and the EKE 14. Before interaction is terminated, however, processor 30 performs two more tasks. First, processor 30 stores the updated file management information contained in table 370 into file 152 of the EKE 14. Because table 370 contains important file access information, it should not be stored on EKE 14 unprotected. Thus, in storing the file management information onto EKE 14, processor 30 preferably first encrypts 208 the information in table 370. Step 208 is preferably carded out by first setting all of the status flags in table 370 to "closed". Thereafter, processor 30 retrieves from file 148 of the EKE 14 the operational key file name stored therein. Then, using this operational key file name, processor 30 accesses section 1160 of the RAM 40 to retrieve therefrom the operational key code corresponding to the operational key file name. Thereafter, using the retrieved operational key code as the encryption key, processor 30 encrypts the information in table 370 stored in RAM 40 to derive a set of encrypted file management data. Once that is done, processor 30 stores 210 the encrypted file management data into file 152 of the EKE 14, preferably overwriting any information that is currently stored therein. Thus, file management data is stored on the EKE 14 in a safe and protected fashion.

As a final task, processor 30 checks 212 the status of a "pause mode" flag. If the flag is set, then processor 30 encrypts the information stored in file 166 of the EKE 14. As will be explained in more detail later, pause mode is a mode of operation which allows a user to store session codes for later access. This mode of operation is useful for prematurely halting the generation of session codes. For example, if a user has generated some but not all of the session codes he wishes to send to a PAS 18, and for some reason, needs to stop, he can prematurely end the session code generation process by invoking pause mode. When invoked, pause mode causes the already generated session codes to be stored in file 166 so that the user can retrieve them at a later time. Thus, when invoked, pause mode causes unencrypted session codes to be stored into, file 166 of the EKE 14.

As mentioned earlier, it is undesirable to store any information on the EKE 14 unprotected. Thus, if session codes are stored in file 166, then processor 30 preferably encrypts 214 the session codes to protect them from unauthorized access. Encryption step 214 is quite similar to encryption step 208 discussed above. More particularly, processor 30 preferably encrypts the session codes by first retrieving from file 148 of the EKE 14 the operational key file name stored therein. Then, using this operational key file name, processor 30 accesses section 1160 of the RAM 40 to retrieve therefrom the operational key code corresponding to the operational key file name. Thereafter, using the retrieved operational key code as the encryption key, processor 30 encrypts the session codes stored in file 166 to derive a set of encrypted session codes. Once that is done, processor 30 stores the encrypted session codes into file 166 of the EKE 14, preferably overwriting the session codes currently stored therein. The session codes are now protected. At this point, processor 30, under control of the UAS-EKE control portion 1142 of the unencrypted PFM 1140, has performed all of its necessary control functions. Thus, the initial session between the UAS 12 and the EKE 14 can now be terminated.

As mentioned previously, the integrated and distributed embodiments (FIGS. 2*a* and 2*b*) of the UAS 12 function in substantially the same manner. For the most part, this is true. However, with regard to the distributed embodiment, one additional consideration needs to be taken into account. This consideration relates to the storage of the unencrypted data from files 152–164, 170 in the RAM 94 (FIG. 2*b*). To elaborate, in the integrated embodiment, the user has full control over the UAS 12. Hence, after operation, the user is free to deactivate the UAS 12. By deactivating the UAS 12, the user is in effect purging from the volatile RAM 40 all of the unencrypted information stored therein. Hence, after deactivation, no records remain of the unencrypted data, which is a desirable result. In the distributed embodiment, however, because the hardware portion 80 of the UAS 12 may be under the control of a third party, the user may not have the luxury of being able to deactivate the hardware portion 80 to purge the RAM 94 of its contents. Hence, in the distributed embodiment, unless some procedure is implemented to eradicate the data stored in RAM 94, unencrypted data from files 152–164, 170 will remain in the RAM 94, freely accessible to any device which knows how to access it. This is a very undesirable and dangerous scenario.

To prevent such a scenario from arising, the UAS-EKE control portion 1142 of the PFM preferably causes the processor 80 to perform one further process before terminating interaction between the UAS 12 and the EKE 14. This process involves overwriting all of the RAM, or at least portions of the RAM 94 in which unencrypted data was stored, with random data. As an example, processor 80 may write a "1" into all of the selected portions of the RAM 94, or processor 80 may write a "0" into all of the selected portions, or processor 80 may write any combination of "1" and "0" into the selected portions. Any data pattern may be written into the RAM 94 so long as the unencrypted data contained therein is eradicated. Once the RAM 94 is purged in this manner, then interaction between the UAS 12 and the EKE 14 can be terminated.

Normal UAS-EKE Operation

The next time UAS 12 and EKE 14 are coupled to each other via storage device interface 32, processor 30 will again first access and execute the unencrypted portion 143 of the PFM 140 stored on the EKE 14. Under control of portion 143, processor 30 will determine 174 whether modules 172 are stored on the EKE 14. If so, then processor 30 will load the modules into the RAM 40 and set the "override" flag. Thereafter, processor 30 will again determine 177 whether the EKE 14 is a new one by checking file 148 for an operational key file name. This time, however, there will be a file name stored in file 148; thus, processor 30 will not perform the initialization steps 178–182. Instead, processor 30 will settle into regular operational mode. This mode of operation will now be described with reference to FIG. 7*a*.

Still under control of portion 143, processor 30 continues processing by checking 184 for a "delayed transmission" flag. If the flag is set, then it indicates that delayed transmission mode has been invoked. In such a case, processor 30 branches to step 225 to implement the delayed transmission mode of operation. Before describing steps 225–227 and steps 216–224 in detail, however, a short discussion of the delayed transmission mode of operation will be provided.

Delayed Transmission Mode

Delayed transmission mode is a mode of operation which is designed to increase convenience to the user. To elaborate, in normal operation, the PFM 140 on the EKE 14 causes processor 30 to implement a recognition methodology to determine whether the EKE 14 and the UAS 12 are authorized to interact with each other. As discussed above, the system 10 of the present invention is set up such that each EKE 14 is preferably authorized to interact with only one principal UAS 12. While this aspect of the invention greatly enhances system security, there may be instances where a user wishes to use an EKE 14 with a UAS other than the principal UAS. To allow for such a scenario, the present invention provides a delayed transmission mode whereby an EKE 14 may be operated with any compatible UAS. In delayed transmission mode, the PFM 140 does not cause the processor in the UAS to implement a recognition methodology; hence, any UAS may interact with the EKE. At the same time, though, PFM 140 does not allow the processor 30 to access any of the files 148–172 or programs 141 on the EKE 14. Instead, the processor 60 is allowed to access only file 166 of the EKE 14 wherein pregenerated messages or session codes are stored, and file 167. Even with this limited access, however, a UAS and an EKE can communicate with a provider device by accessing and sending the stored session codes in file 166 to the provider device, and by receiving and storing confirmation information from the provider device in file 167. Hence, delayed transmission mode provides a good compromise between security and flexibility. It allows an EKE 14 to be used with any compatible UAS to communicate with a provider while, at the same time, preserving the security of the files on the EKE 14. With this background information in mind, delayed transmission mode will now be described.

Referring again to FIG. 7*a*, processor 30, under control of unencrypted portion 143, preferably begins operating in delayed transmission mode by querying 225 the user as to whether the user wishes to abort the transmission. If so, then processor 30 deletes 226 the session codes stored in file 166, resets 227 the "delayed transmission" flag, and terminates operation. On the other hand, if the user wishes to continue with the transmission, then processor 30 proceeds to step 216 to access file 166 to retrieve the session codes stored therein. Preferably, the stored session codes contain all of the information needed to properly communicate with a provider, and are in a form expected by the provider. After the session codes are retrieved, processor 30 executes the communications modules 58 stored in non-volatile memory 38 to send 218 the session codes to the provider via the communications interface 34. Once sent, the session codes are preferably purged 220 from file 166. Thereafter, processor 30 waits for a response from the provider. When confirmation information or confirmation codes are received 221 from the provider, processor 30 stores 221 the confirmation codes in file 167 for subsequent processing. Processor 30 then sets 222 an update flag. As will be explained in a subsequent section, this update flag causes the principal UAS 12, the next time it interacts with the EKE 14, to process the confirmation codes stored in file 167 to implement any necessary updates. Once that is done, the delayed transmission flag is reset 224 to indicate that delayed transmission mode has been implemented, and to place the EKE 14 back into normal operational mode. Thereafter, portion 143 causes processor 30 to terminate interaction between the UAS 12 and the EKE 14.

Recognition Methodology

Returning to step 184, if the delayed transmission flag is not set, then processor 30 proceeds to implement 186 the recognition methodology of the present invention. Step 186 is shown in greater detail in FIG. 7*c*. Processor 30 begins the recognition process by retrieving 262 the operational key file name and the EKE identification code stored in files 148 and 150, respectively, of the EKE 14. Then, using the retrieved operational key file name as an index, processor 30 retrieves 264 from section 1160 of the RAM 40 the operational key code stored as a record under the retrieved operational key file name. If the retrieved operational key file name is not found in the RAM 40, then it most likely means that the UAS 12 is not the proper UAS. In such a case, interaction between the UAS 12 and the EKE 14 is terminated in order to prevent unauthorized access of the EKE 14.

On the other hand, if the retrieved operational key file name is found in the RAM 40, then the operational key code corresponding to the retrieved operational key file name is retrieved from the RAM 40. Once retrieved, this operational key code is used to process 266 the EKE identification code. Preferably, in step 266, processor 30 encrypts (by executing encryption modules 56) the EKE identification code using the operational key code as the encryption key to derive a processed EKE identification code. Thereafter, the processed EKE identification code is compared 268 to the EKE reference code stored as a record under the retrieved operational key file name in section 1160 of the RAM 40. Recall that in the previous session conducted between the UAS 12 and the EKE 14, the EKE reference code was derived by encrypting the same EKE identification code using the same operational key code. Thus, the processed EKE identification code and the EKE reference code should be consistent. If they are not, then it means that the EKE 14 contains the wrong operational key file name, or the wrong EKE identification code, or both. Whatever the reason, if the two codes are not consistent, then the EKE 14 is not a recognized EKE. Referring again to FIG. 7*a*, if the EKE 14 is not a recognized EKE, then it means that the UAS 12 and the EKE 14 are not authorized to interact with each other. Consequently, processor 30 terminates interaction between the two unauthorized components.

Thus far, the recognition methodology of the present invention has been described as including a processing step 266 wherein the EKE identification code is processed using the operational key code before being compared to the EKE reference code stored in the RAM 40. While this is the preferred embodiment, it should be noted that a simpler but less secure process may be employed if so desired. Under this alternative method, recognition is carded out by processor 30 by first retrieving the operational key file name and the EKE identification code from files 148 and 150, respectively, of the EKE 14. Then, using the operational key file name, processor 30 retrieves a pre-stored EKE reference code stored under the operational key file name in RAM 40. Thereafter, processor 30 compares the EKE reference code to the EKE identification code to determine if they are consistent. If the two codes are not consistent, then the EKE 14 is not a recognized EKE. Consequently, processor 30 terminates interaction between the UAS 12 and the EKE 14.

Decryption of the PFM on the EKE

Returning to step 188 of FIG. 7*a*, if the EKE 14 is a recognized EKE, then processor 30 proceeds to decrypt 189 the remainder of the PFM 140, including the encrypted pans of portion 142 and the entirety of portion 144. Preferably, step 189 is performed as follows. First, processor 30 retrieves the operational key file name stored in file 148 of the EKE 14. Then, using this operational key file name, processor 30 retrieves from section 1160 of the RAM 40 the operational key code corresponding to the operational key file name. Once this operational key code is retrieved, it is used by processor 30 as a decryption key to decrypt the PFM 140 stored on the EKE 14. Once decrypted, the decrypted PFM is stored in its entirety (including those portions corresponding to unencrypted portion 143) in RAM 40. FIG. 9*a* shows the contents of RAM 40 after this decryption process. As shown, RAM 40 now contains an unencrypted version 1140 of the PFM 140 on the EKE 14, comprising an unencrypted UAS-EKE control portion 1142 and an unencrypted user device-PAS control portion 1144. Once the PFM 140 is decrypted and stored in RAM 40, processor 30 begins executing the unencrypted PFM instructions stored in the RAM 40. At this point, processor 30 is still controlling interaction between the UAS 12 and the EKE 14. Thus, processor continues operation by executing the unencrypted instructions in portion 1142.

File Management

Under control of portion 1142, processor 30 proceeds to step 191 to decrypt the encrypted file management data stored in file 152 of the EKE 14. This decryption process is quite similar to that performed for decrypting the PFM 140. More specifically, processor 30 begins process 191 by retrieving the operational key file name stored in file 148 of the EKE 14. Then, using this operational key file name, processor 30 accesses section 1160 of the RAM 40 to retrieve therefrom the operational key code corresponding to the operational key file name. After the operational key code is retrieved, processor 30 uses the key code as a decryption key to decrypt the data in file 152. Once decrypted, the data in file 152 (which in actuality is table 370 of FIG. 8*c* containing the file management parameters) is stored in RAM 40. Thus, after step 191, RAM 40 contains table 370, which in turn contains the file management parameters needed to obtain access to the managed files 154–164, 170 on the EKE 14. With file 152 decrypted and table 370 of FIG. 8*c* derived, the processor 30 can now use the information in table 370 to perform its file management function 192.

Figure 7D:
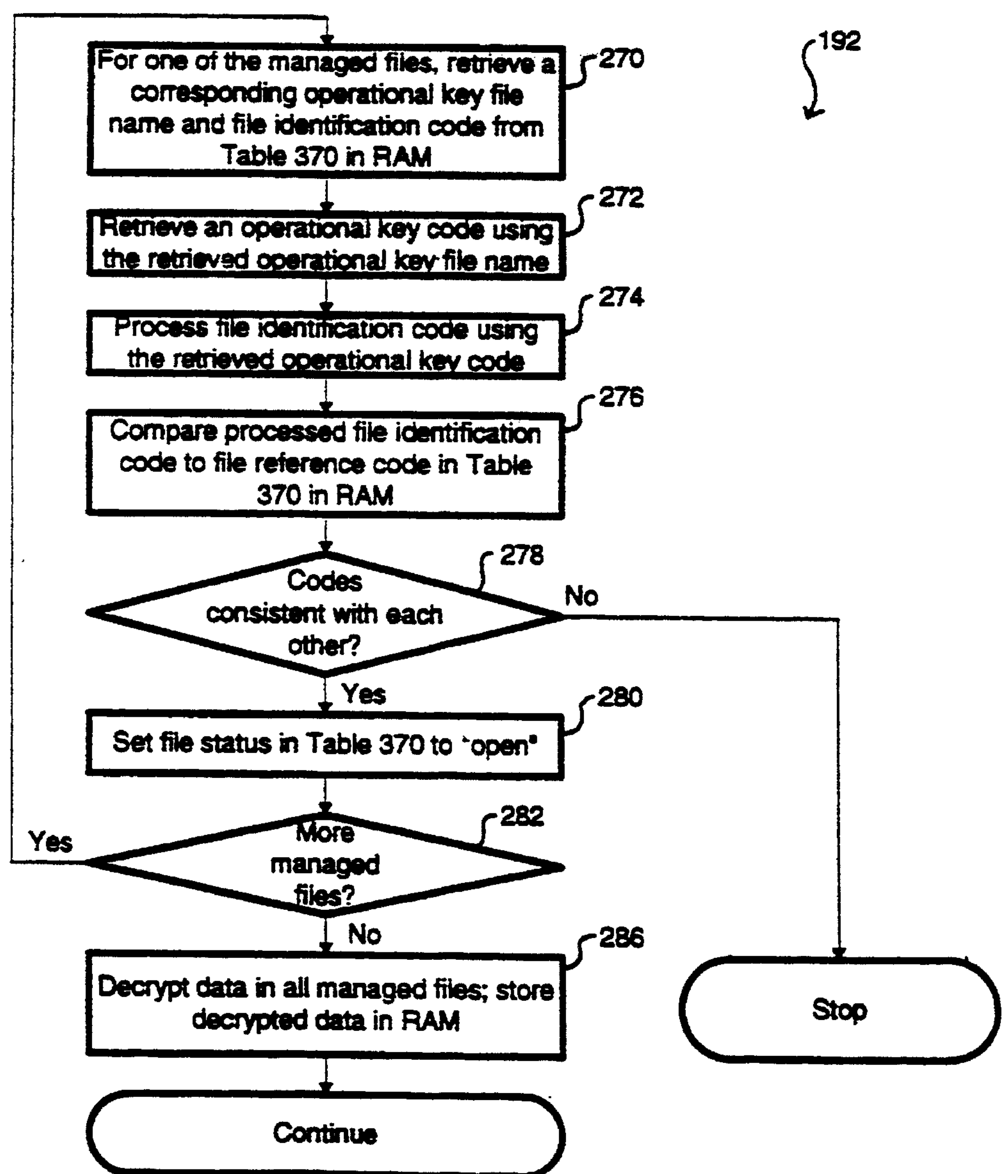
Figure 7E:
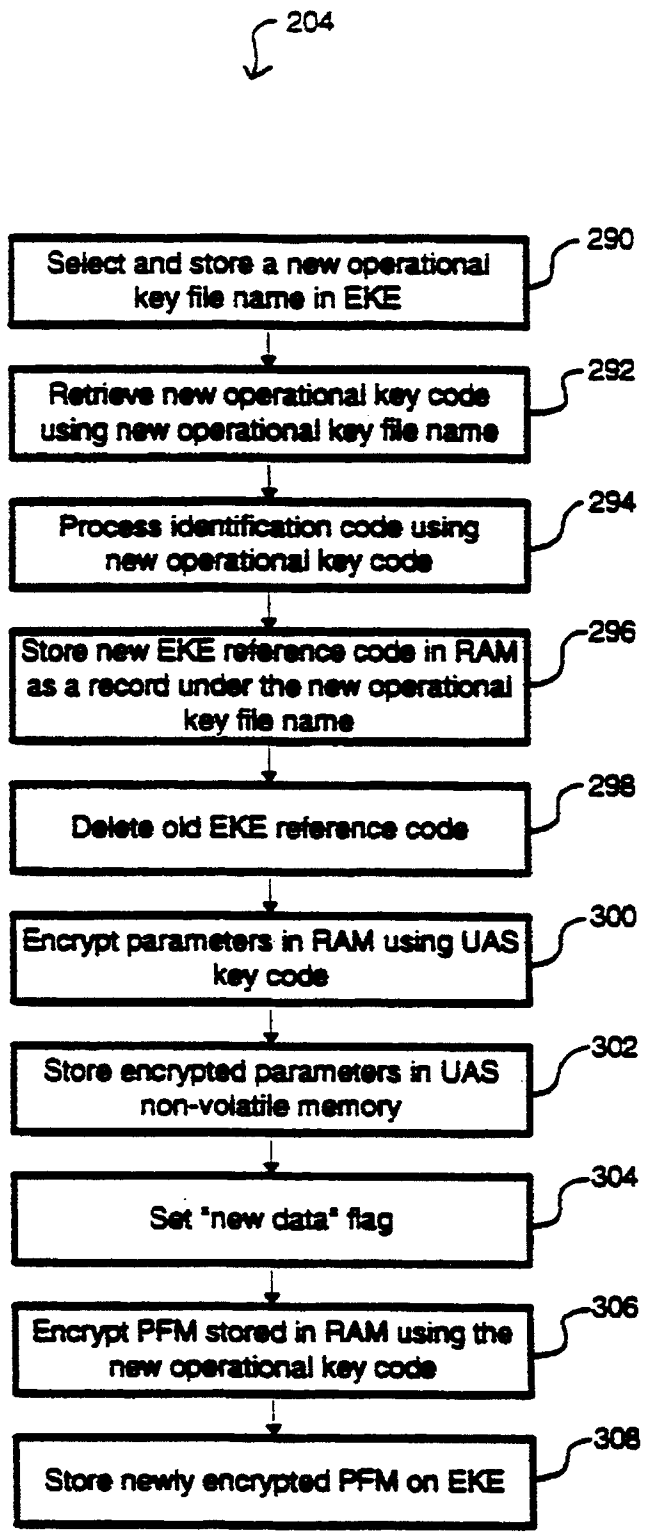
Figure 7F:
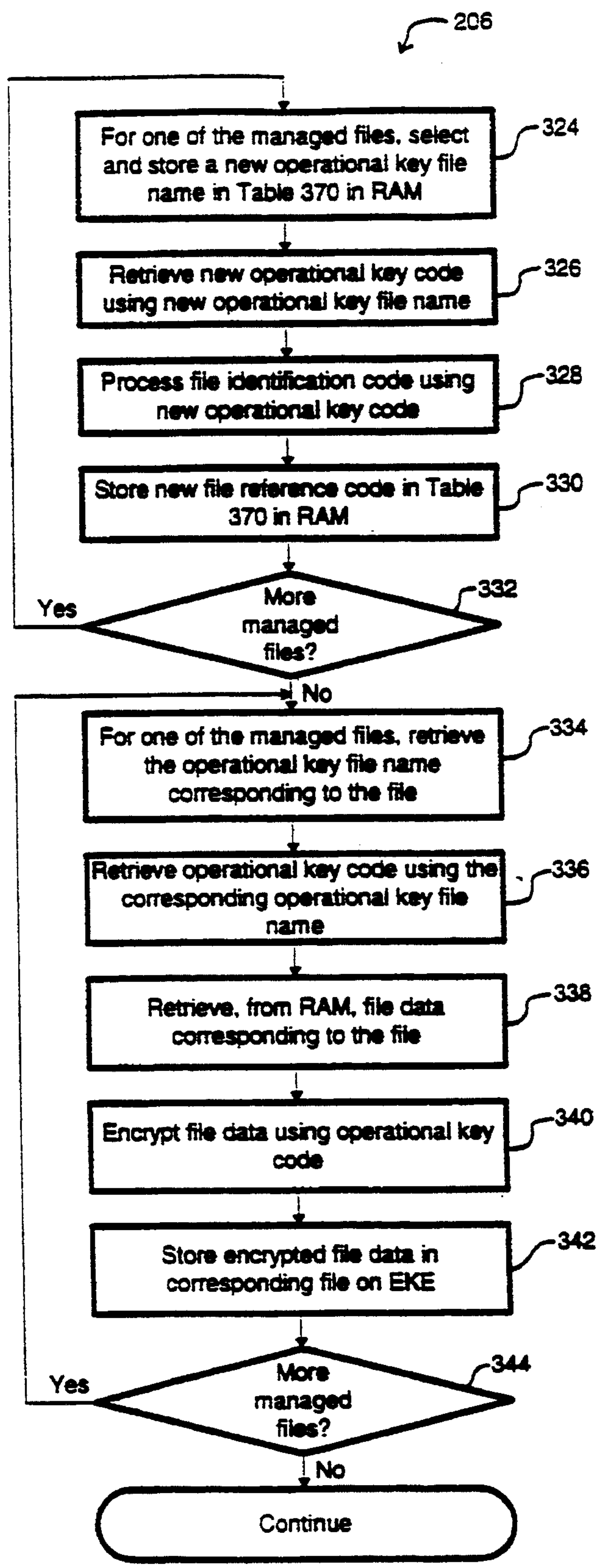

FIG. 7*d* provides a more detailed flow diagram for process 192. Preferably, processor 30 performs the file management function by first selecting 270 one of the managed files 154, 164, 170, and then retrieving 270 from table 370 the operational key file name and the file identification code corresponding to the chosen file. Processor 30 then uses the operational key file name as an index to retrieve 272 from section 1160 of the RAM 40 the operational key code corresponding to the operational key file name. If this operational key file name is not found in the RAM 40, then it most likely means that the EKE 14 is interacting with an improper UAS (i.e. a UAS other than the principal UAS). In such a case, processor 30 preferably halts operation.

On the other hand, if the operational key file name is found in the RAM 40, then the operational key code corresponding to the operational key file name is retrieved. Once retrieved, the operational key code is used by processor 30 to process 274 the file identification code. Preferably, in step 274, processor 30 derives a processed file identification code by encrypting the file identification code, using the operational key code as the encryption key. Once the processed file identification code is derived, it is compared 276 with the file reference code stored in table 370 for the selected file. If the file reference code is inconsistent with the processed file identification code, then an accessing error has occurred, which could mean that an unauthorized user is trying to access the managed files 154–164, 170. To prevent unauthorized access to the managed files, processor 30 preferably prematurely terminates interaction between the UAS 12 and the EKE 14.

On the other hand, if the processed file identification code is consistent with the file reference code stored in table 370 for the selected file, then the file status flag in table 370 corresponding to the selected file is set 280 to "open". Thereafter, processor 30 determines whether more managed files remain to be processed. If so, then processor 30 loops back to step 270 to select and to process another managed file. Preferably, steps 270–282 are repeated until either the status of all of the managed files 154–164, 170 has been set to "open" or an accessing error is encountered.

If all of the status flags in table 370 have been set to "open", then processor 30 proceeds to step 286 to decrypt and store the data in all of the managed files 154–164, 170 into RAM 40 for subsequent access and manipulation. Process 286 will be described with reference to table 370 of FIG. 8*c*. Process 286 preferably begins with processor 30 selecting one of the files (file 154, for example) listed in the table 370. Then, processor 30 retrieves from the table 370 the operational key file name (operational key file $name_{11}$) associated with the selected file 154. Once retrieved, the operational key file $name_{11}$ is used by processor 30 to access section 1160 of the RAM 40, and to retrieve therefrom the operational key code (operational key $code_{11}$) corresponding to the operational key file $name_{11}$. Once that is done, processor 30 uses the operational key $code_{11}$ as a decryption key to decrypt the data contained in file 154 of the EKE 14. Once decrypted, the data from file 154 is stored in section 1254 (FIG. 9*b*) of RAM 40. Thus, the RAM 40 now contains an unencrypted version of the data in file 154 which can be manipulated. The decryption process for file 154 is now complete.

To continue process 286, processor 30 selects another listed file (file 156, for example). Once the file is selected, processor 30 retrieves from table 370 the operational key file name (operational key file $name_{15}$) associated with the selected file 156. Then, using the retrieved operational key file $name_{15}$, processor 30 accesses section 1160 of the RAM 40 and retrieves therefrom the operational key code (operational key code$_{15}$) corresponding to the operational key file name 15. Once retrieved, the operational key code$_{15}$ is used by processor 30 as a decryption key to decrypt the data contained in file 156 of the EKE 14. Once decrypted, the data from file 156 is stored in section 1256 (FIG. **9*b*) of RAM 40. RAM 40 now contains unencrypted data from file 156 which can be manipulated. Thus, the decryption process for file 156** is complete.

Processor 30 preferably repeats this process of selecting, decrypting, and storing data files until all of the files listed in table 370 have been processed. After process 286 is completed, the contents of RAM 40 will resemble that shown in FIG. **9*b*. wherein the RAM 40 contains unencrypted data from all of the managed files 154–164, 170. This unencrypted data 1254–1256, 1270 will be manipulated and possibly altered in the course of communicating with the PAS 18. At this point, it should be noted that decryption process 286 does not alter the files 154–164, 170 on the EKE 14. These files remain encrypted. The only unencrypted version of the data in files 154–164, 170 is stored in sections 1154–1264, 1270 of the RAM 40**.

One last function performed in process 286 is that of decrypting the session codes stored in file 166 of the EKE 14. Recall from a previous discussion relating to steps 212 and 214 of FIG. **7*a* that if pause mode is invoked, the session codes stored in file 166 will be encrypted. If the session codes in file 166 were encrypted in a previous session, then they will need to be decrypted in the current session. Thus, as part of the decryption process 286, processor 30 preferably checks the status of the "pause mode" flag. If this flag is set, then processor 30 will decrypt the encrypted session codes stored in file 166. Processor 30 preferably carries out this decryption process by retrieving from file 148 of the EKE 14 the operational key file name stored therein. Then, using the operational key file name, processor 30 retrieves from section 1160 of the RAM 40 the operational key code corresponding to the operational key file name. Once retrieved, the operation key code is used by processor 30 as a decryption key to decrypt the encrypted session codes in file 166. Once decrypted, the sessions codes are stored back into file 166. Process 286** has now been fully explained.

Transfer of Control to the User Device-PAS Control Portion of the PFM

Referring again to FIG. **7*a*, once data from the managed files 154–164, 170 have been decrypted and stored in RAM 40, processor 30 has all of the data it will need to communicate with the PAS 18. Thus, processor 30 is now ready to coordinate the exchange of information with the PAS 18. Hence, in step 200, control is transferred from the UAS-EKE control portion 1142 over to the user device-PAS control portion 1144 of the unencrypted PFM 1140 (FIG. 9*b*). Thereafter, processor 30 begins executing the unencrypted instructions in portion 1144 to coordinate communication with the PAS 18. Steps 200–214 are carried out here in the same manner as in the previous session. Thus, they need not be described again. It should just be noted that after the current session, the file management parameters and possibly the recognition parameters will once again be updated so that the next time the UAS 12 and the EKE 14 interact, they will use different parameters. The UAS-EKE control portion 1142 of the PFM 1140** has now been fully described.

Before proceeding to the other features of the invention, one unique aspect of the EKE 14 and the UAS 12 should be emphasized. Note that in the system of the present invention, recognition between the UAS 12 and the EKE 14 is carried out by having the processor 30 in the UAS 12 access and execute the instructions in unencrypted portion 143 of the PFM 140. Put another way, the processor 30 relies on the instructions stored on the external storage device (the EKE) to determine whether it can further access that particular storage device. This is a very unique arrangement. In contrast, in the prior art systems, a processing device contains all of the processing capability and the logic necessary for determining whether it can interact with a storage device. It does not rely on any instructions stored on the storage device. An ATM is an example. A typical ATM determines whether a storage device (an ATM card) is a proper device by executing instructions stored within the ATM itself. The ATM does not rely on any instructions from the ATM card for carrying out the verification process.

A major advantage of the arrangement disclosed in the present invention is that it allows a storage device, having no processing power of its own, to be its own protector. To elaborate, in the prior art systems, the processing device is entrusted with the entire verification function. The sole purpose of the storage device is to provide information, not instructions, to be used in the verification process. In such an arrangement, recognition is a one-way street: the processing device can determine whether the storage device is valid, but the storage device has no way of verifying that the processing device is a valid device. In such a system, it is a relatively simple matter for an invalid processing device to steal information from a storage device. Such is not the case in the present invention. In system 10 of the present invention, a processing device, in order to gain access to the data and programs stored on the storage device, must first access and execute the unencrypted control instructions 143 on the storage device. Only if the processor 30, under control of portion 143, is satisfied that the processing device and the storage device are authorized to interact with each other will further access to the storage device be granted. Thus, in system 10, recognition is a two-way street; interaction between the processing device and the storage device will be allowed only if both devices are valid. Thus, due to the presence of the UAS-EKE control instructions 142 (including unencrypted portion 143), the storage device of the present invention is able to protect itself from invalid processing devices. This unique aspect of the invention makes system 10 much more secure than the systems of the prior art. The UAS-EKE control portion 142 of the PFM 140, and the interaction between the UAS 12 and the EKE 14, have now been fully described.

User Device-PAS Interaction

The UAS-EKE control portion 142 is only one part of the PFM 140. The PFM 140 also includes a user device-PAS control portion 144. It is this portion 144, when executed by processor 30, which coordinates the exchange of information between the user device 16 (formed by UAS 12 and the EKE 14) and the PAS 18.

As a recap, processor 30, under control of the unencrypted portion 143 of the PFM 140, determines whether the UAS 12 and the EKE 14 are authorized to interact with each other. Once processor 30 determines that interaction is authorized, processor 30 carries out steps 189–190 of FIG. **7*a* to decrypt the PFM 140 on the EKE 14, and to store the unencrypted PFM 1140 into the RAM 40. As stored in RAM 40, the unencrypted PFM 1140 includes an unencrypted UAS-EKE control portion 1142 and an unencrypted user device-PAS control portion 1144. After the unencrypted PFM 1140 is stored in RAM 40, processor 30 begins executing the instructions in the UAS-EKE control portion 1142. Under control of portion 1142, processor 30 carries out steps 191 and 192** of FIG. 7*a*. More specifically, processor 30 decrypts and stores table 370 into RAM 40. Further, processor 30 decrypts and store the data in files 154–164, 170 into RAM 40. By the end of step 192, the contents of RAM 40 resemble that shown in FIG. 9*b*. At this point, RAM 40 contains all of the data needed to communicate with the PAS 18. Thus, in step 200 of FIG. 7*a*, control is transferred from the UAS-EKE control portion 1142 to the user device-PAS control portion 1144. Thereafter, processor 30 begins executing the instructions stored in portion 1144 to carry out the user device-PAS control functions.

Control portion 1144 is responsible for coordinating the exchange of information between the user device 16 and the PAS 18. In carrying out this overall coordination function, portion 1144 cause processor 30 to perform a number of sub-functions. First, processor 30 generates the messages or session codes which are to be sent to the PAS 18. Preferably, processor 30 performs this function by executing the application portion 145 of the provider-specific software 141 (FIG. 6). Second, processor 30 packages the session codes in a manner expected by the PAS 18. This function is preferably performed by executing the communications modules 146 of the provider-specific software 141. Third, processor 30 implements the recognition and comprehension methodologies of the present invention. More specifically, processor 30 cooperates with the PAS 18 to carry out a recognition procedure for ensuring that only proper parties are allowed to communicate. Processor 30 also preferably carries out an encryption/decryption methodology to prevent third parties from comprehending the information exchanged between the user device 16 and the PAS 18. In addition, processor 30 cooperates with the PAS 18 to dynamically alter the parameters used in the recognition and comprehension processes to make the system 10 more difficult to break into, and to minimize the damage caused by fraudulently obtained information. Overall, portion 1144 causes the processor 30 to work in conjunction with the PAS 18 to ensure that communications between the user device 16 and the PAS 18 are secured. Because the operation of portion 1144 is so entwined with that of the PAS 18, the operation of portion 1144 will be best understood if described in conjunction with the operation of PAS 18. Hence, PAS 18 will first be described.

PAS

Figure 10:
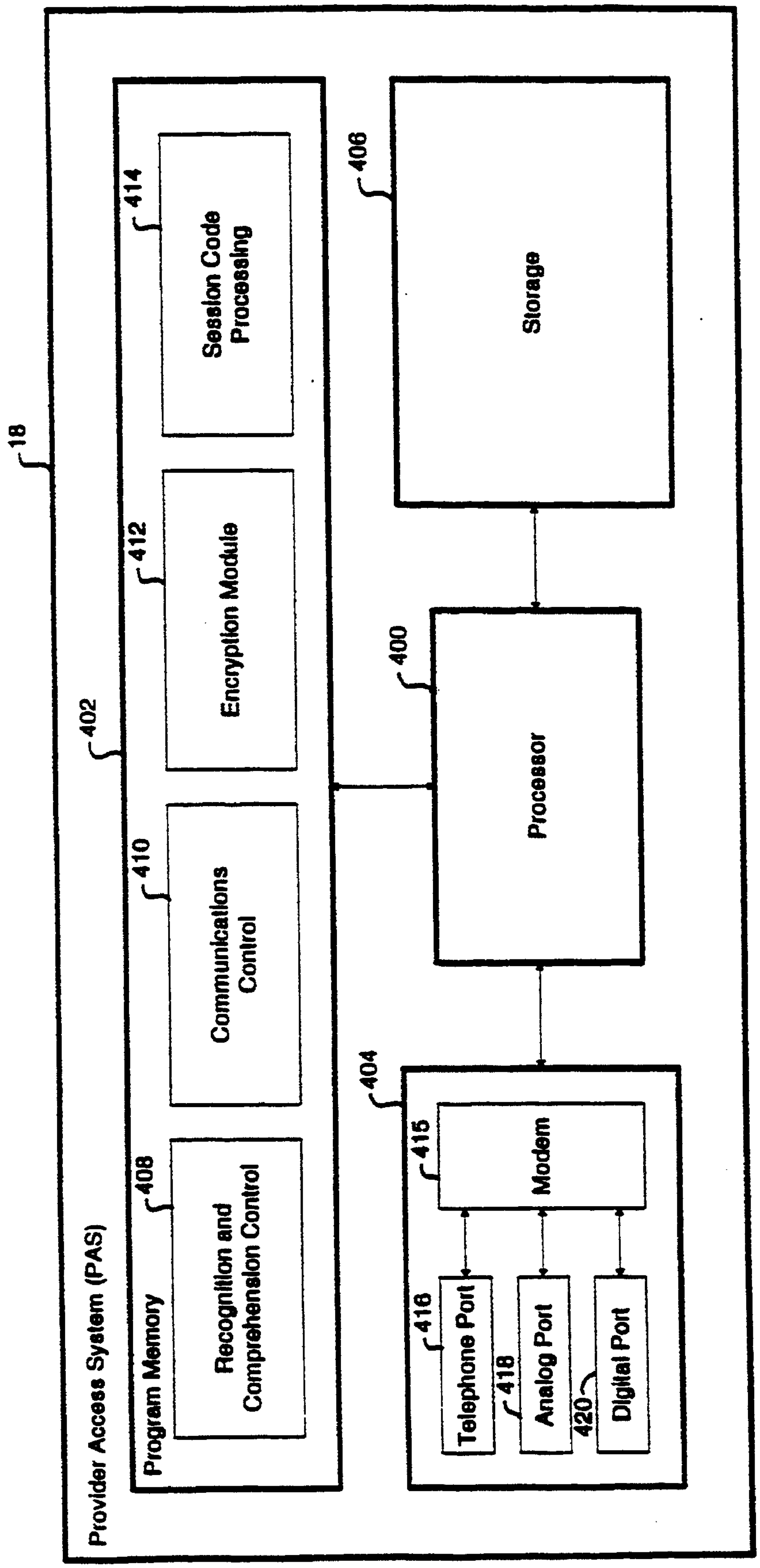
FIG. 10 is a block diagram representation of the PAS 18 of the present invention.

With reference to FIG. 10, there is shown a block diagram representation of the PAS 18 of the present invention. PAS 18 preferably comprises a processor 400, a program memory 402 for storing the programs executed by processor 400, a communications interface 404 for forming a communications link with the user device 16, and a storage device 406 for storing recognition and comprehension parameter information for each user device with which the PAS 18 communicates. In the preferred embodiment, storage device 406 may take on a number of different toms including a hard drive, an optical drive, a memory, or some other device capable of storing information. Storage device 406 may be a part of the PAS 18, as shown in FIG. 10, or it may be a separate and distinct component which is accessed by the PAS 18. Both embodiments are contemplated in the present invention.

As mentioned above, the storage device 406 stores specific recognition and comprehension information for each user device with which the PAS 18 communicates. This information preferably includes (for each user device) a user device file name which uniquely identifies the user device to the PAS 18, an EKE identification code, an encrypted application address (EAA) associated with the user device, the key codes used in implementing the recognition and comprehension methodologies, and at least some of the provider historical file entries maintained in the provider historical file 170 of the EKE 14. Preferably, this information is stored in storage 406 in such a way that, for each user device, a user file is created. The user file is assigned the user device file name, and the parameters associated with the particular user device are stored as records in the user file. Preferably, this same recognition and comprehension information is stored in files 154–162, 170 of the EKE 14 (in encrypted form). This ensures that when the user device 16 and the PAS 18 communicate, they will be able to understand one another.

Note that the only information stored in the user file of the PAS storage 406 is recognition and comprehension information relating to the user device. There is no other user-specific information, such as actual account information, demographics, etc., stored in the user file. Instead, this information is stored at a location derived from the EAA. More specifically, the EAA is an encrypted address which was encrypted using a secret provider key code known only to the provider. When the EAA is decrypted using the secret provider key code, an encrypted transaction address (ETA) is derived therefrom. This ETA represents the location in the provider system wherein the user-specific information is actually stored. The ETA may be represented by a number of sub-addresses which, in turn, represent separate user sub-accounts. These sub-accounts are usually accessed by specific session codes and accompanying DPIN's. The user-specific information is stored in this manner to prevent parties at the provider's site (such as employees) from being able to access the information without authorization. Even if the employee has the user's EAA, he will not be able to access the user's specific information because he will not know, unless he decrypts the EAA, where the information is actually located.

To enable the PAS 18 to communicate with the user device 16, PAS 18 comprises the communications interface 404. Interface 404 preferably comprises a modem 415, a telephone port 416 coupled to the modem 415 for connecting to and communicating via a universal telephone line, and an analog 418 and a digital port 420, both of which are coupled to the modem 415, for communicating through RF, optical, or cable means. Because of the various ports, communications interface 404 allows PAS 18 to communicate with the user device 16 through a variety of avenues.

The programs or modules which are needed by processor 400 to carry out its intended functions are stored in program memory 402. Preferably, memory 402 contains therein a recognition and comprehension control program 408, a communications control program 410, encryption modules 412; and optionally, a session code processing program 414. Recognition and comprehension control program 408 is the main program which is executed by processor 400 to carry out most of the functions of the PAS 18. More specifically, control program 408 causes processor 400 to implement the recognition methodology of the present invention. In addition, control program 408 coordinates the encryption/decryption of messages, and the updating of recognition and encryption parameters. It is control program 408 which coordinates the execution of the other programs or modules in memory 402. Program 408 will be described in greater detail in a subsequent section.

In the preferred embodiment, substantially all of the control functions performed by the PAS 18 are carried out by processor 400 under control of the recognition and comprehension control program 408. It should be noted, however, that if so desired, some or all of the functions performed by processor 400 and program 408 may be carried out by a hardwired logic circuit instead. That is, processor 400 and program 408 may be replaced, in whole or in part, with a logic circuit designed to perform equivalent functions. As an example, processor 400 and program 408 may carry out the recognition portion of the methodology of the present invention while a logic circuit performs the updating of the recognition parameters. Other divisions of functions are of course possible. As a matter of practicality, the processor/program implementation is preferred because it is more flexible and cost efficient than the alternatives. Nonetheless, the hardwired logic circuit is a possible alternative. Such implementations are within the scope and contemplation of the present invention.

In communicating with the user device via the communications link, certain communications protocols will need to be observed. The function of the communications control program 410 is to ensure that outgoing messages are sent using the proper protocol, and that incoming messages are deciphered using the proper protocol. There exists a variety of protocols which may be employed to carry out the exchange of information. Which protocol is implemented by program 410 is determined by the control program 408, as will be explained in a subsequent section.

Also stored in memory 402 are the encryption modules 412. Like the encryption modules 56 in UAS 12, modules 412 preferably perform two major functions. First, modules 412 implement one or more selected encryption/decryption algorithms to encrypt/decrypt data according to a certain encryption key. The algorithms implemented by modules 412 may be industry accepted standard algorithms such as DES. SKIPJACK, and other well known algorithms, or they may be proprietary algorithms. In the preferred embodiment, modules 412 implement industry accepted algorithms in order to maximize compatibility. Second, modules 412 may be called upon to generate random numbers. This feature of module 412 is used in updating the recognition and comprehension parameters.

As an option, program memory 402 may further contain therein a session code processing program 414. Once the PAS 18 has determined that a user device is a valid device, and has decrypted the incoming session codes, the session codes need to be processed to carry out the transaction desired by the user. The function of program 414 is to process these session codes. Because the incoming session codes are customized to a specific provider, the session code processing program 414 is also preferably customized to the same provider. As an alternative, the PAS 18 need not process the session codes at all, but instead, may relay the codes, along with the EAA, on to a separate provider processing device (not shown) which actually performs the processing function. In such a case, program 414 need not be maintained in memory 402. Both embodiments are contemplated by the present invention.

Normal User Device-PAS Operation

Figure 11:
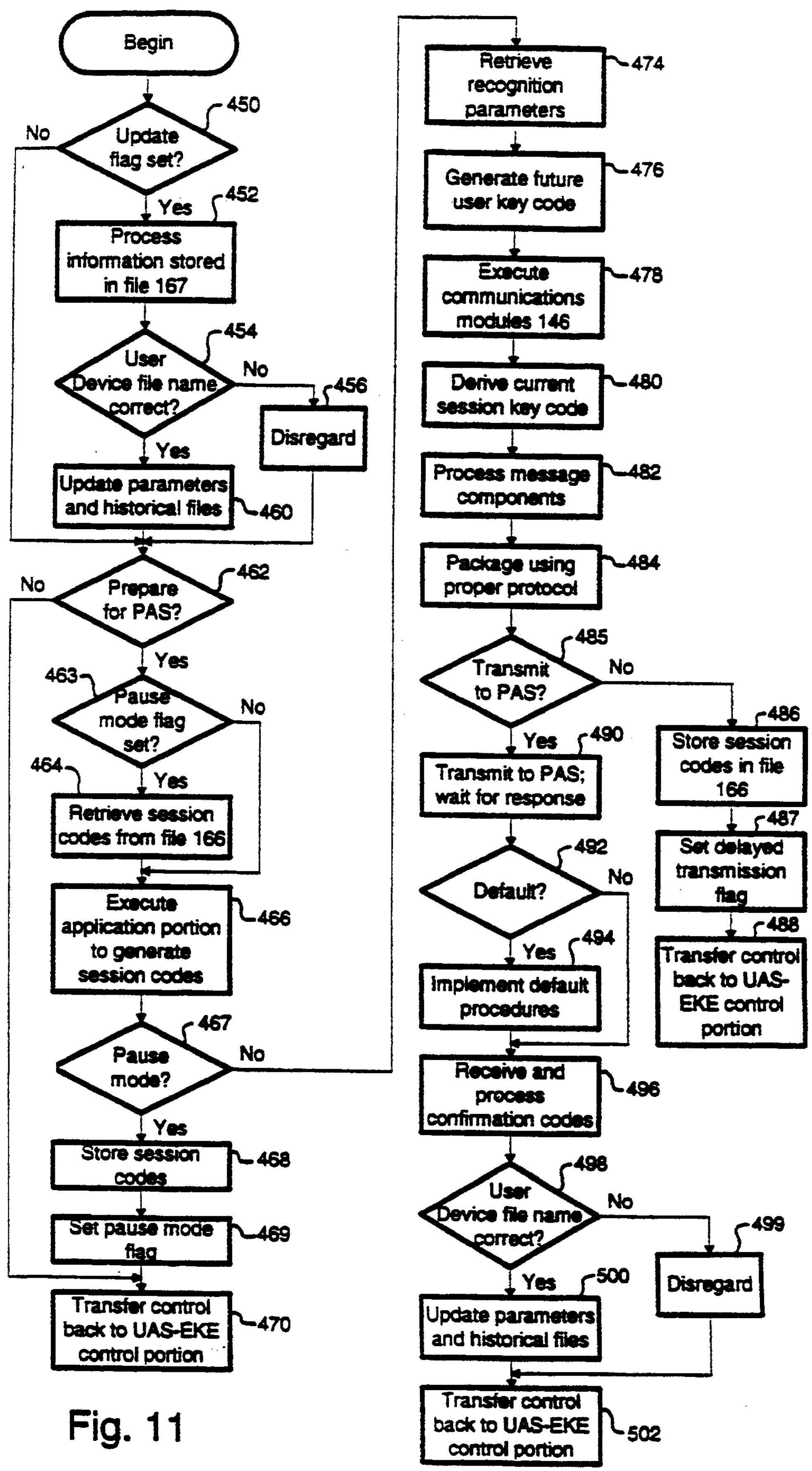
FIG. 11 is an operational flow diagram for a first preferred embodiment of the user device-PAS interaction control portion 144 of the PFM 140.
Figure 12:
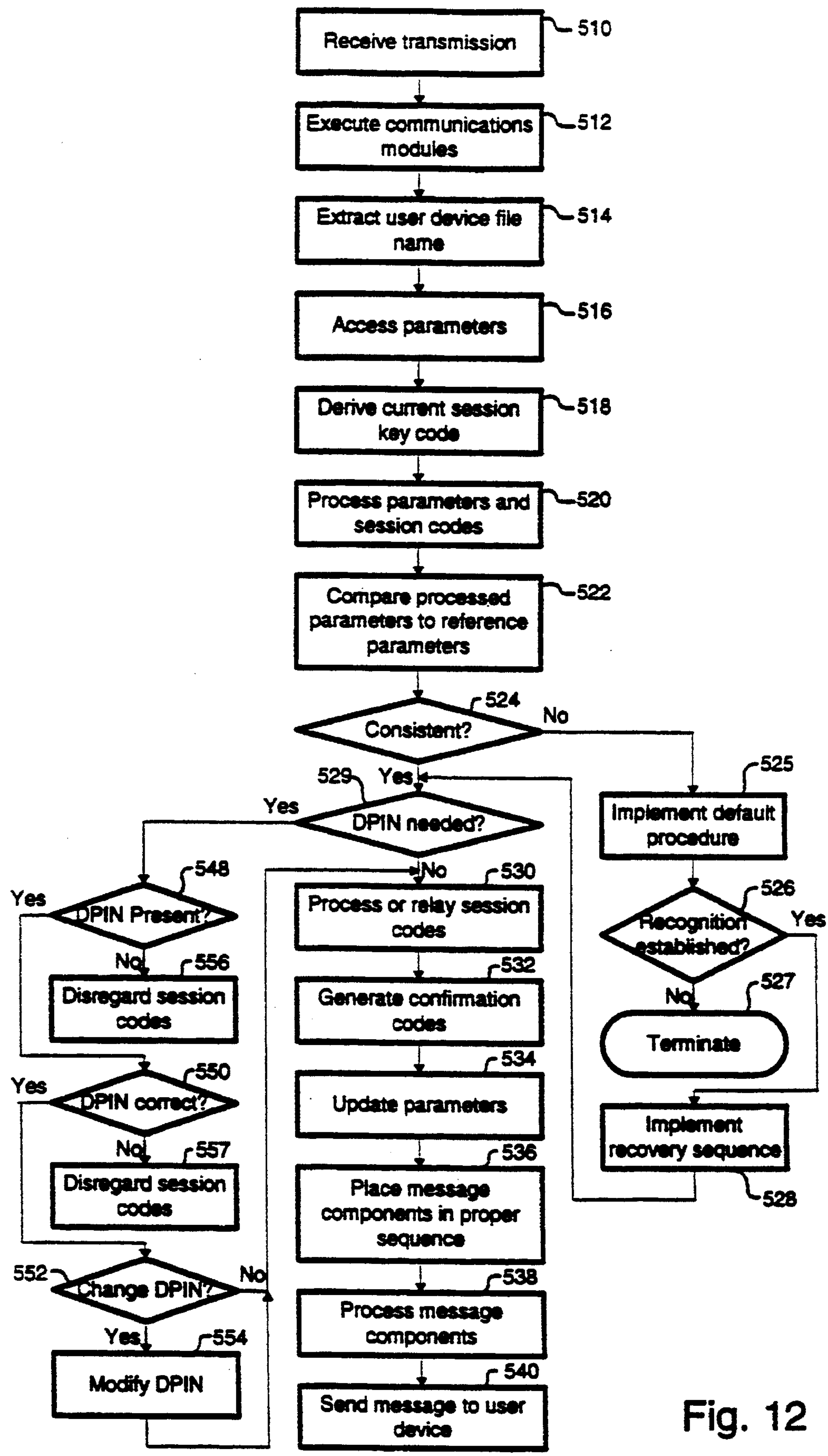
FIG. 12 is an operational flow diagram for a first preferred embodiment of the recognition and comprehension control program 408 of the PAS 18.

With reference to FIGS. 11 and 12, the operation of the user device 16 and the PAS 18 will now be described in detail. FIG. 11 is an operational flow diagram for the user device-PAS control portion 1144 of the PFM 1140, while FIG. 12 is an operational flow diagram for the recognition and comprehension control program 408 of the PAS 18. Since it is the user device 16 which initiates communication between the two components, the operation of user device 16 will first be described.

Referring now to FIG. 11, processor 30, under control of portion 1144, preferably begins operation by determining 450 whether the update flag on the EKE 14 is set. The update flag will be set if, in a previous session involving the EKE 14, delayed transmission mode was invoked. To elaborate, recall that delayed transmission mode is a mode of operation which allows the EKE 14, using any compatible UAS 12, to send a set of session codes to the PAS 18. A result of this mode of operation is that a set of confirmation codes, received from the PAS 18 after the session codes are processed, will be stored in file 167 of the EKE 14. These confirmation codes may and probably will contain updates to some of the recognition and comprehension parameters stored on the EKE 14. These updates may include new key codes, a new user device file name, a new EAA, privileges to be stored in file 168, and updates to the historical files 164 and 170. These updates are important and should be processed by the principal UAS 12 before any further session codes are generated or sent to the PAS 18. For this reason, processor 30 preferably checks the status of the update flag before proceeding with any other function.

If the update flag is not set, then processor 30 proceeds to step 462 to begin coordinating communication with the PAS 18. However, if the update flag is set, then processor 30 preferably carries out the updating process 452–460 shown in FIG. 11. More specifically, processor 30 begins by retrieving the update information stored in file 167. Once retrieved, the information in file 167 is preferably purged. Thereafter, processor 30 processes 452 the information from file 167 to derive meaningful data therefrom. A point to note is that when update information is received from PAS 18, the information is preferably encrypted according to a current session key code. Hence, in order to derive meaningful information from file 167, the information stored therein is first decrypted. Thus, in step 452, processor 30 decrypts the information stored in file 167 by first deriving the current session key code. This is preferably achieved by: (1) retrieving a current user key code (CUKC) from file 1258 of the RAM 40; (2) retrieving a current provider key code (CPKC) from file 1260 of the RAM 40; and (3) combining the CUKC and the CPKC to derive the current session key code (CSKC). Once the CSKC is derived, processor 30 executes the encryption modules 56 in UAS 12, using the CSKC as the decryption key, to decrypt the information in file 167.

Thereafter, processor 30 extracts a user device file name from the decrypted information, and compares 454 this file name with the user device file name stored in file 1254 of the RAM 40. If the two file names are not consistent, then recognition between the user device 16 and PAS 18 is not confirmed. As a result, the update information is disregarded 456. On the other hand, if the two file names are consistent, then processor 30 proceeds to update 460 the parameters and historical files on the EKE 14 with the decrypted information from file 167. Step 460 may entail storing a new user device file name in file 1254, storing a new EAA in file 1256, storing new key codes in files 1260 and 1262, and storing new information in files 1264 and 1270 of the RAM 40. Step 460 may also entail storing remote privileges into file 168 of the EKE 14. Once the files in the RAM 40, and possibly the files on the EKE 14 are updated, processor 30 goes on to step 462 to begin carrying out its regular coordination function.

At step 462, processor 30 determines, by prompting the user, whether the user wishes to prepare for communication with the PAS 18. In the present invention, it is not required that the user device 16 communicate with the PAS 18 each time the user device-PAS portion 1144 is executed. A user may run portion 1144 simply to update the EKE 14 with information from file 167 as described above. Whatever the reason, if communication with the PAS 18 is not desired, then control is transferred 470 back to the UAS-EKE control portion 1142 of the RAM 40. On the other hand, if the user does wish to prepare for communication with the PAS 18, then processor 30 proceeds to step 463 to check the status of the "pause mode" flag on the EKE 14. This flag will be set if, in a previous session, the user prematurely halted the process of generating session codes, thereby causing the session codes already generated to be stored in file 166 of the EKE 14. If the "pause mode" flag is not set, then processor 30 proceeds to step 466. However, if the flag is set, then processor 30 retrieves 464 the stored session codes from file 166 of the EKE 14. This allows the user to use, in the current session, the session codes generated in a previous session. Preferably, once the session codes are retrieved from file 166, processor 30 purges the session codes from the file 166, and resets the "pause mode" flag.

Thereafter, processor 30 proceeds to step 466, wherein the processor 30 executes the application portion 145 of the provider-specific software 141 to allow the user to generate session codes to send to the PAS 18. The session codes generated in this step may be text messages, orders for products, transaction codes, etc. Since portion 145 is provider-specific, step 466 can generate any session codes dictated by the provider. Application portion 145 may also include logic for generating and changing DPIN's if DPIN's are required by the provider for some or all of the session codes. Again, since portion 145 is provider-specific, it can contain logic for causing the processor 30 to perform any function desired by the provider. After step 466 is implemented, processor 30 queries 467 the user as to whether the user wishes to invoke pause mode. Here, processor 30 gives the user the chance to prematurely halt the process of generating session codes. If the user indicates that pause mode is desired, then processor 30 stores 468 the session codes already generated in the current session into file 166 of the EKE 14, and sets 469 the "pause mode" flag. Thereafter, processor 30 transfers 470 control back to the UAS-EKE control portion 1142 of the RAM 40. On the other hand, if the user does not want to invoke pause mode, then processor 30 proceeds to step 474.

In step 474, processor 30 retrieves selected recognition parameters from the RAM 40. These parameters include the user device file name from file 1254 which uniquely identifies the user device 16 to the PAS 18, and one or more sets of identification information. Identification information may include the EKE identification code from file 1250, the EAA from file 1256, and a selected provider historical file entry from file 170 of the EKE 14. Preferably, these parameters were preset and pre-stored by the provider when the provider issued the EKE 14. The same parameters are preferably stored in storage device 406 of the PAS 18 so that when user device 16 and PAS 18 communicate, they will use the same parameters and hence, be able to recognize one another. After step 474, processor 30 generates and stores 476 a future user key code (FUKC) into file 1258. This key code, as explained later, will be used to generate a subsequent session key code for use in the recognition and comprehension processes. Preferably, the FUKC is generated by using the random number generating capability of the encryption modules 56.

After FUKC is generated, processor 30 executes 478 the communications modules 146 portion of the provider-specific software 141 to properly package the session codes. Modules 146 may dictate the length of certain message segments, the manner and order in which the sessions codes should be arranged, and various other provider-specific parameters. Modules 146 may also add on additional information, such as specific information needed to form a communications link with the provider (the provider's telephone number, for example). In short, modules 146 ensure that the session codes are in a format expected by the provider.

After executing modules 146, processor 30 proceeds to step 480 to derive a current session key code (CSKC). Preferably, the CSKC is derived by: (1) retrieving a current user key code (CUKC) from file 1258 of the RAM 40; (2) retrieving a current provider key code (CPKC) from file 1260 of the RAM 40; and (3) combining the CUKC and the CPKC to derive the CSKC. Preferably, like the recognition parameters, the CUKC and the CPKC were preset and pre-stored on the EKE 14 by the provider when the provider issued the EKE 14. Also, the same key codes are preferably stored in storage device 406 of PAS 18 so that when user device 16 and PAS 18 communicate, they will use the same key codes and thus, be able to understand one another.

Once the CSKC is derived, processor 30 processes 482 the identification information (also referred to herein as the parameters) and session codes using the CSKC. In step 482, processor 30 preferably first places the parameters and sessions codes into proper order. In the preferred embodiment, the user device file name is placed at the beginning of the sequence, followed by the identification information (i.e. the EAA, the EKE identification code, and the provider historical file entry), the FUKC, and the session codes. The parameters and session codes are now ready to be processed. Preferably, processor 30 processes the parameters and session codes by encrypting (by executing modules 56) the EAA, the EKE identification code, the provider historical file entry, the FUKC, and the session codes using the CSKC as the encryption key. Preferably, the user device file name is left unencrypted.

As an option that would conform with the digital signature standard (DSS) set forth by the National Institute of Standards and Technology (NIST), the identification information, before being encrypted using the CSKC, may be first encrypted using the digital signature algorithm (DSA) proposed by the NIST. If this is done, then the identification information will be double-encrypted when encrypted using the CSKC. The identification information, processed in this manner, will serve as the digital signature of the user device 16, compliant with the federal standard.

Once the parameters and session codes are processed, processor 30 packages 484 the processed parameters and session codes using the proper protocol. Step 484 is preferably carried out by executing communications modules 58 and specifying a particular protocol to be used. Once packaged, the information is ready to be sent to the PAS 18.

At this point, processor 30 queries 485 the user as to whether delayed transmission mode is desired. If delayed transmission mode is desired, then it means that the processed information should not be sent to the PAS 18 at this time but instead should be stored in file 166 for later transmission. In such a case, processor 30 stores 486 the processed parameters and session codes into file 166 of the EKE 14, sets 487 the delayed transmission flag, and thereafter transfers control 488 back to the UAS-EKE control portion 1142 of the RAM 40.

On the other hand, if delayed transmission mode is not desired, then processor 30 sends 490 the processed parameters and session codes to the PAS 18 via the communications interface 34, and then waits 490 for a response.

The flow of operation now switches to the PAS 18. With reference to FIGS. 10 and 12, the operation of PAS 18 will now be described. As mentioned above, processor 400 executes control program 408 to carry out the recognition and comprehension functions of the PAS 18. Under control of program 408, processor 400 receives 510 the transmission from the user device 16 via the PAS communications interface 404. Once the transmission is received, processor 400 executes 512 the communications modules 410 to disassemble the transmission using the proper protocol. The protocol used is dictated by control program 408. After the transmission is disassembled, processor 400 extracts 514 from the transmission the user device file name. Recall that the user device file name was preferably left unencrypted by user device 16; hence, it need not be processed to be understood. Also recall that the user device file name uniquely identifies the user device 16 to the PAS 18, and that all of the parameters associated with user device 16 are stored in storage device 406 in a user file having the user device file name as a name. Therefore, using the user device file name as a reference or an index, processor 400 should be able to access 516 the recognition and comprehension parameters corresponding to the specific user device 16. Note, however, that if none of the user files stored in the storage device 406 have the user device file name as a file name, then it means that the user device 16 is an unrecognized device. In such a case, processor 400 preferably terminates communication with the user device 16 to prevent unauthorized access to the provider.

Assuming that one of the user files in storage device 406 has the user device file name as a file name, then the recognition and comprehension parameters corresponding to the user device 16 are accessed. Once the parameters are accessed, processor 400 proceeds to derive 518 a current session key code (CSKC) for use in processing the processed parameters and session codes. Preferably, the CSKC is derived by combining a current user key code (CUKC) stored in the user file with a current provider key code (CPKC) stored in the user file. If all is set up and functioning properly, the CUKC and the CPKC stored in the user file at the PAS 18 should be the same as the CUKC and the CPKC stored on the EKE 14 (in encrypted form). Hence, the CSKC derived by processor 400 should be the same as that used by the user device 16. After the CSKC is derived, the processed parameters and session codes are processed 520 using the CSKC. Preferably, in step 520, processor 400 executes the encryption modules 412 to decrypt the processed parameters and session codes using the CSKC as the decryption key. If the DSA option was implemented by the user device 16, then processor 400 will further decrypt the identification information using the DSA. Once the processed parameters and session codes are decrypted, the EKE identification code, the EAA, and the provider historical file entry, are compared 522 with the reference EKE identification code, the reference EAA, and the reference historical file entry stored in the user file. Only if these parameters are consistent with their corresponding reference parameters will recognition be established.

If recognition is not established the first time, processor 400 preferably grants the user device 16 several more chances to properly identify itself. If after several attempts recognition is not established, then processor 400 implements 525 its default routine. Ideally, communication between the user device 16 and the PAS 18 should be terminated immediately if the PAS 18 does not recognize the user device 16. However, because communications channels are not perfect media, information will sometimes be lost or corrupted on the channels. Hence, the user device 16 may not have properly received update information sent by the PAS 18 in a previous session. To make allowances for such imperfections, PAS 18 grants the user device 16 an alternative (default) method by which to identity itself. In step 525, processor 400 preferably sends a special code to the user device 16 to invoke default mode. Preferably included with this special code are three requests: (1) a request that the user device 16 retrieve some information that is unique to the user device 16 (this information may include parameters from both the last complete and incomplete sessions, for example); (2) a request to process this information using the default key code; and (3) a request to send the processed information to the PAS 18.

In response to the special code and to the requests, the user device 16 implements its default procedures 494 (FIG. 12). Preferably, user device 16 carries out step 494 by retrieving the information requested, processing the information using the default key code in file 1262 of the RAM 40, and sending the processed information to the PAS 18 for verification. Preferably, the requested information is encrypted using the default key code as the encryption key.

Upon receiving the alternate transmission from the user device 16, processor 400 of the PAS 18 decrypts the transmission using the default key code stored in the user file corresponding to the user device 16. This default key code should be the same as that stored in file 162 of the EKE 14 if the user device 16 is a valid device. Thereafter, processor 400 compares the information sent by the user device 16 with reference information stored in the user file. If the two sets of information are inconsistent due to the wrong information being sent or the wrong default key code being used, then processor 400 terminates 527 communication with the user device 16. Invalid user devices are thus precluded from communicating with the PAS 18. On the other hand, if the two sets of information are consistent, then recognition is established and communication between the user device 16 and the PAS 18 is allowed to continue. In such a case. PAS 18 sends a request to the user device 16 to encrypt the FUKC and the session codes using the default key code in file 1262 of the RAM 40, and to send the encrypted information. Upon receiving the requested information from the user device 16, processor 400 decrypts the information using the default key code stored in the user file and derives therefrom the FUKC and the session codes. Recovery 528 from a previous incomplete session is thus achieved.

Once recognition is established between user device 16 and PAS 18, processor 400 proceeds to step 529 to determine whether any of the session codes received from the user device 16 requires an accompanying DPIN. For each set of session codes which requires a DPIN, processor 400 checks 548 for whether a DPIN has been included. If not, then the session codes are disregarded 556. If a DPIN is included, then processor 400 determines 550 whether the DPIN matches the reference DPIN stored in the user file. If the DPIN's do not match, the session codes are disregarded. However, if the DPIN's do match, then processor 400 proceeds to check 552 for an instruction to change a DPIN. If a proper "change DPIN" instruction including a new DPIN is found, then processor 400 replaces the old DPIN with the new DPIN.

Processor 400 thereafter proceeds to step 530 to either process the session codes or to relay the session codes to a separate provider processing device (not shown). Whether the PAS 18 processes the session codes or relays the session codes to another device is a matter of design choice. If the session codes are processed by PAS 18, then processor 400 executes the session code processing module 410 to carry out the processing function. The steps taken in processing the session codes will vary greatly from application to application. Regardless of whether the PAS 18 processes or relays the session codes, once the session codes are processed, a set of confirmation codes is generated. These confirmation codes may include updates to the user historical file 164 on the EKE 14, remote privileges to be stored in file 168 of the EKE 14, and updates to the provider historical file 170 on the EKE 14. Preferably, all remote privileges and updates to the provider historical file 170 are encrypted using a secret provider key code which is unknown to the user device. This ensures that the user device 16 will not be able to access, alter, or comprehend this information. This aspect of the invention is especially useful for the provider historical file 170. Since neither the user nor the user device 16 can access or alter the information contained in file 170, this file can be used as an objective record to resolve account disputes. At this point, it should be noted that each provider historical file update sent by the provider contains two parts: a substantive update portion and a corresponding entry designation. As noted above, the substantive update portion is preferably encrypted using a secret provider code. However, the corresponding entry designation is preferably not encrypted using the secret provider code. This is done to allow the user device 16 to understand and to manipulate the entry designation.

After the confirmation codes are generated, processor 400 goes on to update 534 the recognition and comprehension parameters. Preferably, step 534 is carried out by first storing in the user file in storage 406 the FUKC received from the user device. Along the same line, processor 400 also generates and stores a future provider key code (FPKC) in the user file. Preferably, the FPKC is generated by executing the encryption modules 412, using its random number generating capabilities. These future key codes FUKC, FPKC will be used by the user device 16 and the PAS 18 to derive key codes used in a future communication session between the two devices. In addition, processor 400 preferably further generates a new provider historical file entry designation. This new entry designation indicates to the user device 16 which provider historical file entry to send as identification information in the future communication session.

After the FPKC and the new entry designation are generated, and after the future key codes (FUKC, FPKC) are stored, processor 400 goes on to derive a new user device file name. This new user device file name, which preferably is unique, will be used by the user device 16 to identify itself to the PAS 18 in a subsequent communication session. Hence, the user device file name used in the current session will not be valid in the future session. Once the new user device file name is derived, processor 400 changes the name of the user file, wherein all of the parameters corresponding to the user device 16 are stored, to the new user device file name. This ensures that when the new user device file name is used as a reference or index in a subsequent session, all of the parameters corresponding to the user device 16 will be found. In addition to the key codes and the user device file name, processor 400 may also update the EAA associated with the user device 16. Once that is done, the updating process is complete.

After step 534, processor 400 begins preparing a return transmission to the user device. Processor 534 begins the preparation process by placing 536 the various portions of the return transmission into the proper recognition and comprehension sequence. Any desired sequence may be used, but in the preferred embodiment, the user device file name used in the current session is placed first, followed by the confirmation codes, the FPKC, the new user device file name, the new EAA, and the new entry designation. Positioned in the proper sequence, the message components are now ready to be processed 538.

Preferably, processor 400 carries out the processing step 538 by encrypting (by executing modules 412) all of the message components using a new current session key code. This new current session key code is preferably derived by combining the FUKC and the CPKC stored in the user file. Once the message components are encrypted using the new current session key code as the encryption key, then processor 400 executes the communications control module 410 to assemble the encrypted message components using the proper protocol. Thereafter, processor 400 sends 540 the assembled message components to the user device 16 via the communications interface 404. The flow of operation now switches back to the user device 16.

Referring again to FIG. 11, when the return message from the PAS 18 is received 496 by the user device 16 via the communications interface 34, the processor 30 begins processing 496 the return message. Preferably, processor 30 carries out step 496 by first executing the communications modules 58 to disassemble the message using the proper protocol. Thereafter, processor 30 decrypts the return message using a new current session key code. Preferably, processor 30 derives the new current session key code by combining the FUKC stored in file 1258 of the RAM 40 with the CPKC stored in file 1260 of the RAM 40. Once the return message is decrypted using the new current session key code, processor 30 extracts a decrypted user device file name therefrom and compares 498 this file name with the user device file name stored in file 1254 of the RAM 40. If the file names are not consistent, then recognition is not established; hence, processor 30 disregards 499 the return message.

On the other hand, if the file names are consistent, then processor 30 goes on to update 500 the recognition and comprehension parameters and the historical files. More specifically, processor 30 stores the new user device file name, the new EAA, and the FPKC received from the PAS 18 into files 1254, 1256, and 1260 of the RAM 40, respectively. In addition, processor 30 stores the new entry designation. Furthermore, processor 30 stores user updates into the user historical file 1264, stores encrypted provider updates into the provider historical file 170, stores the entry designations corresponding to the encrypted provider updates into file 1270, and stores any encrypted remote privileges into the remote privilege authorization file 168 of the EKE 14. The updating process is thus complete. The current communication session between the user device 16 and the PAS 18 is also complete. Hence, processor 30 transfers 502 control back to the UAS-EKE control portion 1142.

The next time the user device 16 communicates with the PAS 18, the same general process shown in FIGS. 11 and 12 will be implemented. However, note that in the next communication session, different recognition and comprehension parameters will be used. In particular, the new user device file name will be used by the user device 16 to identify itself to the PAS 18. Also, the new EAA will be sent to the PAS 18 instead of the EAA used in this past session. In addition, a different provider historical file entry, indicated by the new entry designation, will be sent to the PAS 18. Furthermore, the session key code which will be used to process the parameters and session codes will be derived by combining the future user key code (FUKC) and the future provider key code (FPKC) stored in files 1258 and 1260 of the RAM 40, respectively. The same updated parameters are preferably also stored in the user file stored in the PAS storage device 406 (assuming that the previous session was properly completed); hence, the user device 16 and the PAS 18 will be able to recognize and comprehend one another. In the manner described above, the user device 16 and the PAS 18 of the present invention are able to effect secure communication through a general purpose communications link.

User Device-PAS Operation Using Public Key Exchange Scheme

Thus far, the invention has been described as implementing a communication methodology wherein a single current session key code is used both to encrypt and to decrypt information transferred between the user device 16 and the PAS 18. While this methodology is effective, there are other methodologies which may be used. One possible alternative methodology involves the use of a public key exchange (PKE) scheme. The basic concept underlying the PKE scheme is that a key code may be split into two portions: a public portion and a private portion. The public portion is used to encrypt information, while the private portion is used to decrypt the encrypted information. Important points to note are that: (1) the public portion of the code cannot be used to decrypt the encrypted information; and (2) it is extremely difficult to derive the private portion given just the public portion. Thus, under the PKE scheme, a number of different components can have and use the public portion of the code to encrypt information, but only a component having the private portion of the code can decrypt and, thus, understand the information. Such an encryption scheme can be implemented advantageously in the system of the present invention.

In system 10, a PKE scheme is implemented preferably by using two public/private codes. First, a user code, having a public portion and a private portion, is used to communicate with the user device 16. Specifically, the public portion of the user code is used by the PAS 18 to encrypt information sent to the user device 16, while the private portion of the user code is used by the user device 16 to decrypt information received from the PAS 18. Second, a provider code, also having a public and a private portion, is used to communicate with the PAS 18. In particular, the public portion of the provider code is used by the user device 16 to encrypt information sent to the PAS 18, while the private portion of the provider code is used by the PAS 18 to decrypt information received from the user device 16. These two public/private codes are preferably updated in accordance with the teachings of the present invention to enhance the security of the system. To ensure that the user device 16 and the PAS 18 will be able to understand each other in an initial communication session, code portions are preferably pre-stored in both components. Specifically, the private portion of the user code and the public portion of the provider code are preferably pre-stored in files 158 and 160, respectively, of the EKE 14. Likewise, the public part of the user code and the private part of the provider code are preferably pre-stored in the user file corresponding to the user device 16 in the storage 406.

Figure 13:
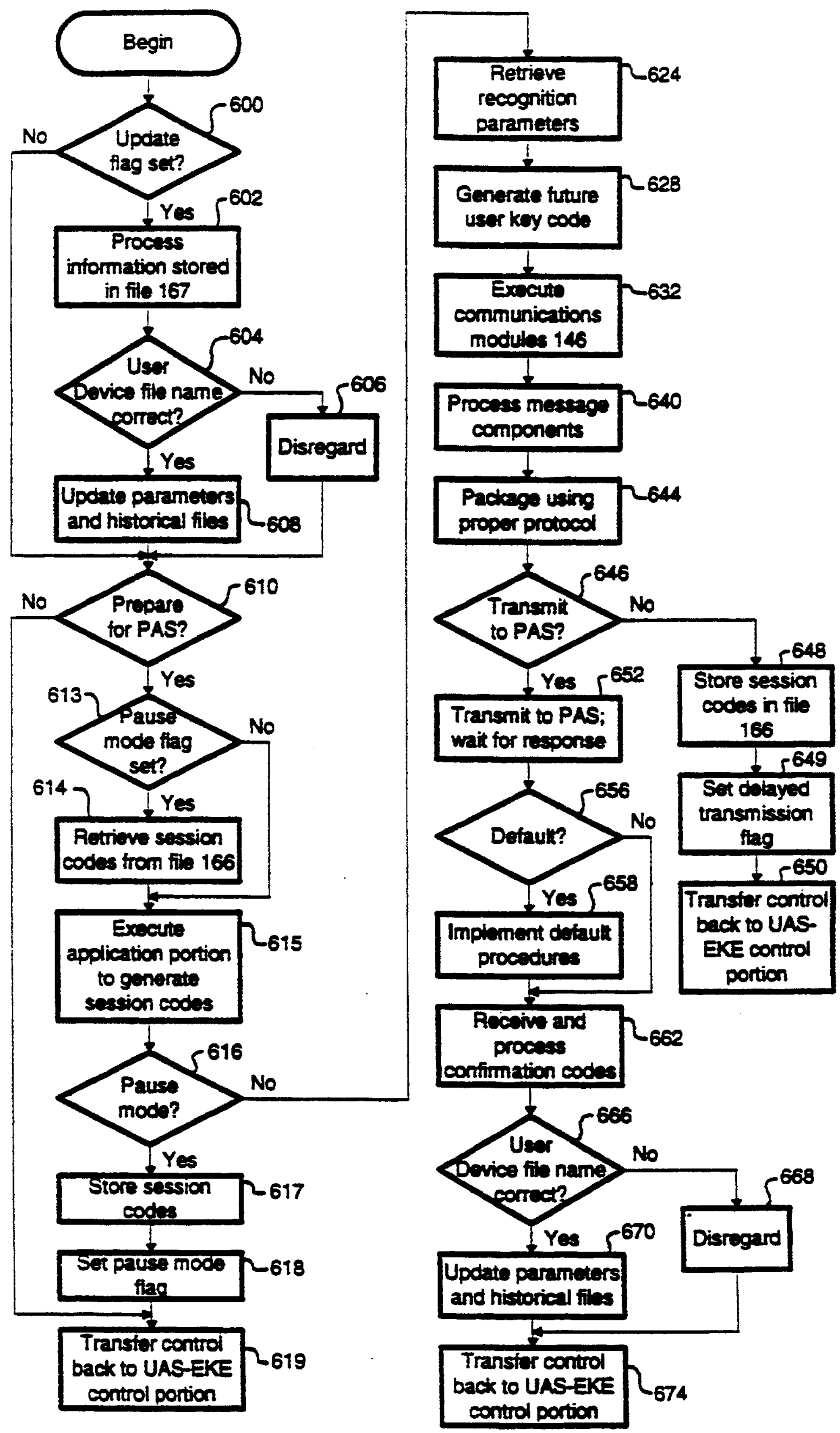
FIG. 13 is an operational flow diagram for a second preferred embodiment of the user device-PAS interaction control portion 144 of the PFM 140.
Figure 14:
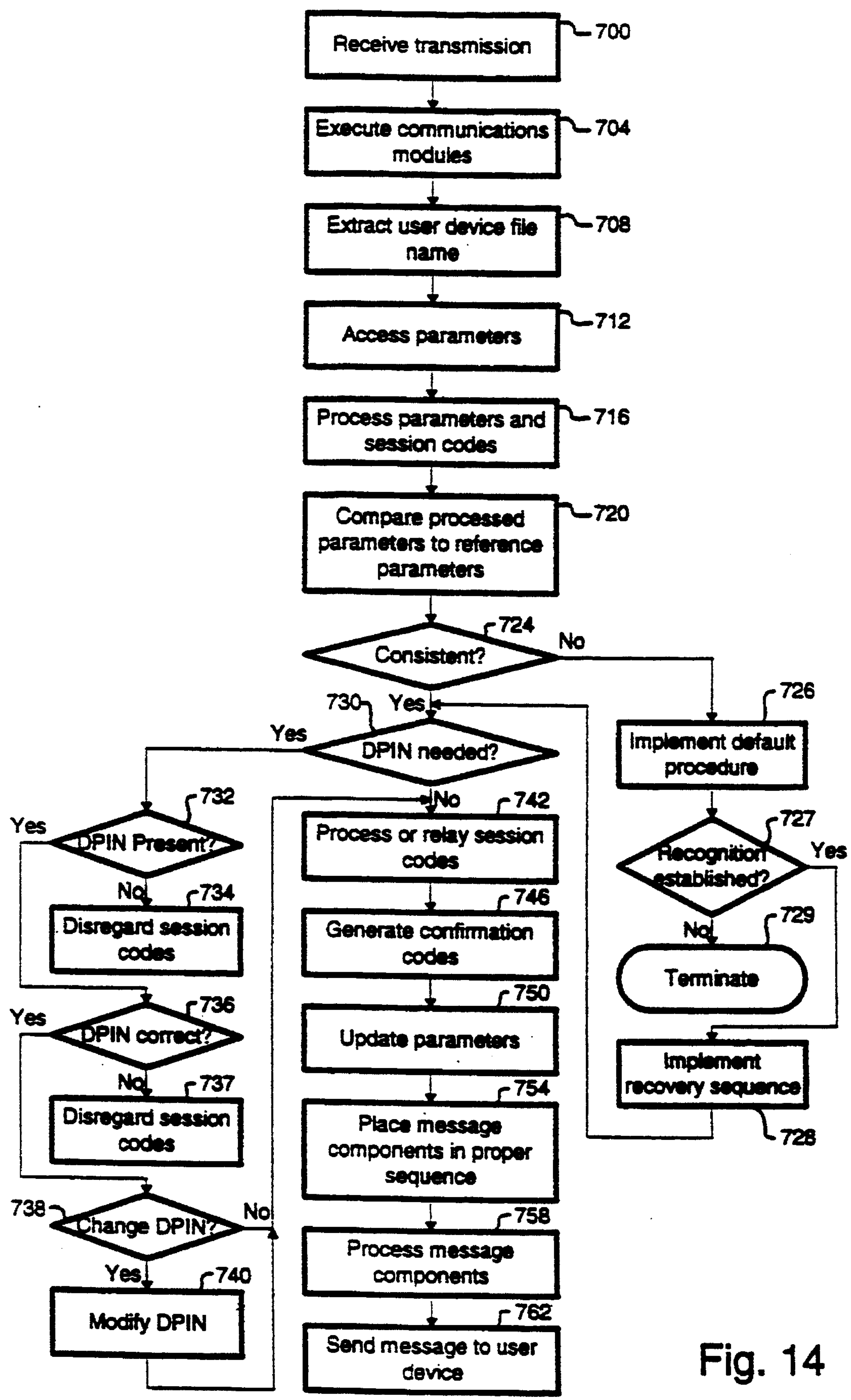
FIG. 14 is an operational flow diagram for a second preferred embodiment of the recognition and comprehension control program 408 of the PAS 18.

In order to implement a PKE scheme in system 10 of the present invention, the user device-PAS control portion 1144 (FIG. **9*b*) and the recognition and comprehension control program 408 (FIG. 10) will need to be modified. Preferably, portion 1144 takes the new form shown in FIG. 13, and program 408 takes the new form shown in FIG. 14. Note that the flow diagram of FIG. 13 is substantially similar to that of FIG. 11, and that the flow diagram of FIG. 14 is substantially similar to the flow diagram of FIG. 12. This similarity arises from the fact that for the most part, the functions performed by control programs 1144, 408** remain the same for the public/private key code embodiment. The only difference is that information is exchanged in a different manner.

With reference to FIGS. 13 and 14, the exchange of information in system 10 using public/private codes will now be described in detail. As stated previously, user device 16 commences interaction with the PAS 18 by having processor 30 execute the user device-PAS control portion 1144. Under control of portion 1144, processor 30 begins the interaction process by checking 600 for the update flag. If the update flag is not set, then processor 30 proceeds to step 610. However, if the update flag is set, then it means that delayed transmission mode was invoked in a previous session, which in turn means that there is a return message from the PAS 18 stored in file 167 of the EKE 14 which requires processing. In such a case, processor 30 carries out step 602 to process the stored message. Specifically, processor 30 retrieves a current user private code (CUPRC) from file 1258 of the RAM 40 (which represents the private portion of the current user code), and uses this CUPRC to decrypt the return message from the PAS 18. Once the return message is decrypted (and thereafter preferably purged from file 167), processor 30 extracts a user device file name therefrom and compares 604 the extracted file name to the user device file name stored in file 1254 of the RAM 40. If the two file names are not consistent, then recognition is not established. Hence, the return message is disregarded 606. On the other hand, if the two file names are consistent, then processor 30 goes on to update 608 the recognition and comprehension parameters and the historical files using the decrypted information from file 167. The parameter updates may include storing a new user device file name in file 1254, storing a future provider public code in file 1260, and possibly some other updates. After updating the user device 18, processor 30 proceeds to step 610 to carry out its regular preparation functions.

In step 610, processor 30 determines whether the user wishes to prepare a transmission for sending to the PAS 18. This determination is preferably made by soliciting a response from the user. If transmission preparation is not desired, then processor 30 transfers 619 control back to the UAS-EKE control portion 1142. However, if the user wishes to prepare a transmission for the PAS 18, then processor 30 proceeds to step 613 to check for the "pause mode" flag. If this flag is set, then it means that session codes from a previous session are stored in file 166 of the EKE 14. In such a case, processor 30 preferably retrieves 614 (and thereafter purges) the session codes from file 166 so that the previously generated session codes may be used in the current session. If the "pause mode" flag is not set, then processor 30 skips step 614 and proceeds to step 615.

In step 615, processor 30 executes the application portion 145 of the provider-specific software 141 to allow the user to generate session codes to send to the PAS 18. After step 615 is implemented, processor 30 queries 616 the user as to whether the user wishes to invoke pause mode. If so, then processor 30 stores 617 the already generated session codes into file 166 of the EKE 14, sets 618 the "pause mode" flag, and thereafter transfers 619 control back to the UAS-EKE control portion 1142. On the other hand, if the user does not want to invoke pause mode, then processor 30 proceeds to step 624, wherein the processor 30 retrieves selected recognition parameters from the RAM 40. These parameters include the user device file name stored in file 1254 and at least one set of identification information. In the preferred embodiment, the identification information includes the EKE identification code, the EAA, and a selected entry from the provider historical file 170. This identification information is included for recognition purposes.

After retrieving the recognition parameters, processor 30 executes the encryption modules 56 to generate 628 a future user code. This user code preferably includes a public portion, referred to as the future user public code (FUPUC) and a private portion, referred to as the future user private code (FUPRC). The FUPRC is stored in file 1258 for future reference, while the FUPUC will be sent to the PAS 18. These future codes will be used in a future communication session to achieve comprehension with the user device 16. Once the future user key code is generated, processor 30 executes 632 the communications modules portion 146 of the provider-specific software 141. As noted previously, portion 146 causes the session codes to be organized in a manner expected by the PAS 18.

After step 632, processor 30 proceeds to step 640 to process the parameters and key codes. In step 640, processor 30 preferably first places the parameters and session codes into proper order. In the preferred embodiment, the user device file name is placed at the beginning of the sequence, followed by the identification information, the session codes, and the FUPUC. Once properly sequenced, the message components are processed 640. Preferably, processor 30 processes the parameters and session codes by first retrieving a current provider public code (CPPUC) from file 1260 of the RAM 40, which represents the public portion of the current provider code used by the PAS 18. Thereafter, processor 30 preferably uses the CPPUC as an encryption key to encrypt all of the message components except for the user device file name. Preferably, encryption is carried out by executing the encryption modules 56. As an option, to conform with the NIST's digital signature standard, the identification information may be encrypted using the DSA before being encrypted using the CPPUC. If this option is chose, then the identification information will be double-encrypted when sent to the PAS 18. The identification information thus processed will serve as the digital signature of the user device 16. After the message components are processed, processor 30 executes the communications module 58 to package 644 the processed message components using the proper protocol. After step 644, the information packet is ready to be sent to the PAS 18.

At this point, processor 30 prompts the user to determine whether the user wishes to invoke delayed transmission mode. If so, then processor 30 stores 648 the information packet into file 166 for subsequent transmission to the PAS 18, sets 649 the delayed transmission flag, and transfers 650 control back to the UAS-EKE control portion 1142. On the other hand, if delayed transmission mode is not desired, then processor 30 sends 652 the information packet to the PAS 18 via the communications interface 34 and waits for a response. The flow of operation now switches to the PAS 18.

Referring now to FIG. 14, the PAS processor 400, under control of the recognition and comprehension control program 408, receives 700 the information packet from the user device 16 via the communications interface. Upon receiving the packet, processor 30 executes the communications module 410 to disassemble the packet using the proper protocol. Once the packet is disassembled, processor 400 extracts 708 the unencrypted user device file name from the packet and, using this user device file name as a reference, the processor 400 accesses 712 the user file in storage 406 corresponding to the user device 16. This user file contains all of the relevant recognition and comprehension information for the user device 16. Once the user file is accessed, processor 400 retrieves a current provider private code (CPPRC) from the user file, and uses this CPPRC to process 716 the information in the packet. Preferably, in step 716, processor 400 executes the encryption modules 412 to decrypt the information in the packet using the CPPRC as the decryption key. If the DSA option was implemented by the user device 16, then processor 400 will further decrypt the identification information using the DSA. After the information is decrypted, the identification information included in the packet is compared 720 with reference identification information stored in the user file. More specifically, the EKE identification code is compared with a reference identification code, the EAA is compared with a reference EAA, and the provider historical file entry is compared with a reference file entry. If the two sets of identification information are consistent, then recognition is established. Otherwise, processor 400 grants the user device 16 several more chances to identify itself. If after these additional opportunities recognition is still not established, then processor 400 preferably carries out its default/recovery procedure 726–729. Steps 726–729 are substantially the same as steps 525–528 previously described; hence, they need not be described again here. Also, the default procedure implemented by the user device 16 in step 658 (FIG. 13) is substantially the same as that implemented in step 494, which was previously described. Thus, step 658 need not be described again here.

Once recognition is established, processor 400 proceeds to step 730 to determine whether any of the session codes received from the user device 16 requires an accompanying DPIN. For each set of session codes which requires a DPIN, processor 400 checks 732 for whether a DPIN has been included. If not, then the session codes are disregarded 734. If a DPIN is included, then processor 400 determines 736 whether the DPIN matches the reference DPIN stored in the user file. If the DPIN's do not match,, the session codes are disregarded. However, if the DPIN's do match, then processor 400 checks 738 for an instruction to change a DPIN. If a proper "change DPIN" instruction is found, then processor 400 replaces 740 the old DPIN with the new DPIN included in the "change DPIN" instruction.

Thereafter, processor 400 proceeds to step 742 to either process the session codes or to relay the session codes to a separate provider processing device (not shown). Whether the processor 400 processes or relays the session codes is a matter of design choice. If the processor 400 is responsible for processing the session codes, then it executes the session code processing program 414 to carry out this function. Regardless of whether the PAS 18 processes or relays the session codes, once the session codes are processed, a set of confirmation codes is generated. Preferably, the confirmation codes contain information such as updates to the user historical file, encrypted (using provider encryption unknown to the user) updates to the provider historical file, and encrypted (using provider encryption unknown to the user) remote privileges to be stored in file 168.

Once the confirmation codes are derived 746, processor 400 begins updating 750 the recognition and comprehension parameters. A number of operations are performed in step 750. First, processor 400 generates a future provider code having a public portion, re/erred to as the future provider public code (FPPUC), and a private portion, referred to as the future provider private code (FPPRC). These future codes FPPUC, FPPRC will be used in a subsequent communication session to achieve comprehension with the PAS 18. The FPPRC is preferably stored in the user file for future reference by the processor 400, while the FPPUC is sent as an update to the user device 16. Also, in step 750, processor 400 stores the FUPUC received from the user device 16 in the user file for future reference. This future code will be used to encrypt a future message to the user device. In addition, in step 750, processor 400 generates a new user device file name to be used by the user device in a subsequent session to identify itself to the PAS 18. Once the new user device file name is generated, processor 400 changes the name of the user file to the new user device file name. This ensures that when the new user device file name is later used as a reference, the proper user file will be accessed. Furthermore, a new EAA may be generated. Finally, in step 750, processor preferably sets a new entry designation for the user device 16. Recall that in identifying itself to the PAS 18, the user device 16 sends a designated entry of the provider historical file to the PAS 18 as identification information. Changing the entry designation will cause the user device to send a different set of identification information in the next session. Hence, the identification information is indirectly changed and updated.

After step 750, processor 400 begins preparing a return message to the user device 16. First, processor 400 places 754 all of the message components into the proper recognition and comprehension sequence. Preferably, the user device file name is placed first in the sequence, followed by the confirmation codes, the FPPUC, the new user device file name, the new EAA, and the new entry designation. Once in the proper sequence, the message components are processed 758 using a current user public code (CUPUC) stored in the user file. Preferably, in step 758, processor 400 executes the encryption modules 412 to encrypt the message components using the CUPUC as the encryption key. After the message components are processed, processor 400 executes the communication module 410 to package the return message components using the proper protocol. Thereafter, the return message is sent 762 to the user device via the communications interface 404. The flow of operation now switches back to the user device 16.

Referring again to FIG. 13, processor 30 of the user device 16 receives the return message from the PAS 18 via the communications interface 34. Upon receipt of the return message, processor 30 begins processing 662. Preferably, processor 30 processes the return message by first executing the communication modules 58 to disassemble the return message using the proper protocol. Once the message is disassembled, processor 30 decrypts the message components using a current user private code (CUPRC) stored in file 1258 of the RAM 40. After the message is decrypted, the processor 30 extracts the user device file name from the message, and compares 666 it to the user device file name stored in file 1254 of the RAM 40. If the two file names are not consistent, then recognition is not established; hence, the return message is disregarded 668. On the other hand, if the two file names are consistent, then processor 30 proceeds to update 670 the parameters and historical files. More particularly, processor 30 stores the new device file name into file 1254 of the RAM 40, and the new EAA into file 1256. Also, processor 30 stores the FPPUC received from the PAS 18 into file 1260 for future reference. In addition, processor 30 stores user historical updates into file 1264, provider encrypted historical updates into file 170, and encrypted remote privileges into file 168. Finally, processor 30 stores the new entry designation received from the PAS 18. This new designation will be used in the next communication session to determine which entry of the provider historical file 170 to send to the PAS 18 as identification information. After updating the user device 16 as described, the current communication session is completed. Thus, control is transferred 674 back to the UAS-EKE control portion 1140.

In the next communication session between the user device 16 and the PAS 18, the same general sequence of operation as that described in connection with FIGS. 13 and 14 will take place. However, in the next session, different recognition and comprehension parameters will be used. Specifically, user device 16 will identify itself using the new user device file name instead of the user device file name used in this past session. A different set of identification information will be sent to the PAS 18, including a new EAA and a different provider historical file entry. The user device 16 will use the FPPUC to encrypt the information sent to the PAS 18. The PAS 18 will use the FPPRC to decrypt the information received from the user device 16. The PAS 18 will use the FUPUC to encrypt the return message to the user device 16. Finally, the user device 16 will use the FUPRC to decrypt the return message from the PAS 18. As shown by the above description, the system 10 of the present invention is quite dynamic. This dynamic nature, combined with the implementation of the unique recognition and comprehension methodologies, makes the system 10 highly secure. This high level of security in turn makes it possible to conduct important transactions via a general purpose communications link. This desirable result was not realistically achievable with the prior art systems. Hence, the present invention provides a significant improvement over the prior art.

Representative Applications of the Present Invention

As noted above, one of the major advantages of the present invention is that it can be implemented in a wide variety of applications to achieve a wide variety of purposes. To illustrate the versatility of the invention, several representative applications will now be described. Overall, the invention may be applied to at least three broad categories of systems: (1) communications systems: (2) transactional systems; and (3) authorization systems. As used herein, a communications system refers to a system wherein two devices exchange information via a communications link, a transactional system refers to a system wherein two devices cooperate to complete one or more transactions via a communications link, and an authorization system refers to a system wherein a requesting device receives authorization from a coordinating device via a communications link. As defined, these categories are not mutually exclusive; hence, some of the systems described below may fall within more than one of these categories.

Communications Applications

Figure 15:
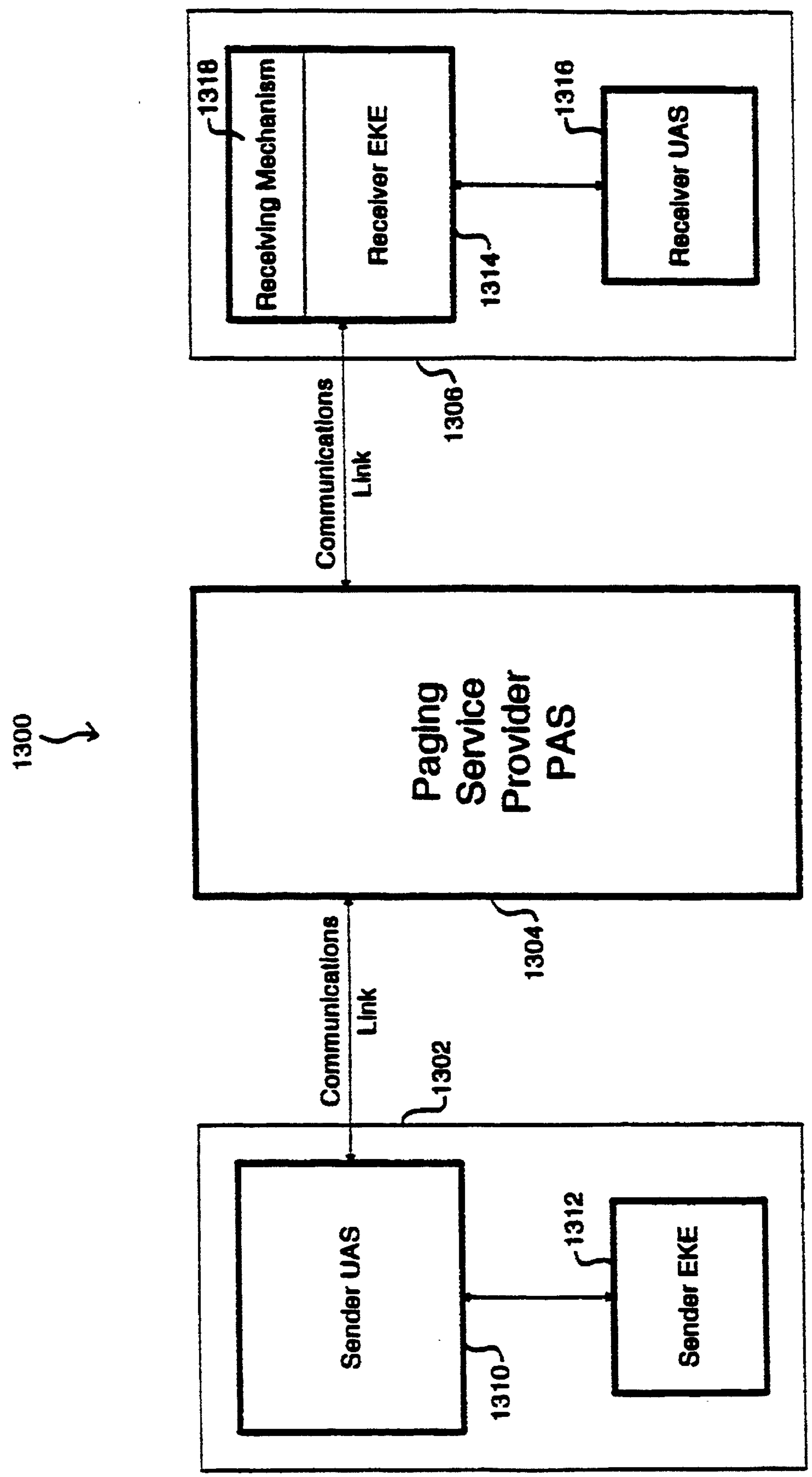
FIG. 15 is a block diagram representation of a paging system 1300 having the present invention incorporated therein.

One of the communications systems in which the present invention may be implemented is a personal message management system. A block diagram of such a system 1300 is shown in FIG. 15, comprising a user sending device 1302, a paging service provider PAS 1304, and a user receiving device 1306. In system 1300, user sending device 1302 generates a message for the receiving device 1306, and thereafter passes the message on to the PAS 1304. In rum, the PAS 1304 processes the message and passes it on to the appropriate receiving device 1306. No human intervention is needed. To generate a message, the user sending device 1302 is first formed by coupling the sender UAS 1310 to the sender EKE 1312. Preferably, when devices 1310 and 1312 are coupled together, they implement the recognition and comprehension methodologies of the present invention to ensure that they are authorized to interact with each other. Once it is determined that the devices 1310, 1312 may interact, a message is generated using the user sending device 1302. This message may be encrypted in accordance with an encryption key which is pre-established between the sending device 1302 and the receiving device 1306. Encrypting the message in this manner ensures that the service provider will not be able to understand the message. Once the message is generated and encrypted, the sending device 1302 passes the message on to the PAS 1304. Preferably, the recognition and comprehension methodologies described above with regard to user device 16 and PAS 18 are implemented between devices 1302 and 1304. This serves: (1) to verify that the devices 1302, 1304 are authorized to communicate with one another; and (2) to ensure that communication between the sending device 1302 and the PAS 1304 is secured. Note that by the time the message arrives at the PAS 1304, the message has been double-encrypted. It was first encrypted using the encryption key established between device 1302 and 1306. It was double-encrypted using an encryption key pre-established between device 1302 and the PAS 1304.

When the PAS 1304 receives the message from sending device 1302, it carries out the recognition and comprehension methodologies of the present invention to determine whether the sending device 1302 is a recognized or valid device. Once the paging service provider PAS 1304 determines that sending device 1302 is a recognized device, it decrypts the message from the sending device 1302 using the encryption key pre-established between the sending device 1302 and the PAS 1304. Thereafter, the PAS 1304 reencrypts the message using an encryption key pre-established between the PAS 1304 and the receiving device 1306. After this procedure, the message is again double encrypted. More particularly, the message carries both the encryption imposed by the sending device 1302, and the encryption imposed by the PAS 18. Thereafter, PAS 1304 relays the double encrypted message to the receiver EKE 1314 of the receiving device 1306. In the preferred embodiment, the receiver EKE 1314, in addition to being a regular EKE, further comprises a receiving mechanism 1318 for receiving and storing the message from the PAS 1304. The receiving mechanism may be a standard receiving mechanism, such as that found on currently available pagers. Once received, the message is stored on EKE 1314 for subsequent reference.

To read the message from the sending device 1302, the receiver EKE 1314 is coupled to the receiver UAS 1316. Preferably, the recognition and comprehension methodologies described above in connection with UAS 12 and EKE 14 are carried out between devices 1314 and 1316 to verify that the devices are authorized to interact. Once authorization is verified, the receiving device 1306 decrypts the message by first using the encryption key pre-established between the PAS 1304 and the receiving device 1306, and then by using the encryption key pre-established between the sending device 1302 and the receiving device 1306. Once decrypted, the message is read by the user via the display of the receiver UAS 1316. The message is thus conveyed from the sender to the receiver. In the manner described, the system 1300 of FIG. 15 allows a message to be securely sent from one user to another with no human intervention.

Figure 16:
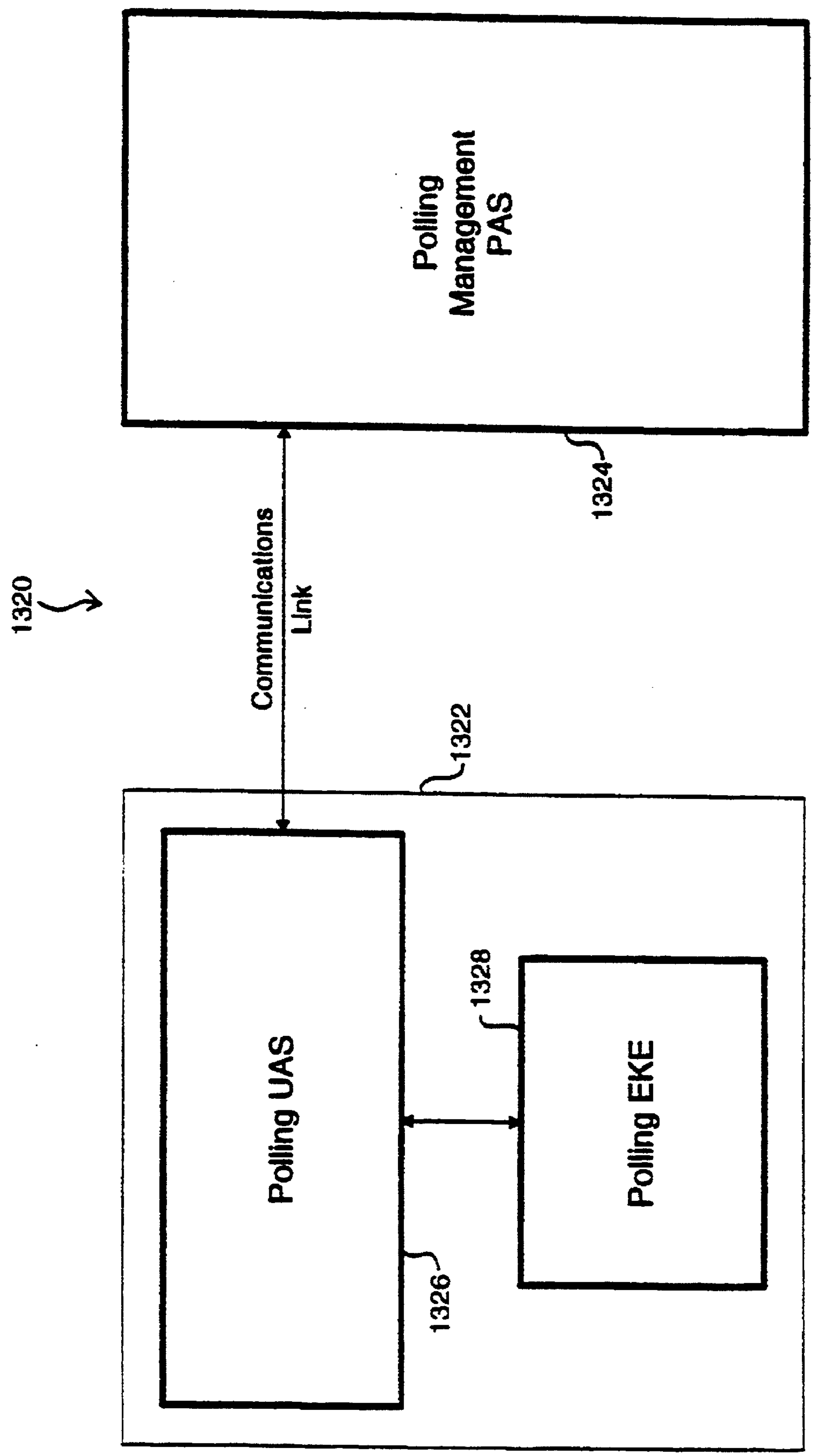
FIG. 16 is a block diagram representation of an electronic polling system 1320 having the present invention incorporated therein.

Another communications system in which the present invention may be implemented is an electronic polling management system. Such a system 1320 is shown in FIG. 16, comprising a polling device 1322, formed by a polling UAS 1326 and a polling EKE 1328, and a polling management PAS 1324. In the system 1320 of FIG. 16, it is envisioned that the PAS 1324 will be managed and operated by a polling authority, and that the polling EKE 1328 will be provided by the polling authority containing all of the necessary information and software. Preferably, each polling EKE 1328 is assigned to one and only one voter and is uniquely recognizable by the PAS 1324. This ensures that each voter can vote only once in each poll or election.

In system 1320, to cast a vote, a voter inserts the polling EKE 1328 into his own UAS 1326. Preferably, devices 1326 and 1328 implement the recognition and comprehension methodologies of the present invention to verify that the devices are authorized to interact with each other. After it is determined that the devices are authorized to interact, the UAS 1326 runs the balloting software on the polling EKE 1328 to allow the voter to enter his vote or votes. Once the votes are entered, the polling device 1322 processes and sends the polling information on to the PAS 1324 via the communications link. Preferably, in processing and sending the polling information, the polling device 1322 implements the recognition and comprehension methodologies of the present invention. When the processed polling information is received by the polling management PAS 1324, the PAS 1324 in turn implements the recognition and comprehension methodologies of the present invention. More specifically, PAS 1324 determines whether the polling device 1322 is a valid device. If so, then PAS 1324 decrypts the polling information using an encryption key pre-established between the polling device 1322 and the PAS 1324 to extract the original polling information therefrom. Once decrypted, the polling information is entered and properly processed. In the manner described, the system 1320 of FIG. 16 allows a voter to vote securely from a remote location.

At this point, it should be noted that in system 1320, the same polling EKE 1328 may be used over and over again to vote in multiple polls and elections. This is because the polling information sent by the polling device 1322 to the PAS 1324 is just a series of alpha or numeric choices. No poll-specific or election-specific information is included in the transmission or in the polling EKE 1328. Instead, the PAS 1324 ascertains what each choice from the polling device 1322 represents by consulting the official ballot published for that particular poll or election. The voter enters his choices into the polling device 1322 using the same official ballot. Thus, by using the official ballot as a common reference, the user device 1322 and the PAS 1324 are able to understand one another. In the next poll or election, a different official ballot will be published; thus, each choice from the polling device 1322 will represent a different vote for a different matter. By using the official ballot as the election reference guide, no election-specific or poll-specific information will need to be installed on the polling EKE 1328. As a consequence, the same polling EKE 1328 can be used for each and every poll or election. All that needs to be newly provided for each poll or election is the official ballot. By setting the system 1320 up in this manner, component costs are kept to a minimum.

Transactional Applications

Figure 17:
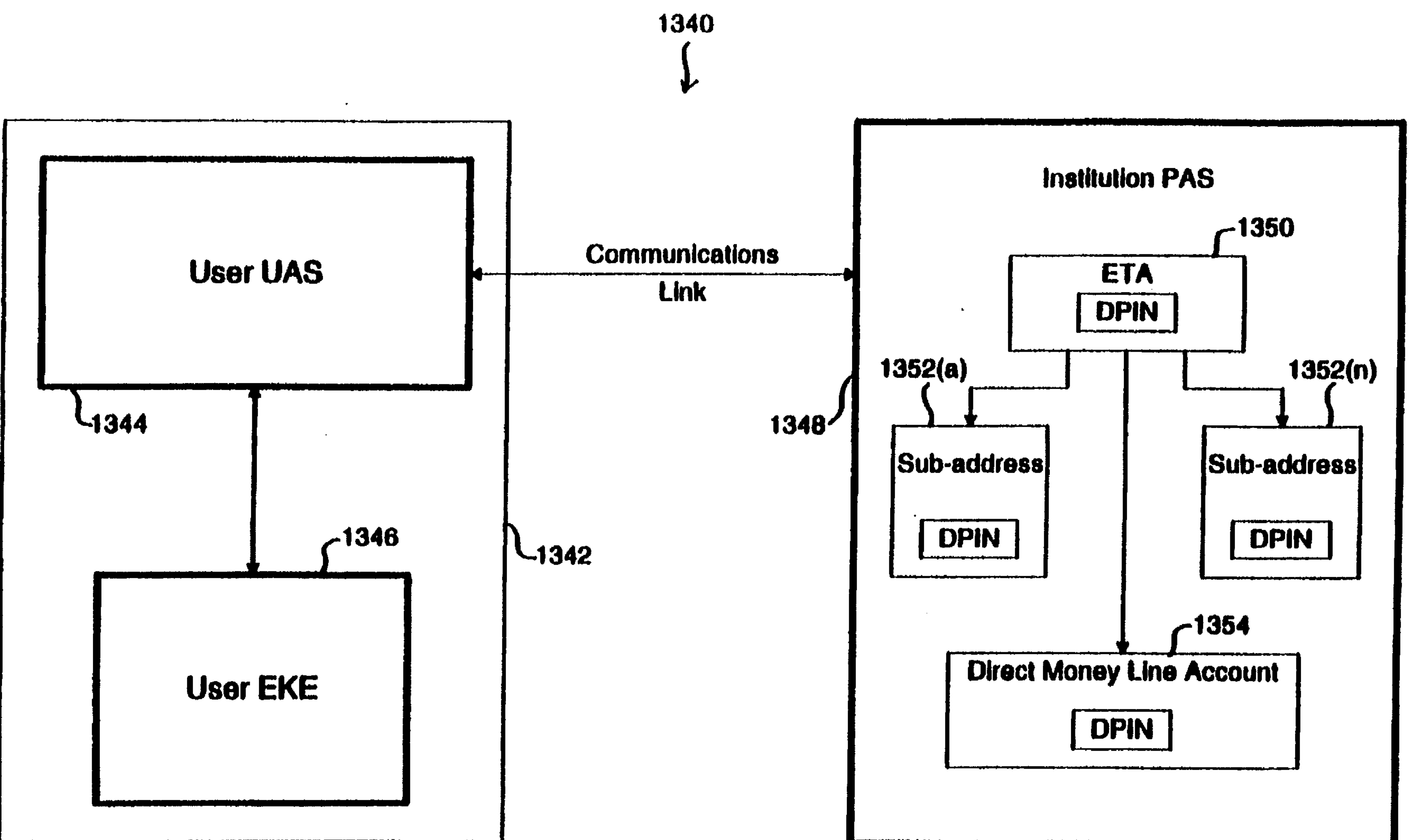
FIG. 17 is a block diagram representation of an electronic banking system 1340 having the present invention incorporated therein.

The present invention may also be applied to transactional systems. A transactional system in which the present invention is implemented is shown in FIG. 17. The personal banking management system 1340 of FIG. 17 is quite similar to the basic system 10 shown in FIG. 1, comprising a user UAS 1344 and a user EKE 1346 (which together form the overall user device 1342), and an institution PAS 1348. In system 1340, it is envisioned that the PAS 1348 is managed and operated by a financial or securities institution, and that the user EKE 1346 is provided by the institution combining all of the information and software needed to communicate with the institution PAS 1348.

In general, system 1340 operates in much the same manner as the basic system 10 described above. Particularly, the user EKE 1346 couples to the user UAS 1344 to form the overall user device 1342 which communicates with the institution PAS 1348. Before operating as a unit, however, devices 1344 and 1346 implement the recognition and comprehension methodologies of the present invention to verify that they are authorized to interact, to decrypt the encrypted information stored on the user EKE 1346, to perform file management functions, and to dynamically update the recognition and comprehension parameters. Once recognition and comprehension is achieved, devices 1344 and 1346 operate as a unit to communicate with the PAS 1348. Preferably, user device 1342 and PAS 1348 cooperate to carry out the recognition and comprehension methodologies of the present invention to determine whether the user device 1342 and the PAS 1348 are authorized to transact, and to ensure that communication between the devices is secure. In addition, the devices 1342, 1348 cooperate to dynamically update the recognition and comprehension parameters. These aspects of the invention were previously described and need not be described again here.

Assuming that all of the proper components are used and that recognition and comprehension is established among all of the components, a user can remotely access his account using system 1340 by sending an encrypted transaction address (EAA) to the PAS 1348. This EAA will be decrypted by the provider to derive an encrypted transaction address (ETA). This ETA, when derived, grants access to the main file 1350 in the PAS 1348 in which all of the account information pertaining to the user is stored. The ETA file may have a DPIN associated therewith, in which case, the user will need to provide a DPIN along with the ETA in order to access the main file. As shown in FIG. 17, contained in the main file may be a plurality of sub-files 1352(*a*)–1352(*n*), with each sub-file having an associated sub-address and possibly a DPIN. These sub-files may represent different sub-accounts within the main file, such as a checking account, a savings account, a credit card account, or a dynamic money line account 1354. To access these sub-files, the user will need to provide the sub-address and the DPIN for each accessed sub-file. Once the sub-files are properly accessed, the user may manipulate the accounts as he wishes, including transferring funds from one sub-account to another. Among the parameters that a user can manipulate am the DPIN's. The user can change any or all of the DPIN's by sending the proper instructions to the PAS 1348.

An interesting and useful aspect of the system 1340 of FIG. 17 is the direct money line account (DMLA) 1354. In the preferred embodiment, this account is used as the base account for a direct money line card (DMLC), which may be used in the same manner as a debit card. Each time the DMLC is used, the DMLA is accessed and funds are deducted therefrom. To increase the amount that can be spent using the DMLC, a user simply needs to transfer more funds from one or more of the other sub-accounts into the DMLA 1354. Conversely, to limit the amount that can be spent using the DMLC, a cap amount can be placed in the DMLA. This aspect of the invention is quite useful for imposing limits on the amount of money that can be spent by an individual using the DMLC. In addition to absolute spending limits, several other parameters may also be imposed on the DMLA. For example, a maximum amount per period may be imposed on the DMLA to limit the amount that can be spent using the DMLC during any period of time. Also, dollar dependent DPIN's may be set in the DMLA so that in order to access larger amounts of funds, higher order DPIN's are required. In addition, a notification parameter can be set in the DMLA which dictates that when a certain condition occurs (e.g. when a certain amount of funds is withdrawn from the DMLA), the PAS 1348 pages or otherwise notifies the user. This feature is useful in notifying the user of possible fraudulent use of the DMLC. Furthermore, certain retailer code restrictions may be imposed on the DMLA so that certain items (such as liquor, firearms, etc.) cannot be purchased using the DMLC. As these examples illustrate, the combination of the DMLA and the DMLC gives a user a great deal of control over his liquid funds, control that is not attainable with cash. By using system 1340 to manipulate the DMLA, a user can freely control, from practically anywhere, the amount of electronic cash immediately available to him through the DMLC, and the manner in which that electronic cash is used. With a DMLC, a DMLA, and the present invention, a user will no longer need to visit an ATM or to carry cash.

Once a user has an ETA established with his bank, then that ETA may be used by other parties to post transaction notices. These notices may be payment requests from creditors or deposits from debtors. Preferably, only parties which have been granted permission by the user may post notices in the user's ETA account. These account-to-account postings may be effected over normal settlement or dedicated networks in accordance with rules and conventions established by PAS operators. When a notice is posted in the user's ETA account, that posting will appear the next time the user accesses his ETA account. At that point, the user can decide whether to take action in response to the posting. More specifically, the user can decide whether to make the requested payment from one of his sub-accounts, and whether to accept the deposit into one of his sub-accounts. No action will be taken unless authorized by the user. Thus, system 1340 of the present invention offers a user the convenience of account-to-account postings without any sacrifice in security.

In system 1340, after a transaction is completed, the PAS 1348 generates and sends confirmation codes to the user device 1342. These confirmation codes, which include records of the transaction, are stored as updates in both the user historical file 164 and the provider historical file 170 (FIG. 6) of the user EKE 1346. These records serve as a memorial of the transaction. The user historical file 164 of the user EKE 1346 can be accessed and reviewed by the user (using the user UAS 1344) at any time. Hence, the user historical file serves as a partial running statement of all of the user's accounts.

Thus far, the transactional aspect of the present invention has been described with reference to a banking system. It should be noted, however, that the present invention may be applied to many other transactional systems. For example, the system 1340 shown in FIG. 17 may be used to effect direct purchase transactions between consumers and product and service providers. Also, system 1340 may be used to directly effect securities transactions between investors and market operators. In addition, system 1340 may be used by users to directly manage their personal benefits portfolio without employer support. These and other transactional applications are within the scope and contemplation of the present invention.

Authorizational Applications

Figure 18:
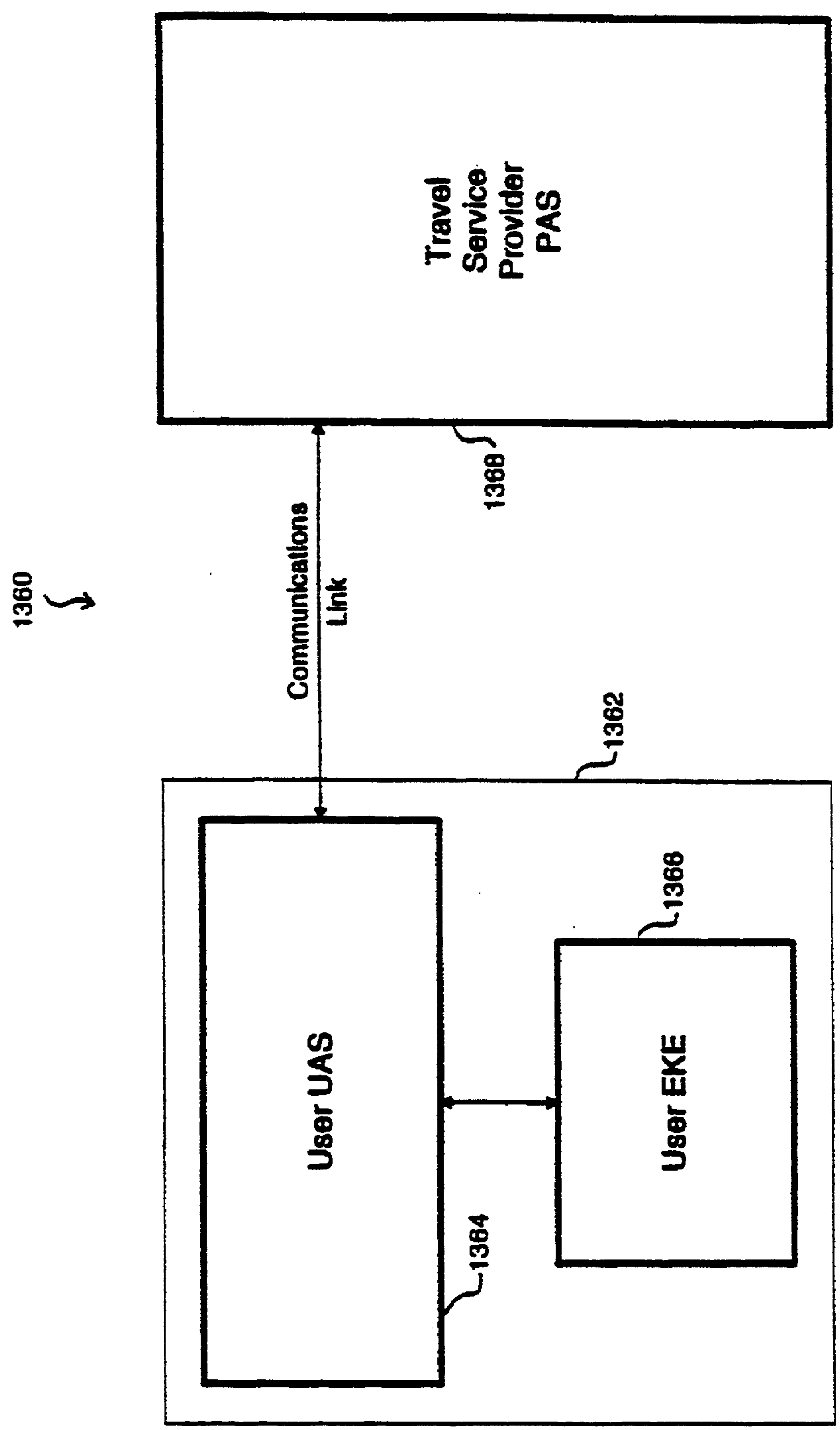
FIG. 18 is a block diagram representation of an electronic authorization system 1360 having the present invention incorporated therein.

As mentioned above, the present invention may also be applied to authorization systems. An example of an authorization system 1360 in which the present invention is implemented is shown in FIG. 18. System 1360 preferably comprises the three basic components of the present invention: a user UAS 1364; a user EKE 1366 which couples to the user UAS to form the overall user device 1362; and a travel service provider PAS 1368. System 1360 is quite similar to the transactional system 1340 shown in FIG. 17, both in form and in configuration. Like system 1340, system 1360 carries out a transaction between the user device 1362 and the provider PAS 1368. Also like system 1340, system 1360 implements the recognition, comprehension, file management, and parameter updating functions of the present invention. The only difference is that at the end of a transaction, the PAS 1368 of system 1360 sends an authorization code to the user device 1362. In response, the user device 1362 stores this authorization code in the remote privilege authorization file 168 of the user EKE 1366. Armed with this authorization code, the user EKE 1366 may thereafter be used as verification that a certain travel service has been purchased. When interfaced with a proper reading device (not shown), the user EKE 1366 can be read to show that the service has indeed been purchased. Thus, the system 1360 of FIG. 18 turns the user EKE 1366 into a general purpose ticketing device. Consequently, the user EKE 1366 may be used as an airplane ticket, a bus ticket, a rental car voucher, a hotel voucher, or any other type of ticket or voucher. In fact, there is nothing to limit system 1360 to travel services. It is envisioned that the user EKE 1366 may be used for admission to various other services and events such as movies, plays, concerts, museums, restaurants, resorts, etc. The possible applications are limitless.

In addition to being used as a means for admission, the user EKE 1366 (having an authorization code stored thereon) may also be used as an authorization device for an entertainment management system. To elaborate, it is envisioned that in the near future, a user will be able to receive a plurality of scrambled signals (representing movies, programs, music, and other forms of entertainment) through an entertainment interface (not shown) installed in his home. The user can unscramble these signals, and thus, access the entertainment materials if he can provide a proper authorization code to the entertainment interface. That is where the system 1360 of FIG. 18 becomes involved. By using system 1360, a user can remotely transact with an entertainment provider to receive an authorization code therefrom. Once the authorization code is stored on the user EKE 1366, the EKE 1366 is coupled to the entertainment interface. The entertainment interface, in turn, accesses the authorization code stored on the EKE 1366 and uses this code to unscramble the proper signals in the proper manner. The user is thus granted access to the desired entertainment material. As shown by this example, system 1360 gives a user the ability to access, easily and conveniently, any desired entertainment material.

Figure 19:
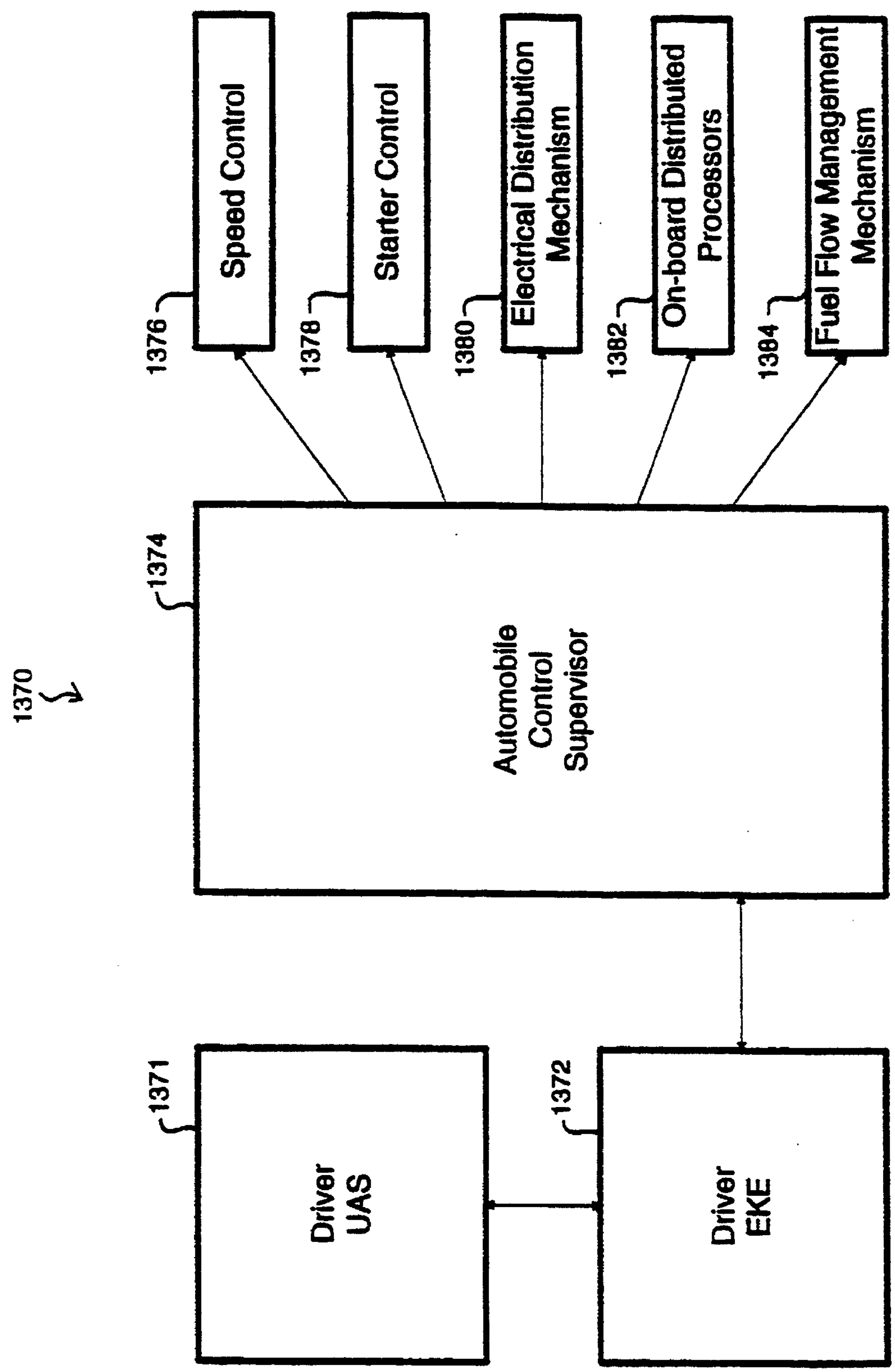
FIG. 19 is a block diagram representation of an authorizational system 1370, having the present invention incorporated therein, for controlling the operation of an automobile.

FIG. 19 shows another authorizational system 1370 in which the present invention may be advantageously implemented. As shown, system 1370 preferably comprises a driver UAS 1371, a driver EKE 1372, an automobile control supervisor 1374, and a plurality of control systems commonly found in automobiles. These control systems may include a speed control system 1376, a starter control system 1378, art electrical distribution mechanism 1380 for controlling distribution of power to electrical components in the automobile, on-board distributed processors 1382 for controlling the operation of selected components in the automobile, and a fuel flow management mechanism 1384. System 1370 allows an EKE 1372 to be used as a vehicle controlling device.

To take advantage of system 1370, the driver EKE 1372 is first programmed using the driver UAS. Preferably, when the EKE 1372 is coupled to the driver UAS, the components implement the recognition and comprehension methodologies of the present invention to ensure that the components are authorized to interact with each other. Once authorization is verified, the processor in the driver UAS preferably executes a control program on the driver EKE 1372 to generate certain control codes. Once generated, the control codes are stored into the remote privilege authorization file 168 of the driver EKE 1372. The EKE 1372 is now programmed with the codes that it will need to operate the system 1370. Interaction between the driver UAS and the driver EKE 1372 is then terminated.

Thereafter, when the driver wishes to operate the automobile, the driver couples the driver EKE 1372 to the automobile control supervisor 1374, which may be a device situated within the console of the car. Once coupled, the control supervisor 1374 reads the control codes stored within file 168 of the driver EKE 1372 and controls the systems 1376–1378 in the automobile accordingly. System 1370 may be used as a convenient electronic starting mechanism (replacing ignition keys). System 1370 may also be used as a means for controlling operation of the automobile. For example, a parent may prevent a child from exceeding the speed limit by storing control codes within the driver EKE 1372 which prohibit the speed control system 1376 from allowing the automobile to reach a certain speed. As a further example, selected control codes may be stored in the driver EKE 1372 to control the electrical distribution mechanism 1380 to prevent selected components from receiving power. As yet a further example, control codes may be stored in the driver EKE 1372 to enable or disable selected onboard processors such that certain operations. e.g. transmission shifting, fuel flow management, fuel injection control, etc., are prohibited. This and other control functions may be achieved using system 1370. Overall, system 1370 provides a powerful tool for controlling the operation of an automobile.

PAS to PAS Communication

Figure 20:
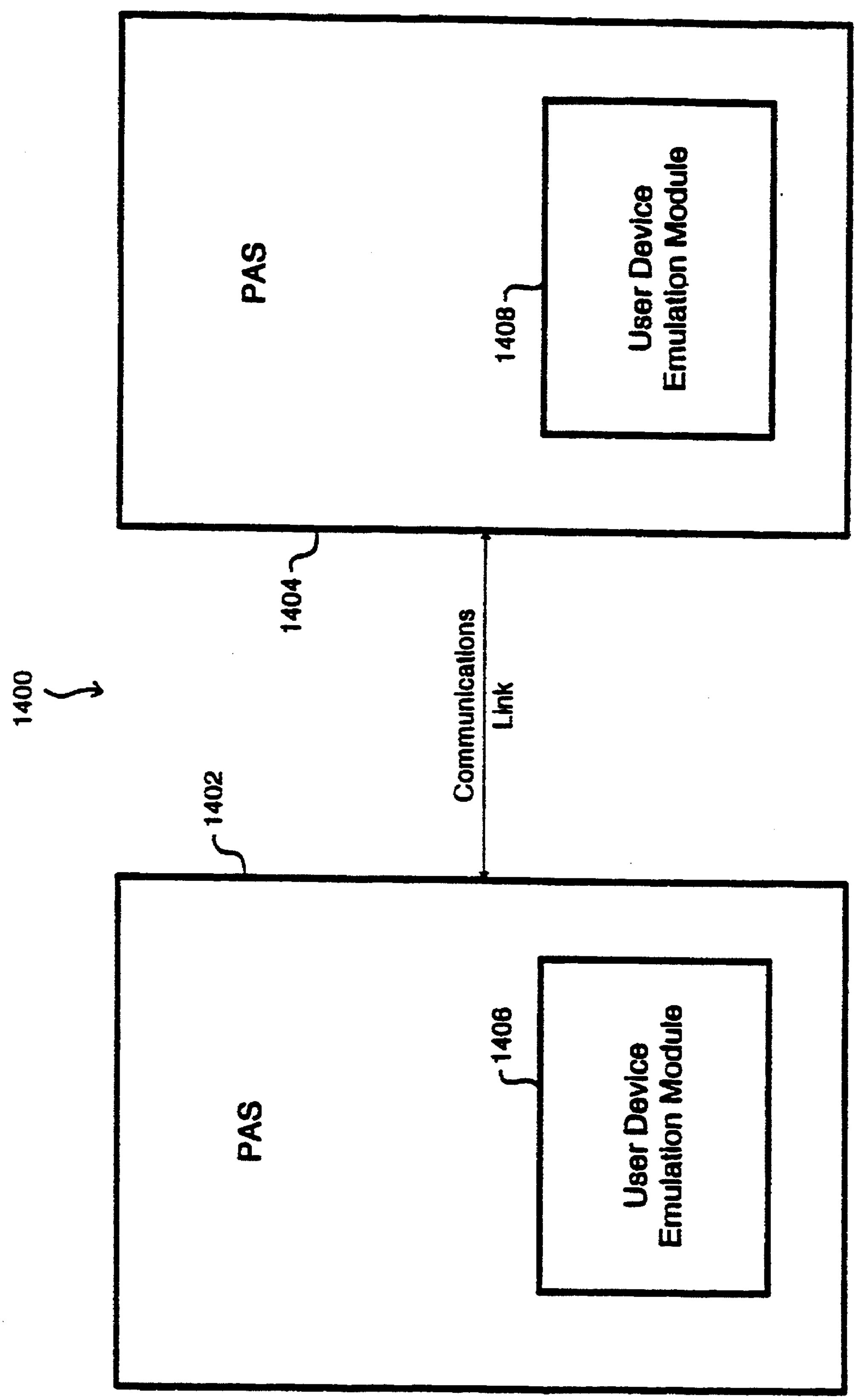
FIG. 20 is a block diagram representation of a system 1400 wherein a PAS 1402, 1404 having a user device emulation module 1406, 1408 incorporated therein, communicates directly with another PAS.

Thus far, the invention has only been described with reference to user devices communicating with PAS's. It should be noted, however, that with minor modifications, PAS's can communicate directly with each other. FIG. 20 shows a system 1400 wherein a PAS communicates directly with another PAS, the system 1400 preferably comprising a first PAS 1402 having a user device emulation module 1406 incorporated therein, and a second PAS 1404 also having a user device emulation module 1408 incorporated therein. The PAS's 1402, 1404 shown in system 1400 are substantially identical in construction to the PAS 18 shown in FIG. 10 except that PAS's 1402 and 1404 preferably further comprise a user device emulation module 1406, 1408 in the program memory 402. These modules 1406, 1408 are executed by processor 400 whenever the PAS's 1402, 1404 wish to communicate directly with another PAS. Thus far, modules 1406 and 1408 have been described as software modules which are executed by processor 400. It should be noted, however, that modules 1406 and 1408 may also be implemented in hardware. This is within the contemplation of the present invention.

To describe the operation of system 1400, suppose that PAS 1402 wishes to send a message to PAS 1404. To do so, the processor in PAS 1402 executes the user device emulation module 1406 in the program memory to emulate the operation of a user device. Once module 1406 is executed, the PAS 1402 behaves in the same manner as a normal user device 16, i.e. carries out the functions shown in FIGS. 11 and 13. More specifically, PAS 1402 cooperates with the PAS 1404 to implement the recognition and comprehension methodologies of the present invention. In addition. PAS 1402 cooperates with the PAS 1404 to dynamically update the parameters used in the recognition and comprehension methodologies. Throughout this entire process, PAS 1404 treats the PAS 1402 in the same manner as it would a normal user device. Preferably, recognition and comprehension parameters are pre-established between the PAS's 1402, 1404 so that they will be able to understand each other in their initial session. In this manner, PAS 1402 is able to communicate directly with PAS 1404. PAS 1404, by executing user device emulation module 1408, can communicate directly with PAS 1402 in the same manner.

As shown by this example, direct communication between PAS's can be achieved relatively simply. By incorporating a user device emulation module, quite similar to the user device-PAS control portion 144 of the PFM 140, into the program memory 404 of a PAS 18, a regular PAS can be transformed into one which is capable of direct PAS to PAS communication. This embodiment of the PAS will be quite useful in many applications, such as in settling accounts between different providers.

User Device to User Device Communication

Figure 21:
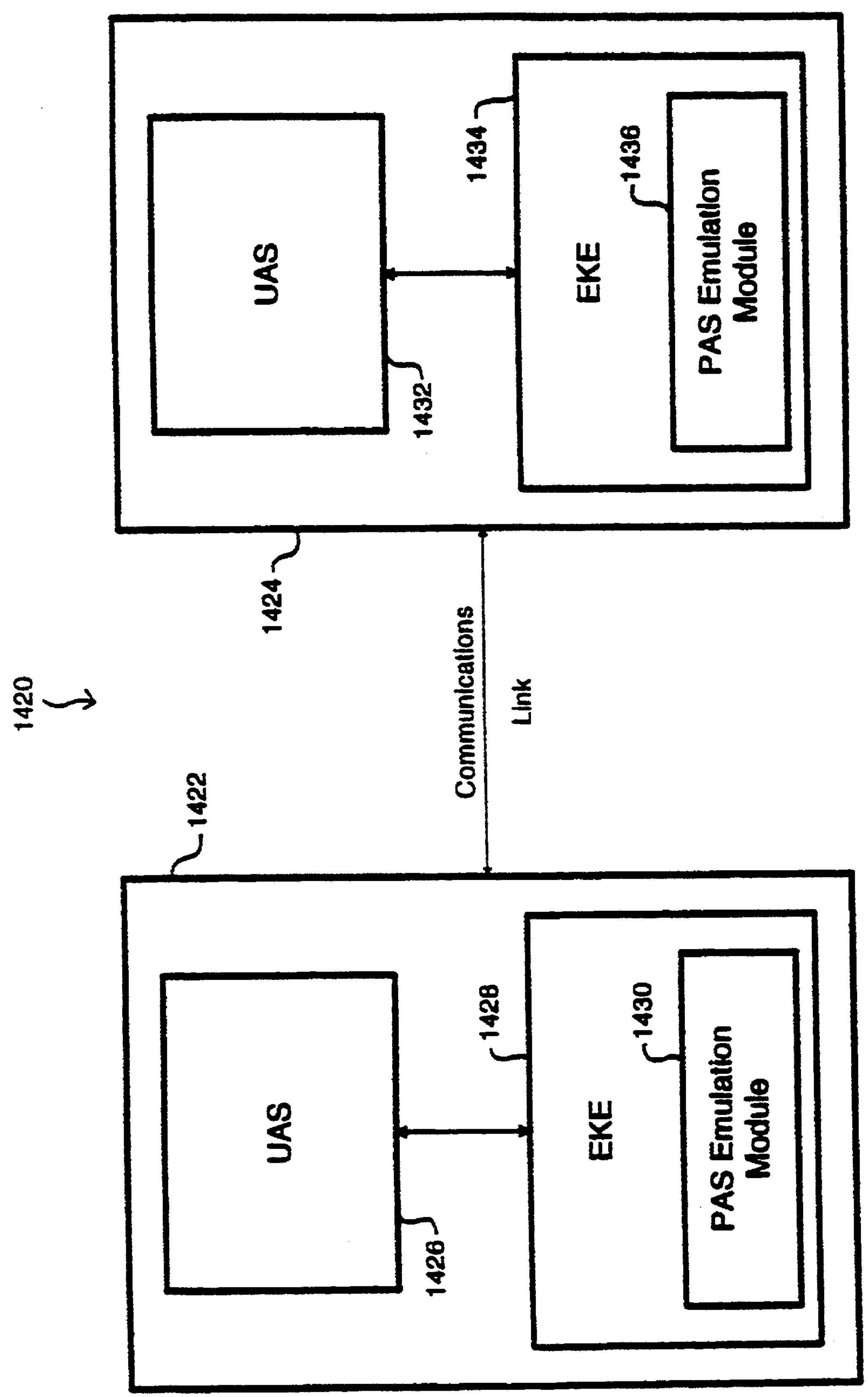
FIG. 21 is a block diagram representation of a system 1420 wherein a user device 1422, 1424 having a PAS emulation module 1430, 1436 incorporated therein, communicates directly with another user device.

Along the same line, a user device (comprising a UAS and an EKE) can also be adapted to communicate directly with another user device. Such a system 1420 is shown in FIG. 21, comprising a first user device 1422, formed by UAS 1426 and EKE 1428, and a second user device 1424, formed by UAS 1432 and EKE 1434. Notice that each of the EKE's 1428, 1434 has incorporated therein a PAS emulation module 1430, 1436, respectively. In the preferred embodiment, modules 1430 and 1436 are software modules stored on the EKE's which are executed and by the processors in the UAS's 1426, 1432. If so desired, however, modules 1430 and 1436 may be implemented in hardware in the UAS's 1426, 1432. This is within the contemplation of the present invention.

When sending out messages, user devices 1422, 1424 function as normal user devices. To receive messages, however, user device 1422 (for example) executes the PAS emulation module 1430 stored within EKE 1428 to emulate the behavior of a PAS. When executed, module 1430 causes the user device 1422 to perform the functions of a regular PAS, i.e. perform the functions shown in FIGS. 12 and 14. More specifically, the receiving user device 1422 cooperates with the sending user device 1424 to implement the recognition and comprehension methodologies of the present invention, and to update the parameters used in the recognition and comprehension processes. To ensure that the devices 1422, 1424 will be able understand each other in their initial communication, recognition and comprehension parameters are preferably pre-established between the devices. By executing PAS emulation module 1430, user device 1422 will be able to receive and process communications from user device 1424. Likewise, by executing PAS emulation module 1436, user device 1424 will be able to receive and process communications from user device 1422. Thus, a direct user communication system is provided.

As shown by this example, direct communication between user devices can be achieved relatively simply. By incorporating a PAS emulation module, quite similar to the recognition and comprehension control program 408 shown in FIG. 10, into the EKE of a user device, a regular user device can be transformed into one which is capable of direct user-device-to-user-device communication. This greatly enhances the versatility of a user device.

The invention has now been fully described. While the invention has been described with reference to specific embodiments, the invention should not be construed to be so limited. Various modifications can be made by those of ordinary skill in the art with the benefit of this disclosure without departing from the spirit of the invention. For example, the PFM 140 on the EKE 14 may be stored unencrypted. That way, processor 30 may execute the PFM instructions on the EKE 14 without having to first decrypt and store the instructions in the RAM 40. This and other modifications are within the spirit of the invention. Therefore, the invention should not be limited by the specific embodiments used to illustrate it but only by the scope of the appended claims.

What is claimed is:

1. In a system comprising a processing device having a memory, and a storage device coupled to the processing device, a method for establishing recognition parameters within the processing device, comprising the steps of: accessing by the processing device a set of instructions stored on the storage device; and executing by the processing device said set of instructions to carry out the steps of:

deriving a key code;

generating an operational key file name to associate with said key code;

creating a file within the memory of the processing device;

assigning said operational key file name to said file; and storing said key code into the memory in said file, thereby establishing said operational key file name and said key code as recognition parameters within the processing device.

2. A method for establishing a unique relationship between a processing device and a storage device, comprising the steps of:

deriving a set of parameters;

generating a master key code;

processing said parameters using said master key code to derive a first set of processed parameters;

storing said first set of processed parameters into the storage device;

generating a processing device key code;

processing said parameters using said processing device key code to derive a second set of processed parameters; and storing said second set of processed parameters into the processing device.

3. The method of claim 2, wherein the step of deriving said set of parameters comprises the steps of:

receiving an operational key code from a user;

generating an operational key file name; and associating said operational key file name with said operational key code.

4. The method of claim 2, wherein the step of deriving said set of parameters comprises the steps of:

generating an operational key code;

generating an operational key file name; and associating said operational key file name with said operational key code.

5. The method of claim 2, wherein the step of processing said parameters using said master key code comprises the step of:

encrypting said parameters using said master key code as an encryption key.

6. The method of claim 2, wherein the step of processing said parameters using said processing device key code comprises the step of:

encrypting said parameters using said processing device key code as an encryption key.

7. The method of claim 2, further comprising the step of:

storing said master key code into the processing device.

8. The method of claim 2, wherein the processing device has an identification code stored therein, and wherein said method further comprises the steps of:

processing said identification code using said master key code to derive a processed identification code; and storing said processed identification code into the storage device.

9. The method of claim 8, wherein the step of processing said identification code comprises the step of:

encrypting said identification code using said master key code as an encryption key.

10. A method for establishing a unique relationship between a processing device and a storage device, comprising the steps of:

receiving a dynamic personal identification number (DPIN) from a user;

generating a master key code using said DPIN;

generating a processing device key code, different from said master key code, using said DPIN;

deriving a set of parameters;

processing said parameters using said master key code to derive a first set of processed parameters;

storing said first set of processed parameters into the storage device;

processing said parameters using said processing device key code to derive a second set of processed parameters; and storing said second set of processed parameters into the processing device.

11. The method of claim 10, wherein the step of deriving said set of parameters comprises the steps of:

receiving an operational key code from a user;

generating an operational key file name; and associating said operational key file name with said operational key code.

12. The method of claim 10, wherein the step of deriving said set of parameters comprises the steps of:

generating an operational key code;

generating an operational key file name; and associating said operational key file name with said operational key code.

13. The method of claim 10, wherein the step of processing said parameters using said master key code comprises the step of:

encrypting said parameters using said master key code as an encryption key.

14. The method of claim 10, wherein the step of processing said parameters using said processing device key code comprises the step of:

encrypting said parameters using said processing device key code as an encryption key.

15. The method of claim 10, further comprising the step of:

storing said master key code into the processing device.

16. The method of claim 10, wherein the processing device has an identification code stored therein, and wherein said method further comprises the steps of:

processing said identification code using said master key code to derive a processed identification code; and storing said processed identification code into the storage device.

17. The method of claim 10, wherein the step of generating said master key code comprises the steps of:

generating a master hash code using said DPIN; and generating said master key code using said master hash code.

18. The method of claim 17, further comprising the step of:

storing said master hash code into the processing device.

19. The method of claim 17, wherein said master hash code is generated using a hashing algorithm known as the Secure Hash Algorithm (SHA).

20. The method of claim 10, wherein the step of generating said processing device key code comprises the steps of:

modifying said DPIN to derive a modified DPIN;

generating a processing device hash code using said modified DPIN; and generating said processing device key code using said processing device hash code.

21. The method of claim 20, wherein the processing device has an identification code stored therein, and wherein the step of modifying said DPIN comprises the step of:

combining said DPIN with said identification code to derive said modified DPIN.

22. The method of claim 20, wherein said processing device hash code is generated using a hashing algorithm known as the Secure Hash Algorithm (SHA).

23. The method of claim 20, further comprising the step of:

storing said processing device hash code into the storage device.

24. A storage device for interacting with a processing device having a memory to establish recognition parameters within the processing device, said storage device comprising:

means for causing the processing device to derive a key code;

means for causing the processing device to generate an operational key file name to associate with said key code;

means for causing the processing device to create a file within the memory of the processing device;

means for causing the processing device to assign said operational key file name to said file; and means for causing the processing device to store said key code into the memory in said file, thereby establishing said operational key file name and said key code as recognition parameters within the processing device.

25. A storage device for interacting with a processing device having a memory to establish a unique relationship between the processing device and said storage device, said storage device comprising:

a first storage unit;

means for causing the processing device to derive a set of parameters;

means for causing the processing device to generate a master key code;

means for causing the processing device to process said parameters using said master key code to derive a first set of processed parameters;

means for causing the processing device to store said first set of processed parameters into said first storage unit;

means for causing the processing device to generate a processing device key code;

means for causing the processing device to process said parameters using said processing device key code to derive a second set of processed parameters; and means for causing the processing device to store said second set of processed parameters into the memory of the processing device.

26. The storage device of claim 25, further comprising:

means for causing the processing device to store said master key code into the processing device.

27. The storage device of claim 25, wherein the processing device has an identification code stored in the memory, and wherein said storage device further comprises:

a second storage unit;

means for causing the processing device to process said identification code using said master key code to derive a processed identification code; and means for causing the processing device to store said processed identification code into said second storage unit.

28. A storage device for interacting with a processing device having a user interface and a memory to establish a unique relationship between the processing device and said storage device, said storage device comprising:

a first storage unit;

means for causing the processing device to receive a dynamic personal identification number (DPIN) from a user via the user interface;

means for causing the processing device to generate a master key code using said DPIN;

means for causing the processing device to generate a processing device key code, different from said master key code, using said DPIN;

means for causing the processing device to derive a set of parameters;

means for causing the processing device to process said parameters using said master key code to derive a first set of processed parameters;

means for causing the processing device to store said first set of processed parameters into said first storage unit;

means for causing the processing device to process said parameters using said processing device key code to derive a second set of processed parameters; and means for causing the processing device to store said second set of processed parameters into the memory of the processing device.

29. The storage device of claim 28, further comprising:

means for causing the processing device to store said master key code into the memory of the processing device.

30. The storage device of claim 28, wherein the processing device has an identification code stored in the memory, and wherein said storage device further comprises:

a second storage unit;

means for causing the processing device to process said identification code using said master key code to derive a processed identification code; and means for causing the processing device to store said processed identification code into said second storage unit.

31. The storage device of claim 28, wherein said means for causing the processing device to generate said processing device key code comprises:

means for causing the processing device to modify said DPIN to derive a modified DPIN;

means for causing the processing device to generate a processing device hash code using said modified DPIN; and means for causing the processing device to generate said processing device key code using said processing device hash code.

32. The storage device of claim 31, wherein the processing device has an identification code stored in the memory, and wherein said means for causing the processing device to modify said DPIN comprises:

means for causing the processing device to combine said DPIN with said identification code to derive said modified DPIN.

33. The storage device of claim 31, further comprising:

a second storage unit;

means for causing the processing device to store said processing device hash code into said second storage unit.

34. The storage device of claim 28, wherein said means for causing the processing device to generate said master key code comprises:

means for causing the processing device to generate a master hash code using said DPIN; and means for causing the processing device to generate said master key code using said master hash code.

35. The storage device of claim 34, further comprising:

means for causing the processing device to store said master hash code into the memory of the processing device.

36. A processing assembly, comprising:

a processing device comprising a processor, a memory coupled to said processor, and a storage device interface coupled to said processor for receiving one of a number of individual storage devices; and a storage device for coupling to said storage device interface, said storage device interacting with said processing device to establish recognition parameters within said processing device, said storage device comprising:

means for causing said processor to derive a key code;

means for causing said processor to generate an operational key file name to associate with said key code;

means for causing said processor to create a file within said memory;

means for causing said processor to assign said operational key file name to said file; and means for causing said processor to store said key code into said memory in said file, thereby establishing said operational key file name and said key code as recognition parameters within said processing device.

37. A processing assembly, comprising:

a first storage unit;

a processing device comprising a processor, a memory coupled to said processor, and a storage device interface coupled to said processor for receiving one of a number of individual storage devices; and a storage device for coupling to said storage device interface, said storage device interacting with said processing device to establish a unique relationship between said processing device and said storage device, said storage device comprising:

means for causing said processor to derive a set of parameters;

means for causing said processor to generate a master key code;

means for causing said processor to process said parameters using said master key code to derive a first set of processed parameters;

means for causing said processor to store said first set of processed parameters into said first storage unit;

means for causing said processor to generate a processing device key code;

means for causing said processor to process said parameters using said processing device key code to derive a second set of processed parameters; and means for causing said processor to store said second set of processed parameters into said memory.

38. The processing assembly of claim 37, wherein said storage device further comprises:

means for causing said processor to store said master key code into said memory.

39. The processing assembly of claim 37, wherein said memory has an identification code stored therein, and wherein said storage device further comprises:

a second storage unit;

means for causing said processor to process said identification code using said master key code to derive a processed identification code; and means for causing said processor to store said processed identification code into said second storage unit.

40. A processing assembly, comprising:

a processing device comprising a processor, a memory coupled to said processor, a user interface coupled to said processor, and a storage device interface coupled to said processor for receiving one of a number of individual storage devices; and a storage device for coupling to said storage device interface, said storage device interacting with said processing device to establish a unique relationship between said processing device and said storage device, said storage device comprising:

a first storage unit;

means for causing said processor to receive a dynamic personal identification number (DPIN) from a user via said user interface;

means for causing said processor to generate a master key code using said DPIN;

means for causing said processor to generate a processing device key code, different from said master key code, using said DPIN;

means for causing said processor to derive a set of parameters;

means for causing said processor to process said parameters using said master key code to derive a first set of processed parameters;

means for causing said processor to store said first set of processed parameters into said first storage unit;

means for causing said processor to process said parameters using said processing device key code to derive a second set of processed parameters; and means for causing said processor to store said second set of processed parameters into said memory.

41. The processing assembly of claim 40, wherein said storage device further comprises:

means for causing said processor to store said master key code into said memory.

42. The processing assembly of claim 40, wherein said memory has an identification code stored therein, and wherein said storage device further comprises:

a second storage unit;

means for causing said processor to process said identification code using said master key code to derive a processed identification code; and means for causing said processor to store said processed identification code into said second storage unit.

43. The processing assembly of claim 40, wherein said means for causing said processor to generate said processing device key code comprises:

means for causing said processor to modify said DPIN to derive a modified DPIN;

means for causing said processor to generate a processing device hash code using said modified DPIN; and means for causing said processor to generate said processing device key code using said processing device hash code.

44. The processing assembly of claim 43, wherein said memory has an identification code stored therein, and wherein said means for causing said processor to modify said DPIN comprises:

means for causing said processor to combine said DPIN with said identification code to derive said modified DPIN.

45. The processing assembly of claim 43, wherein said storage device further comprises:

a second storage unit;

means for causing said processor to store said processing device hash code into said second storage unit.

46. The processing assembly of claim 40, wherein said means for causing the processing device to generate said master key code comprises:

means for causing the processing device to generate a master hash code using said DPIN; and means for causing the processing device to generate said master key code using said master hash code.

47. The processing assembly of claim 46, wherein said storage device further comprises:

means for causing the processing device to store said master hash code into said memory.

* * * * *